US008066184B2

(12) United States Patent
Chung et al.

(10) Patent No.: US 8,066,184 B2
(45) Date of Patent: Nov. 29, 2011

(54) OPTICALLY READABLE MARKING SHEET AND READING APPARATUS AND METHOD THEREFOR

(75) Inventors: Kevin Kwong-Tai Chung, Princeton, NJ (US); Victor Jun Dong, Edison, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 600 days.

(21) Appl. No.: 12/207,096

(22) Filed: Sep. 9, 2008

(65) Prior Publication Data

US 2009/0289115 A1 Nov. 26, 2009

Related U.S. Application Data

(60) Provisional application No. 61/128,224, filed on May 20, 2008, provisional application No. 61/130,664, filed on Jun. 2, 2008, provisional application No. 61/125,947, filed on Apr. 30, 2008.

(51) Int. Cl.
*G06K 17/00* (2006.01)

(52) U.S. Cl. .......................................................... 235/386

(58) Field of Classification Search .................. 235/386, 235/51, 375, 487; 283/5

See application file for complete search history.

(56) References Cited

U.S. PATENT DOCUMENTS

| | | | |
|---|---|---|---|
| 3,163,758 | A | 12/1964 | Treacy |
| 3,648,022 | A | 3/1972 | Cook |
| 3,653,587 | A | 4/1972 | Hammond et al. |
| 3,710,105 | A | 1/1973 | Oxendine, Jr. et al. |
| 3,722,793 | A | 3/1973 | Aronoff |
| 3,739,151 | A | 6/1973 | Moldovan, Jr. et al. |
| 3,790,072 | A | 2/1974 | Moldovan, Jr. |
| 3,900,961 | A | 8/1975 | Sokolski et al. |
| 3,941,976 | A | 3/1976 | Huhn |
| 3,944,788 | A | 3/1976 | Comisar et al. |
| 3,977,357 | A | 8/1976 | O'Neal et al. |
| 4,010,353 | A | 3/1977 | Moldovan, Jr. et al. |
| 4,015,106 | A | 3/1977 | De Phillipo |

(Continued)

FOREIGN PATENT DOCUMENTS

CN 1804905 7/2006

(Continued)

OTHER PUBLICATIONS

Plaintiffs Exhibit 198, VIDEO, admitted Feb. 2009.

(Continued)

*Primary Examiner* — Seung Lee

(74) *Attorney, Agent, or Firm* — Clemente A. Berard, Esq.; Dann, Dorfman, Herrell & Skillman, P.C.

(57) ABSTRACT

A ballot or sheet having an anti-copying feature provides for detecting from an image of the ballot or sheet whether the ballot or sheet is an original or is a copy. The anti-copying feature may lighten or darken, or both, when copied and may or may not be evident to the human eye. A reader comprising an imager and a processor is for reading the ballot or sheet and for determining whether the ballot or sheet is an original or is a copy, and for determining selections marked thereon. A method for reading the ballot or sheet is for determining from an image of the ballot or sheet whether the ballot or sheet is an original or is a copy, and for determining selections marked thereon.

22 Claims, 12 Drawing Sheets

U.S. PATENT DOCUMENTS 4,021,780 A 5/1977 Narey et al.
4,101,784 A 7/1978 Key et al.
4,153,895 A 5/1979 Weisbrod et al.
4,300,123 A 11/1981 McMillin et al.
4,357,596 A 11/1982 Feilchenfeld
4,459,021 A 7/1984 Blazek
4,479,194 A 10/1984 Fogg et al.
4,641,240 A 2/1987 Boram
4,649,264 A 3/1987 Carson
4,724,307 A 2/1988 Dutton et al.
4,760,247 A 7/1988 Keane et al.
4,774,665 A 9/1988 Webb
4,807,908 A 2/1989 Gerbel
4,813,708 A 3/1989 Narey
4,968,873 A 11/1990 Dethloff et al.
5,038,392 A 8/1991 Morris et al.
5,073,700 A 12/1991 D'Onofrio
5,085,587 A 2/1992 DesForges et al.
5,103,490 A 4/1992 McMillan
5,126,731 A 6/1992 Cromers, Jr.
5,134,669 A 7/1992 Keogh et al.
5,164,601 A 11/1992 Nordstrom
5,191,525 A 3/1993 LeBrun et al.
5,213,373 A 5/1993 Ramos
5,218,528 A 6/1993 Wise et al.
5,221,831 A 6/1993 Geiszler
5,247,166 A 9/1993 Cannon et al.
5,248,872 A 9/1993 Stewart
5,257,011 A 10/1993 Beigel
5,272,318 A 12/1993 Gorman
5,278,753 A 1/1994 Graft, III
5,365,026 A 11/1994 Cromer, Jr. et al.
5,377,099 A 12/1994 Miyagawa
5,396,218 A 3/1995 Olah
5,400,248 A 3/1995 Chishom
5,416,308 A 5/1995 Hood et al.
5,452,379 A 9/1995 Poor
5,474,295 A 12/1995 Demshuk
5,495,532 A 2/1996 Kilian et al.
5,497,318 A 3/1996 Miyagawa et al.
5,548,326 A 8/1996 Michael
5,566,327 A 10/1996 Sehr
5,572,601 A 11/1996 Bloomberg
5,583,329 A 12/1996 Davis, III et al.
5,585,612 A 12/1996 Harp, Jr.
5,610,383 A 3/1997 Chumbley
5,612,870 A 3/1997 Welner
5,631,984 A 5/1997 Graf et al.
5,635,726 A 6/1997 Zavislan
5,640,200 A 6/1997 Michael
5,661,470 A 8/1997 Karr
5,672,060 A 9/1997 Poor
5,675,628 A 10/1997 Hokkanen
5,710,420 A 1/1998 Martin et al.
5,711,673 A 1/1998 Grundy, Jr.
5,719,386 A 2/1998 Hsieh et al.
5,732,222 A 3/1998 Miyagawa et al.
5,758,325 A 5/1998 Lohry et al.
5,821,508 A 10/1998 Willard
5,875,432 A 2/1999 Sehr
5,878,399 A 3/1999 Peralto
5,936,527 A 8/1999 Isaacman et al.
5,978,466 A 11/1999 Quattrocchi
5,987,149 A 11/1999 Poor
6,005,680 A 12/1999 Luther et al.
6,014,438 A 1/2000 Quattrocchi
6,077,106 A 6/2000 Mish
6,078,928 A 6/2000 Schnase et al.
6,081,793 A 6/2000 Challener et al.
6,092,051 A 7/2000 Kilian et al.
6,097,301 A 8/2000 Tuttle
6,112,240 A 8/2000 Pogue et al.
6,173,154 B1 1/2001 Kucinski et al.
6,176,429 B1 1/2001 Redderson
6,250,548 B1 6/2001 McClure et al.
6,287,765 B1 9/2001 Cubicciotti
6,366,777 B1 4/2002 Uusitalo
6,412,692 B1 7/2002 Miyagawa
6,418,372 B1 7/2002 Hofmann
6,427,073 B1 7/2002 Kortesalmi et al.
6,457,643 B1 10/2002 Way
6,505,778 B1 1/2003 Reddersen et al.
6,540,138 B2 4/2003 Hall et al.
6,550,675 B2 4/2003 Davis et al.
6,581,824 B1 6/2003 McClure et al.
6,607,126 B2 8/2003 Altini et al.
6,607,137 B2 8/2003 Morales
6,641,033 B2 11/2003 McClure et al.
6,662,998 B2 12/2003 McClure et al.
6,688,517 B1 2/2004 McClure et al.
6,726,090 B1 4/2004 Kargel
6,739,508 B2 5/2004 Ushioda et al.
6,741,738 B2 5/2004 Taylor
6,769,613 B2 8/2004 McDermott et al.
6,779,727 B2 8/2004 Warther
6,799,723 B2 10/2004 Kotob et al.
6,817,515 B2 11/2004 Winnett
6,854,644 B1 2/2005 Bolton et al.
6,865,543 B2 3/2005 Gibbs, Sr.
6,892,944 B2 5/2005 Chung et al.
6,942,142 B2 9/2005 Barmettler et al.
6,968,999 B2 11/2005 Reardon
6,971,574 B1 12/2005 Herskowitz
7,032,821 B2 4/2006 McClure et al.
7,077,313 B2 * 7/2006 Chung et al. .................. 235/386
7,080,779 B2 7/2006 Cummings
7,100,828 B2 9/2006 Cummings
7,117,356 B2 10/2006 La Cous
7,128,263 B1 10/2006 Nguyen et al.
7,152,045 B2 12/2006 Hoffman
7,152,792 B2 12/2006 Gaston
7,178,730 B1 2/2007 Jamison et al.
7,222,787 B2 5/2007 Cummings
7,231,082 B2 6/2007 Lenoir
7,243,846 B2 7/2007 Reardon
7,516,891 B2 * 4/2009 Chaum ......................... 235/386
2001/0035455 A1 11/2001 Davis et al.
2002/0029163 A1 3/2002 Joao
2002/0066780 A1 6/2002 Balolia
2002/0067828 A1 * 6/2002 Sparks et al. ................... 380/54
2002/0072961 A1 6/2002 McDermott et al.
2002/0074399 A1 6/2002 Hall et al.
2002/0078358 A1 6/2002 Neff et al.
2002/0084325 A1 7/2002 Reardon
2002/0091673 A1 7/2002 Seibel et al.
2002/0092908 A1 7/2002 Chumbley
2002/0133396 A1 9/2002 Barnhart
2002/0161628 A1 10/2002 Poor, Jr. et al.
2002/0169756 A1 11/2002 Biddulph
2002/0175514 A1 * 11/2002 Warther ............................ 283/5
2002/0194060 A1 12/2002 Chernomorov
2003/0034393 A1 2/2003 Chung
2003/0042731 A1 3/2003 Li
2003/0062411 A1 4/2003 Chung
2003/0066872 A1 4/2003 McClure
2003/0173404 A1 9/2003 Chung
2004/0016802 A1 1/2004 Cummings
2004/0016803 A1 1/2004 Cummings
2004/0046021 A1 3/2004 Chung
2004/0060983 A1 4/2004 Davis et al.
2004/0169077 A1 9/2004 Petersen et al.
2004/0195323 A1 10/2004 Vadura et al.
2004/0217168 A1 11/2004 Cummings
2005/0092835 A1 5/2005 Chung
2005/0161507 A1 7/2005 Openshaw, II et al.
2005/0211778 A1 9/2005 Biddulph
2006/0000906 A1 1/2006 Reardon
2006/0202031 A1 9/2006 Chung et al.
2006/0255145 A1 11/2006 Chung et al.
2007/0086070 A1 4/2007 Wicker
2007/0133023 A1 6/2007 Wicker
2007/0170253 A1 7/2007 Chung et al.
2007/0201116 A1 8/2007 Wicker et al.
2007/0241554 A1 10/2007 Wicker et al.
2007/0246930 A1 10/2007 Wicker
2007/0248364 A1 10/2007 Wicker et al.
2007/0257977 A1 11/2007 Wicker et al.

| | | | | |
|---|---|---|---|---|
| 2007/0267865 | A1 | 11/2007 | Wicker et al. | |
| 2008/0018097 | A1 | 1/2008 | Wicker et al. | |
| 2008/0048433 | A1 | 2/2008 | Wicker et al. | |
| 2008/0308633 | A1 * | 12/2008 | Bolton et al. | 235/386 |
| 2009/0020606 | A1 | 1/2009 | Chung et al. | |
| 2009/0037260 | A1 | 2/2009 | Felten et al. | |
| 2009/0072030 | A1 | 3/2009 | Cardone et al. | |

FOREIGN PATENT DOCUMENTS

| | | |
|---|---|---|
| CN | 101086691 | 12/2007 |
| EP | 0199683 | 10/1986 |
| EP | 0556853 | 8/1993 |
| IT | 1234224 | 5/1992 |
| JP | 7-57014 | 3/1995 |
| JP | 9-160988 | 6/1997 |
| JP | 2005-25392 | 1/2005 |
| WO | 96/02044 | 1/1996 |
| WO | 00/79469 | 12/2000 |
| WO | 02/31629 | 4/2002 |

OTHER PUBLICATIONS

Written Offer of Proof, *Avante International Technology Corporation, Plaintiff,* v. *Premier Election Solutions, et al*, Defendants; United States Eastern District of Missouri Eastern Division: Case No. 4:06-CV-978 TCM, Document 613, Feb. 9, 2009, 4 pages.

Defendants' Proposed Findings of Fact and Conclusions of Law Re Inequitable Conduct in the Prosecution of the '313 and '944 Patent, *Avante International Technology Corporation*, Plaintiff, v. *Premier Election Solutions, et al*, Defendants; United States Eastern District of Missouri Eastern Division: Case No. 4:06-CV-978 TCM, Document 615, Feb. 11, 2009, 12 pages.

Plaintiff Avante International Technology Corp.'s Proposed Findings of Fact and Conclusions of Law That There Was No Inequitable Conduct, *Avante International Technology Corporation*, Plaintiff, v. *Premier Election Solutions, et al*, Defendants; United States Eastern District of Missouri Eastern Division: Case No. 4:06-CV-978 TCM, Document 616, Feb. 11, 2009, 3 pages.

Plaintiff's Proposed Findings of Fact and Conclusions of Law That There Was No Inequitable Conduct, *Avante International Technology Corporation*, Plaintiff, v. *Premier Election Solutions, et al*, Defendants; United States Eastern District of Missouri Eastern Division: Case No. 4:06-CV-978 TCM, Document 616-2, Feb. 11, 2009, 13 pages.

Plaintiff's Combined Post-Trial Motion and Memorandum for Judgment as a Matter of Law, or, in the Alternative, for a New Trial, *Avante International Technology Corporation*, Plaintiff, v. *Premier Election Solutions, et al*, Defendants; United States Eastern District of Missouri Eastern Division: Case No. 4:06-CV-978 TCM, Document 642, Feb. 24, 2009, 23 pages.

Plaintiff's Unopposed Motion to Withdraw Plaintiff's Combined Post-Trial Motion and Memorandum for Judgment as a Matter of Law, or, in the Alternative, for a New Trial, *Avante International Technology Corporation*, Plaintiff, v. *Premier Election Solutions, et al*, Defendants; United States Eastern District of Missouri Eastern Division: Case No. 4:06-CV-978 TCM, Document 644, Feb. 26, 2009, 3 pages.

Defendants' Renewed Motion for Judgment as a Matter of Law or, in the Alternative, for a New Trial that the '944 and '323 Patents are Unenforceable, *Avante International Technology Corporation*, Plaintiff, v. *Premier Election Solutions, et al*, Defendants; United States Eastern District of Missouri Eastern Division: Case No. 4:06-CV-978 TCM, Document 661, Mar. 31, 2009, 2 pages.

Memorandum in Support of Defendants' Renewed Motion for Judgment as a Matter of Law or, in the Alternative, for a New Trial That the '944 and '313 Patents are Unenforceable, *Avante International Technology Corporation*, Plaintiff, v. *Premier Election Solutions, et al*, Defendants; United States Eastern District of Missouri Eastern Division: Case No. 4:06-CV-978 TCM, Document 662, Mar. 31, 2009, 14 pages.

Exhibit A, Transcript of Videotaped Deposition of Larry Hyer, *Avante International Technology Corporation*, Plaintiff, v. *Premier Election Solutions, et al*, Defendants; United States Eastern District of Missouri Eastern Division: Case No. 4:06-CV-978 TCM, Document 662-2, Mar. 31, 2009, 4 pages.

Exhibit B, Transcript of Videotaped Deposition of John W. Hanna, *Avante International Technology Corporation*, Plaintiff, v. *Premier Election Solutions, et al*, Defendants; United States Eastern District of Missouri Eastern Division: Case No. 4:06-CV-978 TCM, Document 662-3, Mar. 31, 2009, 4 pages.

Defendants' Motion for a Finding that the Case is Exceptional Under 35 U.S.C. § 285 and for Attorney Fees on Multiple Grounds, *Avante International Technology Corporation*, Plaintiff, v. *Premier Election Solutions, et al*, Defendants; United States Eastern District of Missouri Eastern Division: Case No. 4:06-CV-978 TCM, Document 664, Apr. 6, 2009, 3 pages.

Defendants' Memorandum in Support of Their Motion for a Finding that the Case is Exceptional Under 35 U.S.C. § 285 and for Attorney Fees on Multiple Grounds, *Avante International Technology Corporation*, Plaintiff, v. *Premier Election Solutions, et al*, Defendants; United States Eastern District of Missouri Eastern Division: Case No. 4:06-CV-978 TCM, Document 665, Apr. 6, 2009, 15 pages.

Exhibit 1, Letter of James A. Oliff, Feb. 9, 2007, *Avante International Technology Corporation*, Plaintiff, v. *Premier Election Solutions, et al*, Defendants; United States Eastern District of Missouri Eastern Division: Case No. 4:06-CV-978 TCM, Document 665-2, Apr. 6, 2009, 5 pages.

Exhibit 2, Transcript of Videotaped Deposition of Steve Bolton, *Avante International Technology Corporation*, Plaintiff, v. *Premier Election Solutions, et al*, Defendants; United States Eastern District of Missouri Eastern Division: Case No. 4:06-CV-978 TCM, Document 665-3, Apr. 6, 2009, 49 pages.

Exhibit 3, Transcript of Videotaped Deposition of Peter Martin, *Avante International Technology Corporation*, Plaintiff, v. *Premier Election Solutions, et al*, Defendants; United States Eastern District of Missouri Eastern Division: Case No. 4:06-CV-978 TCM, Document 665-4, Apr. 6, 2009, 37 pages.

Exhibit 4, Defendant Premier's Requests for Admission to Plaintiff, *Avante International Technology Corporation*, Plaintiff, v. *Premier Election Solutions, et al*, Defendants; United States Eastern District of Missouri Eastern Division: Case No. 4:06-CV-978 TCM, Document 665-5, Apr. 6, 2009, 7 pages.

Motion for Bill of Costs by Counter Claimaint Sequoia, *Avante International Technology Corporation*, Plaintiff, v. *Premier Election Solutions, et al*, Defendants; United States Eastern District of Missouri Eastern Division: Case No. 4:06-CV-978 TCM, Document 666, Apr. 6, 2009, 2 pages.

Motion for Bill of Costs by Premier Election Solutions, Inc., *Avante International Technology Corporation*, Plaintiff, v. *Premier Election Solutions, et al*, Defendants; United States Eastern District of Missouri Eastern Division: Case No. 4:06-CV-978 TCM, Document 667, Apr. 6, 2009, 2 pages.

Defendants' Joint Memorandum in Support of Defendant's Bill of Costs, *Avante International Technology Corporation*, Plaintiff, v. *Premier Election Solutions, et al*, Defendants; United States Eastern District of Missouri Eastern Division: Case No. 4:06-CV-978 TCM, Document 668, Apr. 6, 2009, 11 pages.

Defendants' Reply in Support of Renewed Motion for Judgment as a Matter of Law, or in the Alternative for a New Trial, that the '944 and '313 Patents are Unenforceable, *Avante International Technology Corporation*, Plaintiff, v. *Premier Election Solutions, et al*, Defendants; United States Eastern District of Missouri Eastern Division: Case No. 4:06-CV-978 TCM, Document 678 Apr. 20, 2009, 7 pages.

Transcript of Jury Trial, vol. I, *Avante International Technology Corporation*, Plaintiff, v. *Premier Election Solutions, et al*, Defendants; United States Eastern District of Missouri Eastern Division: Case No. 4:06-CV-978 TCM, Feb. 2, 2009, 111 pages.

Defendants' Witness, Larry Hyer, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 2, 2009, 19 pages.

Transcript of Jury Trial, vol. II-A, *Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 112 pages.
Transcript of Jury Trial, vol. II-B, *Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 163 pages.
Defendants' Witness, John Hanna, Transcript of Video Deposition Excerpts Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 3, 2009, 16 pages.
Defendants' Witness, Brian Clubb, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 12 pages.
Transcript of Jury Trial, vol. III-A, *Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 127 pages.
Transcript of Jury Trial, vol. III-B, *Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 81 pages.
Defendants' Witness, Frank Kaplan, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 21 pages.
Defendants' Witness, Stephen Knecht, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 4, 2009, 7 pages.
Plaintiff's Witness, Kevin Chung, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 6 pages.
Plaintiff's Witness, Brian Clubb, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 9 pages.
Plaintiff's Witness, Timothy Cordes, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 3 pages.
Plaintiff's Witness, Herman Deutsch, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 2 pages.
Plaintiff's Witness, Luis Diaz, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 5 pages.
Transcript of Jury Trial, vol. IV-A, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 102 pages.
Transcript of Jury Trial, vol. IV-B, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 89 pages.
Plaintiff's Witness, Mauro Rivero, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 3 pages.
Plaintiff's Witness, Eric Wall, Transcript of Video Deposition Played to the Jury, *Avante International Technology Corporation*, Plaintiff, v. *Premier Election Solutions, et al*, Defendants; United States Eastern District of Missouri Eastern Division: Case No. 4:06-CV-978 TCM, Feb. 5, 2009, 4 pages.
Transcript of Jury Trial, vol. V-A, *Avante international Technology Corporation*, Plaintiff, v. *Premier Election Solutions, et al*, Defendants; United States Eastern District of Missouri Eastern Division: Case No. 4:06-CV-978 TCM, Feb. 6, 2009, 115 pages.
Transcript of Jury Trial, vol. V-B, *Avante International Technology Corporation*, Plaintiff, v. *Premier Election Solutions, et al*, Defendants; United States Eastern District of Missouri Eastern Division: Case No. 4:06-CV-978 TCM, Feb. 6, 2009, 62 pages.
Transcript of Jury Trial, vol. VI, *Avante International Technology Corporation*, Plaintiff, v. *Premier Election Solutions, et al*, Defendants; United States Eastern District of Missouri Eastern Division: Case No. 4:06-CV-978 TCM, Feb. 9, 2009, 88 pages.
Exhibit List, *Avante International Technology Corporation*, Plaintiff, v. *Premier Election Solutions, et al*, Defendants; United States Eastern District of Missouri Eastern Division: Case No. 4:06-CV-978 TCM, Feb. 2009, 6 pages.
Plaintiffs Exhibit 9, Consulting Invoices, admitted Feb. 2009, 5 pages.
Plaintiffs Exhibit 18, Correspondence, admitted Feb. 2009, 2 pages.
Plaintiff's Exhibit 19, Correspondence, admitted Feb. 2009, 2 pages.
Plaintiffs Exhibit 23, Correspondence, admitted Feb. 2009, 4 pages.
Plaintiffs Exhibit 32, County of Sacramento, admitted Feb. 2009, 39 pages.
Plaintiffs Exhibit 37, Declaration, admitted Feb. 2009, 69 pages.
Plaintiffs Exhibit 68, Email from Lancaster, admitted Feb. 2009, 3 pages.
Plaintiffs Exhibit 70, Resignation Email, admitted Feb. 2009, 1 page.
Plaintiffs Exhibit 127, US Patent 5610383, admitted Feb. 2009, 9 pages.
Plaintiffs Exhibit 152, U.S. Appl. No. 10/260,167, admitted Feb. 2009, 192 pages.
Plaintiffs Exhibit 191, U.S. Appl. No. 60/326,265, admitted Feb. 2009, 84 pages.
Plaintiffs Exhibit 201, Letter to Ewald from Diebold, admitted Feb. 2009, 5 pages.
Plaintiff's Exhibit 202, Interrogatories, admitted Feb. 2009, 2 pages.
Plaintiff's Exhibit 203, Interrogatories, admitted Feb. 2009, 5 pages.
Defendant's Exhibit A, Chung Patent 6,892,944, admitted Feb. 2009, 22 pages.
Defendant's Exhibit A-3, Report of Sacramento Election, admitted Feb. 2009, 13 pages.
Defendant's Exhibit A-8, Provisional Application, admitted Feb. 2009, 84 pages.
Defendant's Exhibit A-9, Action Summary, admitted Feb. 2009, 7 pages.
Defendant's Exhibit B, Chung Patent 7,077,313, admitted Feb. 2009, 35 pages.
Defendant's Exhibit B-1, Tulare County Ballot, admitted Feb. 2009, 2pages.
Defendant's Exhibit B-9, Amendment, admitted Feb. 2009, 24 pages.
Defendant's Exhibit C, File History 6,892,944, admitted Feb. 2009, 210 pages.
Defendant's Exhibit D-2, Letter from State of Alabama, admitted Feb. 2009, 2 pages.
Defendant's Exhibit D-4, Slipedit Program User Manual, admitted Feb. 2009, 7 pages.
Defendant's Exhibit E, File History 7,077,313, admitted Feb. 2009, 346 pages.
Defendant's Exhibit E-2, GEMS User Guide, admitted Feb. 2009, 41 pages.
Defendant's Exhibit E-4, Specification for Slipedit Editor, admitted Feb. 2009, 11 pages.
Defendant's Exhibit F-3, Letter from California, admitted Feb. 2009, 1 pages.
Defendant's Exhibit F-4, Specification of Pagescan II, admitted Feb. 2009, 42 pages.
Defendant's Exhibit F-7, Supplemental Declaration, admitted Feb. 2009, 2 pages.

Defendant's Exhibit F-8, Declaration of Clubb, admitted Feb. 2009, 66 pages.
Defendant's Exhibit G, McMillan Patent 4,300,123, admitted Feb. 2009, 14 pages.
Defendant's Exhibit G-4, PA Assoc. Marketing Strategy, admitted Feb. 2009, 26 pages.
Defendant's Exhibit G-7, Work Order, admitted Feb. 2009, 1 pages.
Defendant's Exhibit G-8, Action Summary, admitted Feb. 2009, 6 pages.
Defendant's Exhibit G-9, Declaration of Childers, admitted Feb. 2009, 28 pages.
Defendant's Exhibit H, Patent 5,103,490, admitted Feb. 2009, 14 pages.
Defendant's Exhibit H-1, Test Report from Wyle, admitted Feb. 2009, 265 pages.
Defendant's Exhibit H-2, Data Sheet for Vision Series 8000, admitted Feb. 2009, 2 pages.
Defendant's Exhibit H-4, Pagescan 280 Fact Sheet, admitted Feb. 2009, 2 pages.
Defendant's Exhibit H-7, Equipment Order, admitted Feb. 2009, 1 pages.
Defendant's Exhibit H-8, Response to Action Summary, admitted Feb. 2009, 43 pages.
Defendant's Exhibit I, Patent No. 5,134,669, admitted Feb. 2009, 16 pages.
Defendant's Exhibit I-1, Wyle Leter, admitted Feb. 2009, 26 pages.
Defendant's Exhibit I-4, Letter from Hanna to Chung, admitted Feb. 2009, 2 pages.
Defendant's Exhibit I-9, Email from Martin to Global, admitted Feb. 2009, 2 pages.
Defendant's Exhibit J, Patent No. 5,248,872, admitted Feb. 2009, 13 pages.
Defendant's Exhibit K, Patent No. 6,250,548, admitted Feb. 2009, 54 pages.
Defendant's Exhibit K-1, Ballot Production Handbook, admitted Feb. 2009, 50 pages.
Defendant's Exhibit K-3, GEMS FEC Compliance Overview, admitted Feb. 2009, 107 pages.
Defendant's Exhibit K-8, Duty of Disclosure, admitted Feb. 2009, 14 pages.
Defendant's Exhibit K-11, San Diego County Contract, admitted Feb. 2009, 209 pages.
Defendant's Exhibit L-1, Model 100 Hardware Specification, admitted Feb. 2009, 106 pages.
Defendant's Exhibit L-2, GEMS System Software Specifications, admitted Feb. 2009, 154 pg.
Defendant's Exhibit L-3, Global Certification Compliance Summary, admitted Feb. 2009, 13 pgs.
Defendant's Exhibit L-7, Developer's Guide, admitted Feb. 2009, 125 pages.
Defendant's Exhibit M-1, Model 100 Software Specification, admitted Feb. 2009, 110 pages.
Defendant's Exhibit M-2, Email from Knecht, admitted Feb. 2009, 2 pages.
Defendant's Exhibit M-3, Product Proposal by Martin, admitted Feb. 2009, 24 pages.
Defendant's Exhibit M-8, Action Summary, admitted Feb. 2009, 8 pages.
Defendant's Exhibit N-2, Video of Highspeed Central Count, admitted Feb. 2009, 1 pages.
Defendant's Exhibit N-3, Review of Sacramento Election, admitted Feb. 2009, 8 pages.
Defendant's Exhibit N-8, Response to Action Summary, admitted Feb. 2009, 20 pages.
Defendant's Exhibit O-2, Software Source Code, admitted Feb. 2009, 11 pages.
Defendant's Exhibit O-3, User Manual for Scanner, admitted Feb. 2009, 68 pages.
Defendant's Exhibit O-6, Video Demo of AccuVote, admitted Feb. 2009, 1 pages.
Defendant's Exhibit O-8, Notice of Allowance, admitted Feb. 2009, 5 pages.
Defendant's Exhibit P-3, Listing of Time Tracking for Martin, admitted Feb. 2009, 11 pages.
Defendant's Exhibit R-9, Sacramento Ballot, admitted Feb. 2009, 3 pages.
Defendant's Exhibit R-11, Contract Report Sep. 27, 2001, admitted Feb. 2009, 2 pages.
Defendant's Exhibit T-3, Memorandum from Meehan, admitted Feb. 2009, 2 pages.
Defendant's Exhibit T-4, Cummings Patent Application, admitted Feb. 2009, 36 pages.
Defendant's Exhibit T-11, Email from Lancaster to Martin, admitted Feb. 2009, 1 pages.
Defendant's Exhibit U-1, Invoice for Dallas Co. TX, admitted Feb. 2009, 3 pages.
Defendant's Exhibit U-3, Memo from Dobson, admitted Feb. 2009, 2 pages.
Defendant's Exhibit U-4, Cummings Patent Application, admitted Feb. 2009, 29 pages.
Defendant's Exhibit U-11, Peripheral Dynamics Letter, admitted Feb. 2009, 12 pages.
Defendant's Exhibit V-2, Memo from Dean to Ensiminger, admitted Feb. 2009, 3 pages.
Defendant's Exhibit V-3, Manufacturing Request, admitted Feb. 2009, 5 pages.
Defendant's Exhibit V-11, Peripheral Dynamics Email, admitted Feb. 2009, 4 pages.
Defendant's Exhibit W-3, Peripheral Dynamics Invoice, admitted Feb. 2009, 2 pages.
Defendant's Exhibit W-5, Patent No. 4,813,708, admitted Feb. 2009, 8 pages.
Defendant's Exhibit W-11 Sample Ballot, admitted Feb. 2009, 6 pages.
Defendant's Exhibit X-2, Proposal from Global to Sacramento, admitted Feb. 2009, 9 pages.
Defendant's Exhibit X-3, Specifications for PageScan II, admitted Feb. 2009, 52 pages.
Defendant's Exhibit X-11, Dr. Singh's Invoices, admitted Feb. 2009, 29 pages.
Defendant's Exhibit Y-7, Cummings Patent Application, admitted Feb. 2009, 32 pages.
Defendant's Exhibit Y-11, Small Binder of PDI, admitted Feb. 2009, 71 pages.
Defendant's Exhibit Z-2, Email from Martin, admitted Feb. 2009, 4 pages.
Defendant's Exhibit Z-3, PageScan User Manual, admitted Feb. 2009, 7 pages.
Defendant's Exhibit Z-7, Cummings Patent Application, admitted Feb. 2009, 12 pages.
Order, Findings, and Conclusions on Inequitable Conduct, *Avante International Technology Corporation*, Plaintiff, v. *Premier Election Solutions, et al*, Defendants; United States Eastern District of Missouri Eastern Division: Case No. 4:06-CV-0978 TCM, Document 649, Mar. 17, 2009, 14 pages.
Order, Findings, and Conclusions on the Obviousness of the '944 and '313 Patents, *Avante International Technology Corporation*, Plaintiff, v. *Premier Election Solutions, et al*, Defendants; United States Eastern District of Missouri Eastern Division: Case No. 4:06-CV-0978 TCM, Document 650, Mar. 17, 2009, 6 pages.
Judgment, *Avante International Technology Corporation*, Plaintiff, v. *Premier Election Solutions, et al*, Defendants; United States Eastern District of Missouri Eastern Division: Case No. 4:06-CV-0978 TCM, Document 651, Mar. 17, 2009, 2 pages.
Intellectual Property Office of the People's Republic of China, "Search Report for Hong Kong Short-Term Patent Application No. 10103450.5", including a brief translation, Jun. 17, 2010 6 pages.
NovaVision, Inc., "Holograms and Tamper Evident Security Solutions", Product Listing, http://www.novavisioninc.com/, ©1999-2008, printed Jun. 24, 2008, 22 pages.
Document Security Systems, Inc., "AuthentiGuard Technology", ©2008, http://www.documentsecurity.com/authentiguard_technology.php, printed Jun. 24, 2008, 10 pages.
A D 2000, Inc., Commercial Holography, "About A D 2000 Inc.", ©2005, http://www.ad2000.com/, printed Jun. 24, 2008, 23 pages.

Frontline Solutions, "RFID Standards Buoy Packaging", Jul. 2001, 3 pages.
Frontline Solutions, "Packagers Think Outside the Box", May 2001, 3 pages.
Frontline Solutions, "RFID Baggage Tracking Solution Helps Keep SFIA Secure", Jul. 2001, 4 pg.
Frontline Solutions, "Standard Response", Jul. 2001, 1 page.
Avante International Technology, Inc., "How Does LEADS-TRAKKER Work to Enhance the Values for Exhibitors and Visitors?", 2002, 3 pages.
Leads-Trakker Web Pages, http:/www.leads-trakker.com/Printed Nov. 18, 2002, 17 pages.
International Search Report, PCT/US01/42563, Sep. 18, 2002, 5 pages.
T. Costlow, "Computer Kiosk Expedites Voter Registration", IEEE Spectrum, Oct. 2002, 2 pgs.
AccuVote-TS, http://www.gesn.com/AccuVote-TS/accuvote-ts.html, Global Election Systems, Inc., Not Dated, ©2000, 4 pages.
NEDAP, "Voting System", ©2000, 4 pages.
Hart Intercivic, "eSlate Electronic Voting System", http://www.worldwideelection.com/GoveSlate.cfm, © 1998-2000, 2 pages.
Alan Dechert, "The Voter Certified Ballot", Granite Bay, CA, http://www.go2zero.com/voterform.html, Feb. 13, 2001, 15 pages.
Robert Wright, "Recasting the Voting Process", www.varbusiness.com, Mar. 5, 2001, 4 pages.
Rebecca Mercuri, "A Better Ballot Box?", IEEE Spectrum, Oct. 2002, pp. 46-50.
Michael Stanton, "The importance of Recounting Votes", http://www.notablesoftware.com/Press/electronic_voting_in_brasil.html, Nov. 13, 2000, 3 pg.
Bruce Schneier, "Voting and Technology", Crypto-Gram, http://www.notablesoftware.com/Press/Schneier.html, Dec. 15, 2000, 3 pages.
Holli Riebeek, "Brazil Holds All-Electronic National Election", Oct. 15, 2002, 1 page.
Mike He, Rogerio Almeida and Edson Gissoni, "National Semiconductor and Unisys Equip Brazil with New Voting Machines for Fast and Accurate Election Results in the Fall", National Semiconductor, http://www.national.com/news/item/0,735,757,00.html, May 6, 2002, 2 pages.
Peter G. Neumann, "Security Criteria for Electronic Voting", http://www.csl.sri.com/users/neumann/ncs93.html, © 1993, 7 pages.
E-mail message from: R. Mercuri [notable@mindspring.com] to: Clement Berard; plesko @simmonscooper.com, "Avante Patent 7036730 and infringement suit", Jul. 13, 2006, 4 pages.
Rebecca Mercuri, "Electronic Voting", http://web.archive.org/web20010201193800/http://www.notablesoftware.com/; updated Jan. 28, 2001; 11 pages.
Bruce Schneier, Crypto-Gram Newsletter, Dec. 15, 2000, http://www.counterpane.com; 17 pages.
Rebecca Mercuri, Explanation of Voter-Verified Ballot Systems, The Risks Digest, ACM Comm. on Computers & Public Policy, vol. 22: 17, Jul. 24, 2002, 15:54:47-0400, 2 pages.
Yahoo Finance, Press Release, Inventor of Electronic Voting Verification System Takes Industry Giants to Court for Patent Infringement; Wed., Jul. 12, 2006 11:19 am, 2 pages.
Rebecca Mercuri, "Why Computers Shouldn't Count Votes", Princeton ACM/IEEE Computer Society Chapters, Nov. 2000 Joint Meeting, Thurs. Nov. 16, 2000, 8:00 pm, 2 pages.
Rebecca Mercuri, "Electronic Vote Tabulation Checks & Balances", Dissertation, 2001, Presented to Faculty of Univ. of Pennsylvania, 235 pages.
Rebecca Mercuri, The FEC Proposed Voting Systems Standard Update, A Detailed Comment, Submitted to Fed. Election Commission, Sep. 10, 2001, FEC Not 2001-9. vol. 66, No. 132, 8 pages.
Terri Gauchat, [Abstract] Computer Assisted Vote Tallying, an Overview of the Problems, Implications, and Solutions, Univ. of Waterloo, Term Res Project, Apr. 11, 1991, 14 pages.
Document submitted to Patent Office, Archive Date Jul. 11, 2000, ACCUVote-TS, http://web.archive.org/web/20000711160152/www.globalelection.com., 5 pages.
AccuVote TS reference, Archive Date Oct. 12, 1999, http://web.archive.org/web/19991012074217/www.gesn.com/Product..., 3 pages.
Roy G. Saltman, Accuracy, Integrity, and Security in Computerized Vote-Tallying, Computer Science & Technology, NBS Special Pub. 500-158, Aug. 1998, 109 pages.
Michael Ian Shamos, CFP'93—Electronic Voting—Evaluating the Threat, Mar. 1993, CPSR, http://web.archive.org/web20011224071421/www.cpsr.org/conference.., 9 pages.
Description of AccuVote OS, Archived Oct. 12, 1999, "The AccuVote" http://web.archive.org/web/19991012093810/www.gesn.com/Product. 4 pages.
Description of GEMS, Archived Nov. 9, 1999, "Global Election Management System," http://web.archive.org/web/19991109003219/www.gesn.com/Product.. 5 pages.
Excerpts from current AccuVote TSX Pollworkers Guide, AccuVote-TSX Poliworker's Guide, DIEBOLD Election Systems, Revision 5.0, Mar. 22, 2005, 3 pages.
CALTECH-MIT, "Voting What is What Could Be", Jul. 2001, 95 pages.
Rebecca Mercuri, "Rebecca Mercuri's Statement on Electronic Voting", http://www.notablesoftware.com/RMstatement.html, © 2001, 2 pages.
Rebecca Mercuri, "Electronic Voting", http://www.notablesoftware.com/evote.html, Oct. 15, 2001, 8 pages.
Bruce Schneier, "Voting and Technology," from Crypto-Gram Newsletter, Dec. 15, 2000, http://www.notablesoftware.com/press/schneier.html; 3 pages.
Rebecca Mercuri, *Voting-Machine Risks*, Nov. 11, 1992, 2 pages.
*The Risks Digest*, vol. 2, Issue 22, Mar. 5, 1986, 4 pages, includes inter alia: Michael McGlaughlin, *Voting Receipt*, http://catless.ncl.ac.uk/Risks/2.22.html Tom Benson, *Computerized Voting*, http://catless.ncl.ac.uk/Risks/2.22.html.
*The Risks Digest*, vol. 2, Issue 24, Mar. 8, 1986, 4 pages, includes inter alia: Kurt Hyde, *Progress Report on Computerized Voting*, http://catless.ncl.ac.uk/Risks/2.24.html.
*The Risks Digest*, vol. 10, Issue 78, Jan. 22, 1991, 6 pages, includes inter alia: Evan Ravitz, *Voting by Phone*, http://catless.ncl.ac.uk/Risks/10.78.html.
Strini Giorgio, *Data Capture and Processing Device, Particularly for Voting and Associated Polling*, Abstract of IT No. 1234224, Patent for Industrial Invention, Date: May 6, 1992, 1 page.
Bruce Schneier, *Applied Cryptography*, Second Edition © 1996, Cover and title pages, Chapter 6, pp. 125-147, 170-175 185-187 and 587.
Rebecca Mercuri, *Physical Verifyability of Computer Systems, Secure Networks*, Proceedings: Fifth International Computer Virus & Security Conference, 1992, 11 pages.
*The Risks Digest*, vol. 2, Issue 23, Mar. 6, 1986, 5 pages.
*The Risks Digest*, vol. 16, Issue 52, Oct. 31, 1994, 11 pages.
*The Risks Diciest*, vol. 21, Issue 10, Nov. 7, 2000, 10 pages.
*The Risks Digest*, vol. 22, Issue 66, Apr. 1, 2003, 11 pages.
*The Risks Digest*, vol. 22, Issue 54, Feb. 3, 2003, 11 pages.
Granite Creek Technology Incorporated Report No. OR9202, "Certification Tests of the OPTECH IV-C Model 400 Central Ballot Tabulator", Jul. 7, 1992, 14 Pages (S003596-S003609).
Granite Creek Technology Incorporated Report No. KS9305, "Certification Tests of the OPSCAN 5/TeamWork Electronic Voting System", Dec. 15, 1993, 10 Pages (S003656-S003655).
"OPTECH IV-C Central Ballot Counter Operator's Manual", Jul. 29, 1990, 46 Pages (S003610-S003655).
Federal Election Commission, "Performance and Test Standards for Punchcard, Marksense, and Direct Recording Electronic Voting Systems" Jan. 1990, 204 Pages.
CJvK Translation 10206 It:Eng Patent Application No. 1234224; prepared May 6, 1992; 22 pages.
A. Riera, J. Borrell, J. Rifa, "An uncoercible verifiable electronic voting protocol," Proceedings of IFIP SEC '98, Online, Sep. 4, 1998, XP002272039, 10 Pages.
D. Dill, R. Mercuri, P. Neumann, D. Wallach, "Frequently Asked Questions about DRE Voting Systems", htto://www.verifiedvoting.org/drefaq.asp, printed Aug. 24, 2004, 7 pages.

The Open Voting Consortium, "Frequently Asked Questions (FAQ)", © 2004 http://www.openvotingconsortium.org/faq.html, printed Aug. 24, 2004, 17 pages.
Verified Voting Foundation, "E-Voting Misconceptions", httg://www.verifiedvoting.org/article.asp?id+2609, printed Aug. 24, 2004, 3 pages.
A. Dechert, "Statement at Utah State Capital", Jul. 13, 2004, httg://www.openvotingconsortium.org/ad/alan-ut-7-13.html, printed Aug. 24, 2004, 2 pages.
M. Shamos, "Paper v. Electronic Voting Records—An Assessment", Apr. 2004, htto://euro.ecom.cmu.edu/people/faculty/mshamos/paper.htm, printed Aug. 24, 2004, 20 pages.
A. Dechert, "OVC Response to Paper v. Electronic Voting Records—An Assessment, by Michael Ian Shamos", Jul. 30, 3004, http://gnosis.python-hosting.com/voting-project/July.2004/0240.html, printed Aug. 24, 2004, 6 pages.
K. Zetter, "California Bans E-Vote Machines", Apr. 30, 2004, http://www.wirednew.com/news/evote/0,2645,63298,00.html?tw=wn_story_page_prev2, printed Jun. 22, 2004, 3 pages.
Associated Press "Prototype E-Vote Printer Fails to Satisfy", © 2005, Feb. 3, 2005, 2 pages, http://start.earthlink.net/channel/news/print?guid=20050203/4201afd0_3ca6_15526200502....
R. Mercuri, "Computer Security Act and Computerized Voting Systems", Nov. 27, 1992, Risks Digest vol. 14: Issue 11, pp. 3-4.
Westinghouse DataScore Systems, "Optical Mark Reader Systems", no date marked; prior to Mar. 30, 2007; 13 pages.
Tallone, "Business Point of View: A Better Voting System", ca. 2004, 2 pages.
Election Systems & Software, "Integrated Hardware Solutions", © 2001 (on last sheet, but date "Oct. 6, 2004" on sheet AV-17423), 14 pages.
National Computer Systems, "Precept Image System", © 1991 or 1992, 10 pages.
*The Risks Digest*, vol. 21: Issue 23; Jan. 30, 2001; 12 pages.
Global Election Systems, Inc., "AccuVote-TS", http://www.archive.org/web/20000830141622/http:/www.gesn.com/AccuVote-TS/accuvot..., Web Archive date Aug. 30, 2000, 4 pages.
VoteHere, Inc., "November Election in Arizona and California will be first-ever cooperative trial of online voting", "VoteHere Platinum" and "VoteHere Gold", http://web.archive.org/web/20001019071003/votehere.net/VH-Content-v2.0/default.htm, Web Archive date Oct. 19, 2000, 5 pages.
Diebold Election Systems, "Election Solutions Diebold Election Systems Solutions", "Election Solutions AccuVote-TS", "Election Solutions AccuVote-OS", and "Election Solutions Global Election Management System—GEMS", http://web.archive.org/web/20020811050628/www.diebold.com/solutions/election/solutio..., Web Archive date Oct. 3, 2002, 10 pages.
Peripheral Dynamics, Inc., "Pagescan II", no date marked; prior to Mar. 29, 2007; 2 pages.
Avante International Technology, Inc., "Optical Vote-Trakker: A "Mark-Sense" Absentee & Precinct-Based Voting System that Minimizes Both Voter and System Errors", Jan. 2004, 7pg.
European Patent Office, "Communication Pursuant to Article 96(2) EPC", Application No. 01273930.6, May 8, 2004, 10 pages.
European Patent Office, "Communication Pursuant to Article 96(2) EPC", Application No. 01273930.6, Jun. 20, 2005, 10 pages.
European Patent Office, Communication, Application No. 01273930.6, Oct. 15, 2004, 8 pages.
D. Dixon, "Technology & the Polls: Rebecca Mercuri", Nov. 15, 2000, 8 pages.
Internet Archive Wayback Machine, VoteHere.net, The Secure Internet Voting Company, http://web.archive.org/web/*/http"//votehere, pp. HL00068-HL00092, allegedly Oct. 19, 2000, printed May 8, 2007, 25 pages.
Avante International Technology, Inc., "Optical Vote-Trakker™: A "Mark-Sense" Absentee & Precinct Based Voting System that Minimizes Both Voter and System Errors", link available at http://www.vote-trakker.com/optical.html, Jan. 2004, 10 pages.
Avante International Technology, Inc., "Avante Optical Vote-Trakker™", © 2001-2004, 2 pages, printed Jun. 11, 2007.
Avante International Technology, Inc., "Avante Vote-Trakker™"and "Avante Vote-Trakker™ Overview", Mar. 16, 2004, 6 pages, printed Jun. 11, 2007.
Avante International Technology, Inc., "Avante Vote-Trakker™ EVC308-SPR"and "Avante Vote-Trakker™ EVC308-SPR-FF", © 2001-2004, 6 pages, printed Jun. 11, 2007.
Avante International Technology, Inc., "Accessible Voting Integrating the Touch-Screen Accessibility of DRE System with the Optical Scanning Paper Ballots", © 2001-2004, certain parts updated Mar. 16, 2004, Apr. 8, 2004 and May 18, 2004, 17 pages, printed Jun. 11, 2007.
Federal Election Commission, "Voting Systems Performance and Test Standards" Overview and vols. I & II, 2002, 307 pages.
Ramin Safarl-Foroushani, "Form Registration: A Computer Vision Approach", © 1997, 121 pages.
Ashraf Nasr Sayed, "Extraction and Photogrammetric Exploitation of Features in Digital Images", Aug. 1990, 263 pages.
Scientific Translation Services, "*Novel Voting Process and Means for Carrying Out Same*," [EPO 0 419 335 A1] English Translation of coloum 1-10, (Translated May 2004), 8 pages.
Benaloh J et al, "Receipt-Free Secret-Ballot Elections (Extended Abstract)," Proceedings of the Annual ACM Symposium on the Theory of Computing, XX, XX, 1994, pp. 544-551, XP002099996.
Roy G. Saltman, "Effective Use of Computing Technology in Vote-Tallying", Mar. 1975, 139 pgs.
Douglas Jones, "A Brief Illustrated History of Voting", 2001, 18 pages.
North American Professional Technologies, "Vote Tally System Ballot Production Guide", Jun. 1989, 16 pages.
Michael I. Shamos, "American Information Systems, AIS 115 and 315 Vote Tabulation Systems, an Evaluation", Dec. 1989, 9 pages.
Michael I. Shamos, "American Information Systems, AIS 150 and 550 Mark-Sense Vote Tabulation Systems and Election Reporting System (ERS), an Evaluation", Mar. 1994, 5 pages.
Michael I. Shamos, "Business Records Corporation, Optech IV-C Model 200 Mark-Sense Central Tabulation Unit, an Evaluation", Nov. 1991, 8 pages.
Michael I. Shamos, "American Information Systems, AIS 315 Ballot Counter, an Evaluation", Nov. 1983, 5 pages.
Michael I. Shamos, "The Sequoia Pacific Datavote System, an Evaluation", Jun. 1984, 7 pages.
Michael I. Shamos, "Shoup Corporation, Shouptronic Direct Recording Electronic Voting System, an Evaluation", Jul. 1991, 3 pages.
American Information Systems, Inc., AIS Model 150 Central Ballot Scanner Operators Manual Version 5.6.1.7, © 1997, Apr. 1997, 64 pages.
Peripheral Dynamics, Inc., "Manufacturing Request", Oct. 3, 2001, 1 page.
Peripheral Dynamics, Inc., "Specification No. 3-1308-7071D for Peripheral Dynamics, Inc., Pagescan II Full-Page Image Scanner", Sep. 6, 2000, 52 pages.
Peripheral Dynamics, Inc., "SlipEdit User Manual No. 3-1305-7034B", Undated, 5 pages.
Ltr. to Paul Lesko, Esq. Jun. 28, 2006, Re: U.S. Appl. No. 10/255,348, "Electronic Voting Apparatus, System and Method", From Nancy L. Reeves, Walker & Jocke, 5 pages.
Diebold Election Systems, Inc.'s Invalidity Contentions for the '944 and '730 Patents, *Avante International Technology Corporation*, Plaintiff, v. *Diebold Election Systems, et al*, Defendants; United States Eastern District of Missouri Eastern Division: Case No. 4:06-cv-00978 TCM, Nov. 28, 2006, 71 pages.
Defendant Election Systems and Software, Inc.'s Preliminary Invalidity Contentions, *Avante International Technology Corporation*, Plaintiff, v. *Diebold Election Systems, et al*, Defendants; United States Eastern District of Missouri Eastern Division: Case No. 4:06-cv-00978 TCM, Nov. 30, 2006 , 34 pages.
Sequoia Voting Systems' Preliminary Invalidity Contentions, *Avante International Technology Corporation*, Plaintiff, v. *Diebold Election Systems, et al*, Defendants; United States Eastern District of Missouri Eastern Division: Case No. 4:06-cv-00978 TCM, Nov. 28, 2006, 46 pages.

Letter, Paul A. Lesko, (Simons Cooper) to Clement Berard, "*Avante International Technology Corporation* vs. *Diebold Election Software et al*, Cause No. 4:06-cv-00978 TCM" dated Dec. 5, 2006, 2 pages.
Defendant Election Systems & Software, Inc.'s Preliminary Invalidity Contentions for U.S. Patent No. 7,077,313, *Avante International Technology Corporation*, Plaintiff, v. *Diebold Election Systems, et al*, Defendants; United States Eastern District of Missouri Eastern Division: Case No. 4:06-cv-00978 TCM, Mar. 2, 2007, 22 Pages.
Sequoia Voting System's Preliminary Invalidity Contentions for U.S. Patent No. 7,077,313, *Avante International Technology Corporation*, Plaintiff, v. *Diebold Election Systems, et al*, Defendants; United States Eastern District of Missouri Eastern Division: Case No. 4:06-cv-00978 TCM, Mar. 2, 2007, 34 Pages.
Diebold Election Systems, Inc.'s Invalidity Contentions for the '313 Patent, *Avante International Technology Corporation*, Plaintiff, v. *Diebold Election Systems, et al*, Defendants; United States Eastern District of Missouri Eastern Division: Case No. 4:06-cv-00978 TCM, Mar. 5, 2007, 26pg.
Defendants' Preliminary Claim Construction and Preliminary Identification of Extrinsic Evidence, *Avante International Technology Corporation*, Plaintiff, v. *Diebold Election Systems, et al*, Defendants; United States Eastern District of Missouri Eastern Division: Case No. 4:06-cv-00978 TCM, Apr. 17, 2007, 3 pages.
Defendants' Proposed Construction for 730 Patent, *Avante International Technology Corporation*, Plaintiff, v. *Diebold Election Systems, et al*, Defendants; United States Eastern District of Missouri Eastern Division: Case No. 4:06-cv-00978 TCM, Apr. 17, 2007, 23 pages.
Defendants' Proposed Construction for '944 Patent, *Avante International Technology Corporation*, Plaintiff, v. *Diebold Election Systems, et al*, Defendants; United States Eastern District of Missouri Eastern Division: Case No. 4:06-cv-00978 TCM, Apr. 17, 2007, 17 pages.
Defendants' Proposed Construction for '313 Patent, *Avante International Technology Corporation*, Plaintiff, v. *Diebold Election Systems, et al*, Defendants; United States Eastern District of Missouri Eastern Division: Case No. 4:06-cv-00978 TCM, Apr. 17, 2007, 6 pages.
Defendants' Initial Claim Construction Brief, *Avante International Technology Corporation*, Plaintiff, v. *Diebold Election Systems, et al*, Defendants; United States Eastern District of Missouri Eastern Division: Case No. 4:06-cv-00978 TCM, May 8, 2007, Document 161, 245 pages.
Motion for Leave to File Amended Counterclaim and "Amended Answer and Counterclaim of Diebold Election Systems", *Avante International Technology Corporation*, Plaintiff, v. *Diebold Election Systems, et al*, Defendants; United States Eastern District of Missouri Eastern Division: Case No. 4:06-cv-00978 TCM, May 14, 2007, Document 168, 40 pages.
Defendant Election Systems & Software, Inc's Motion for Leave to File First Amended Answer to Plaintiff's Third Amended Complaint and Memorandum of Law in Support of Motion and First Amended Answer of Election Systems & Software, Inc. To Plaintiff's Third Amended Complaint and Amended Counterclaim of Election Systems & Software, Inc., *Avante International Technology Corporation*, Plaintiff, v. *Diebold Election Systems, et al*, Defendants; United States Eastern District of Missouri Eastern Division: Case No. 4:06-cv-00978 TCM, May 14, 2007, Document 169, 30 pages.
Defendant Sequoia Voting Systems' Motion for Leave to Amend Its Answer, Affirmative Defenses and Counterclaims to State Additional Facts Supporting Its Counterclaim for Inequitable Conduct and Amended Answer, Affirmative Defenses and Counterclaims of Sequoia Voting Systems, *Avante International Technology Corporation*, Plaintiff, v. *Diebold Election Systems, et al*, Defendants; United States Eastern District of Missouri Eastern Division: Case No. 4:06-cv-00978 TCM, May 14, 2007, Document 170, 35 pages.
Defendants' Response to Plaintiff Avante's Claim Construction Brief, *Avante International Technology Corporation*, Plaintiff, v. *Diebold Election Systems, et al*, Defendants; United States Eastern District of Missouri Eastern Division: Case No. 4:06-cv-00978 TCM, May 21, 2007, Document 179, 64 pages.
Joint Claim Construction and Prehearing Statement, *Avante International Technology Corporation*, Plaintiff, v. *Diebold Election Systems, et al*, Defendants; United States Eastern District of Missouri Eastern Division: Case No. 4:06-cv-00978 TCM, Apr. 24, 2007, DN 150, 63pg.
Motion for Partial Summary Judgment, *Avante International Technology Corporation*, Plaintiff, v. *Diebold Election Systems, et al*, Defendants; United States Eastern District of Missouri Eastern Division: Case No. 4:06-cv-00978 TCM, Jun. 15, 2007, Document 197, 3 pages.
Memorandum in Support of Election Systems & Software Inc.'s Motion for Partial Summary Judgment of Invalidity of Certain Claims of the '944 Patent (with Exhibits), *Avante International Technology Corporation*, Plaintiff, v. *Diebold Election Systems, et al*, Defendants; United States Eastern District of Missouri Eastern Division: Case No. 4:06-cv-00978 TCM, Jun. 15, 2007, Document 198, 34 pages.
Motion for Leave to File Suggestions in Support of Defendant Election Systems & Software Inc.'s Motion for Partial Summary Judgment and Diebold Election Systems Suggestions in Support of Defendant Election Systems & Software Inc. Motion for Partial Summary Judgment of Invalidity of Certain Claims of the '944 Patent (with Exhibit), *Avante International Technology Corporation*, Plaintiff, v. *Diebold Election Systems, et al*, Defendants; United States Eastern District of Missouri Eastern Division: Case No. 4:06-cv-00978 TCM, Aug. 1, 2007, Document 259, 171 pages.
Plaintiff's Opposition to Election Systems & Software Inc.'s Motion for Partial Summary Judgment of Invalidity of Certain Claims of the '944 Patent, *Avante International Technology Corporation*, Plaintiff, v. *Diebold Election Systems, et al*, Defendants; United States Eastern District of Missouri Eastern Division: Case No. 4:06-cv-00978 TCM, Aug. 6, 2007, Document 266, 204 pages.
Memorandum and Order on Claim Construction, *Avante International Technology Corporation*, Plaintiff, v. *Diebold Election Systems, et al*, Defendants; United States Eastern District of Missouri Eastern Division: Case No. 4:06-cv-00978 TCM, Aug. 20, 2007, Document 276, 50 pages.
Defendant Hart Intercivic, Inc.'s Preliminary Invalidity Contentions for U.S. Patent Nos. 6,892,944, 7,036,730, and 7,077,313, *Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJPp, Sep. 10, 2007, 49 pages.
Content Listing of Hart Intercivic's Invalidity Contentions, Exhibit F (disk), *Avante International Technology Corporation*, Plaintiff and Counter-Defendant, v. *Hart Intercivic, Inc.*, Defendant and Counter-Plaintiff; United States Southern District of Illinois East St. Louis Division: Case No. 3:07-cv-00169-DRH-CJP, Sep. 10, 2007, 3 pages.
Sequoia Voting Systems' Updated Invalidity Contentions, *Avante International Technology Corporation*, Plaintiff, v. *Premier Election Solutions, et al*, Defendants; United States Eastern District of Missouri Eastern Division: Case No. 4:06-cv-00978 TCM, Oct. 22, 2007, 42 pages.
Premier Election Solution, Inc.'s Invalidity Contentions for the '944 and '313 Patents, *Avante International Technology Corporation*, Plaintiff, v. *Premier Election Solutions, et al*, Defendants; United States Eastern District of Missouri Eastern Division: Case No. 4:06-cv-00978 TCM, Oct. 23, 2007, 39 pages.
Defendant Election Systems & Software, Inc.'s Updated Invalidity Contentions, *Avante International Technology Corporation*, Plaintiff, v. *Premier Election Solutions, et al*, Defendants; United States Eastern District of Missouri Eastern Division: Case No. 4:06-cv-00978 TCM, Oct. 22, 2007, 32 pages.
Defendant's Premier Election Solutions, Inc. and Election Systems & Software, Inc.'s Memorandum of Law in Support of its Motion for Summary Judgement of Non-Infringement on Claims 26-28, 30 and 49-51 of U.S. Patent No. 6,892,944, *Avante International Technology Corporation*, Plaintiff, v. *Premier Election Solutions, et al*, Defendants; United States Eastern District of Missouri Eastern Division: Case No. 4:06-cv-00978 TCM, Document 334, Nov. 2, 2007, 14 pages.
Memorandum in Support of Defendants' Joint Motion for Summary Judgement of Invalidity of Claims 26-28, 30 and 49-51 of U.S. Patent No. 6,892,944, *Avante International Technology Corporation*, Plaintiff, v. *Premier Election Solutions, et al*, Defendants; United States Eastern District of Missouri Eastern Division: Case No. 4:06-cv-00978 TCM, Document 337, Nov. 2, 2007, 20 pages.
Memorandum in Support of Defendants' Joint Motion for Summary Judgement of Invalidity of the Asserted Claims from U.S. Patent Nos. 6,892,944 and 7,077,313 Under 35 U.S.C. §§ 102 and 103, *Avante International Technology Corporation*, Plaintiff, v. *Premier Election Solutions, et al*, Defendants; United States Eastern District of Missouri Eastern Division: Case No. 4:06-cv-00978 TCM, Document 339, Nov. 2, 2007, 26 pages.
Statement of Uncontroverted Material Facts in Support of Defendants' Joint Motion for Summary Judgment that U.S. Patent Nos. 6,892,944 and 7,077,313 Are Invalid Under 35 U.S.C. §§ 102 and 103, *Avante International Technology Corporation*, Plaintiff, v. *Premier Election Solutions, et al*, Defendants; United States Eastern District of Missouri Eastern Division: Case No. 4:06-cv-00978 TCM, Document 340, Nov. 2, 2007, 192 pages.
Statement of Uncontroverted Material Facts in Support of Defendants' Election Systems and Software Inc. And Premier Election Solutions, Inc.'s Motion for Summary Judgment of Non- Infringement of Claims 26-28, 30 and 49-51 of U.S. Patent 6,892,944, *Avante International Technology Corporation*, Plaintiff, v. *Premier Election Solutions, et al*, Defendants; United States Eastern District of Missouri Eastern Division: Case No. 4:06CV00978 TCM, Document 333, Nov. 2, 2007, 29 pages.
Statement of Uncontroverted Material Facts in Support of Defendants' Joint Motion for Summary Judgment of Invalidity of Claims 26-28, 30 and 49-51 of U.S. Patent No. 6,892,944, *Avante International Technology Corporation*, Plaintiff, v. *Premier Election Solutions, et al*, Defendants; United States Eastern District of Missouri Eastern Division: Case No. 4:06CV00978 TCM, Document 336, Nov. 2, 2007, 95 pages.
Motion for Summary Judgment of Invalidity of the Asserted Claims from U.S. Patent Nos. 6,892,944, and 7,077,313 Under 35 U.S.C. §§ 102 and 103, *Avante International Technology Corporation*, Plaintiff, v. *Premier Election Solutions, et al*, Defendants; United States Eastern District of Missouri Eastern Division: Case No. 4:06CV00978 TCM, Document 338, Nov. 2, 2007, 3 pages.
Declaration of Michael I. Shamos, Ph.D., J.D. In Support of Defendants' Joint Motion for Summary Judgment that U.S. Patent Nos. 6,892,944, and 7,077,313 are Invalid Under 35 U.S.C. §§ 102(b) and 103(a), *Avante International Technology Corporation*, Plaintiff, v. *Premier Election Solutions, et al*, Defendants; United States Eastern District of Missouri Eastern Division: Case No. 4:06CV00978 TCM, Document 342, Nov. 2, 2007, 332 pages.
Plaintiff Avante International Technology, Corporation's Memorandum in Opposition to Defendants' Joint Motion for Summary Judgment of Invalidity of Claims 26-28, 30 and 49-51 of U.S. Patent No. 6,892,944, *Avante International Technology Corporation*, Plaintiff, v. *Premier Election Solutions, et al*, Defendants; United States Eastern District of Missouri Eastern Division: Case No. 4:06CV00978 TCM, Document 388, Dec. 14, 2007, 180 pages.
Defendants' Response to Plaintiff Avante International Technology Corporation's Statement of Uncontroverted Facts in Support of its Motion for Summary Judgment that U.S. Patent Nos. 6,892,944 and 7,077,313 are not Invalid, in View of Defendants' References or 35 U.S.C. §112 Arguments, *Avante International Technology Corporation*, Plaintiff, v. *Premier Election Solutions, et al*, Defendants; United States Eastern District of Missouri Eastern Division: Case No. 4:06CV00978 TCM, Document 395, Dec. 14, 2007, 90 pages.
Premier Voting Solutions, Inc.'s Memorandum in Opposition to Avante International Technology Corporation's Motion for Summary Judgment that Premier Election Solutions, Inc.'s Equipment Infringes U.S. Patent Nos. 6,892,944 and 7,077,313, *Avante International Technology Corporation*, Plaintiff, v. *Premier Election Solutions, et al*, Defendants; United States Eastern District of Missouri Eastern Division: Case No. 4:06CV00978 TCM, Document 396, Dec. 14, 2007, 10 pages.
Sequoia Voting Systems' Opposition to Plaintiff's Motion for Summary Judgment that Sequoia's Equipment Infringes U.S. Patent Nos. 6,892,944 and 7,077,313, *Avante International Technology Corporation*, Plaintiff, v. *Premier Election Solutions, et al*, Defendants; United States Eastern District of Missouri Eastern Division: Case No. 4:06CV00978 TCM, Document 417, Jan. 9, 2008, 151 pages.
Avante International Technology Corporation's Reply in Support of its Motion for Summary Judgment that Diebold Election Systems, Inc.'s Equipment Infringes U.S. Patent Nos. 6,892,944 and 7,077,313, *Avante International Technology Corporation*, Plaintiff, v. *Premier Election Solutions, et al*, Defendants; United States Eastern District of Missouri Eastern Division: Case No. 4:06CV00978 TCM, Document 425, Jan. 11, 2008, 14 pages.
Defendants' Reply in Support of Their Joint Motion for Summary Judgment of Invalidity of Claims 26-28, 30 and 49-51 of U.S. Patent No. 6,892944 Based on 35 U.S.C. §112 ¶ 1, *Avante International Technology Corporation*, Plaintiff, v. *Premier Election Solutions, et al*, Defendants; United States Eastern District of Missouri Eastern Division: Case No. 4:06CV00978 TCMm, Document 428, Jan. 11, 2008, 101 pages.
Defendants Premier Election Solutions, Inc. And Election Systems & Software, Inc.'s Reply in Support of Their Motion for Summary Judgment of Non-Infringement of Claims 26-28, 30 and 4951 of U.S. Patent No. 6,892,944, *Avante International Technology Corporation*, Plaintiff, v. *Premier Election Solutions, et al*, Defendants; United States Eastern District of Missouri Eastern Division: Case No. 4:06CV00978 TCM, Document 429, Jan. 11, 2008, 17 pages.
Defendant Hart Intercivic, Inc.'s Response to Plaintiff's Claim Construction Brief for U.S. Patent Nos. 6,892,944, 7,036,730, and 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 58, Feb. 1, 2008, 304 pgs.
Avante International Technology, Inc.'s Reply in Support of its Claim Construction Brief for U.S. Patent No. 7,036,730, U.S. Patent No. 6,892944, and U.S. Patent No. 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 60, Feb. 8, 2008, 71 pgs.
Avante International Technology, Inc.'s Claim Construction Brief for U.S. Patent no. 7,036,730, U.S. Patent No. 6,892,944, and U.S. Patent No. 7,077,313, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 57, Jan. 18, 2008, 364 pgs.
Declaration of Peter G. Martin Filed in Support of Defendants' Joint Motion for Summary Judgment of Invalidity of the Asserted Claims from U.S. Patent Nos. 6,892,944 and 7,077,313 Under 35 U.S.C. §§ 102 and 103, *Avante International Technology Corporation*, Plaintiff, v. *Premier Election Solutions, et al*, Defendants; United States Eastern District of Missouri Eastern Division: Case No. 4:06CV00978 TCM, Document 341, Nov. 2, 2007, 105 pages.
Defendants' Memorandum in Opposition to Avante International Technology Corporation's Motion for Summary Judgment that U.S. Patent Nos. 6,892944 and 7,077,313 Are Not Invalid in View of Defendants' References or 35 U.S.C. § 112 Arguments, *Avante International Technology Corporation*, Plaintiff, v. *Premier Voting Solutions, Inc., et al*, Defendants; United States Eastern District of Missouri Eastern Division: Case No. 4:06CV00978 TCM, Document 394, Dec. 14, 2007, 199 pages.
Defendant Premier Voting Solutions, Inc.'s Response to Statement of Uncontroverted Facts in Support of Avante International Technology Corporation's Motion for Summary Judgment that Premier Voting Solutions, Inc. Equipment Infringes U.S. Patent Nos. 6,892,944 and 7,077,313 and Additional Facts in Support of Its Opposition to Avante's Motion for Summary Judgement, *Avante International Technology Corporation*, Plaintiff, v. *Premier Voting Solutions, Inc., et al*, Defendants; United States Eastern District of Missouri Eastern Division: Case No. 4:06CV00978 TCM, Document 399, Dec. 15, 2007, 197 pgs.
Defendants' Response to Avante International Technology Corporation's Statement of Material Facts in Support of Its Opposition to Defendants' Joint Motion for Summary Judgment That U.S. Patent Nos. 6,892944 and 7,077,313 Are Invalid Under 35 U.S.C. §§ 102 and 103, *Avante International Technology Corporation*, Plaintiff, v. *Premier Voting Solutions, et al*, Defendants; United States Eastern District of Missouri Eastern Division: Case No. 4:06CV00978 TCM, Document 430, Jan. 11, 2008, 68 pages.
Defendants' Reply in Support of Their Joint Motion for Summary Judgment of Invalidity of the Asserted Claims From U.S. Patent Nos. 6,892,944 and 7,077,313 Are Invalid Under 35 U.S.C. §§ 102 and 103, *Avante International Technology Corporation*, Plaintiff, v. *Premier Election Solutions, et al*, Defendants; United States Eastern District of Missouri Eastern Division: Case No. 4:06CV00978 TCM, Document 431, Jan. 11, 2008, 66 pages.
Notice of Allowance of U.S. Appl. No. 11/709,449 which has Bearing on Pending Summary Judgement Motions, *Avante International Technology Corporation*, Plaintiff, v. *Premier Voting Solutions, et al*, Defendants; United States Eastern District of Missouri Eastern Division: Case No. 4:06CV00978 TCM, Document 467, Mar. 18, 2008, 4 pages.
Defendants' Memorandum Regarding Plaintiff's Notice, *Avante International Technology Corporation*, Plaintiff, v. *Premier Voting Solutions, et al*, Defendants; United States Eastern District of Missouri Eastern Division: Case No. 4:06CV00978 TCM, Document 469, Mar. 24, 2008, 6 pages.
Avante's Response to Defendant's Memorandum, *Avante International Technology Corporation*, Plaintiff, v. *Premier Voting Solutions, et al*, Defendants; United States Eastern District of Missouri Eastern Division: Case No. 4:06CV00978 TCM, Document 470, Mar. 26, 2008, 3 pages.
Defendant's Supplemental Responses and Objections to Plaintiff's First Requests for Admission, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Document 102, Jun. 4, 2008, 6 pages.
Defendant's Supplemental Responses to Plaintiff's First Set of Interrogatories, *Avante International Technology, Inc.*, Plaintiff, v. *Hart Intercivic, Inc.*, Defendant; United States Southern District of Illinois East St. Louis Division: Case No. 3:07-cv-00169-DRH-CJP, Jun. 4, 2008, 88 pgs.
Premier Election Solutions, Inc.'s Response to Plaintiff's Fourth Set of Interrogatories, *Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 16 pages.
Response to Plaintiff's Fifth Set of Interrogatories to Defendant Election Systems and Software, *Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 15 pages.
Sequoia Voting Systems' Objections and Response to Plaintiff's Sixth Set of Interrogatories, *Avante International Technology Corporation*, Plaintiff, v. *Premier Election Solutions, et al*, Defendants; United States Eastern District of Missouri Eastern Division: Case No. 4:06CV00978 TCM, Jul. 15, 2008, 10 pages.
Memorandum and Order, *Avante International Technology Corporation*, Plaintiff, v. *Premier Election Solutions, et al*, Defendants; United States Eastern District of Missouri Eastern Division: Case No. 4:06CV00978 TCM, Document 486, Jul. 16, 2008, 33 pages.
Written Report of John D. Bakker, *Avante International Technology Corporation*, Plaintiff, v. *Premier Election Solutions, et al*, Defendants; United States Eastern District of Missouri Eastern Division: Case No. 4:06CV00978 TCM, Sep. 5, 2008, 8 pages.
Report of J. Michael Thesz, Pursuant to Rule 26, Federal Rules of Civil Procedure, *Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 48 pages.
Report of Peter G. Martin, *Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 35 pages.
Report of Defendants' Expert Michael Ian Shamos, Ph.D., J.D. Concerning Inequitable Conduct, *Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 15 pages.
Report of Defendants' Expert Michael Ian Shamos, Ph.D., J.D. Concerning Invalidity, *Avante International Technology Corporation*, Plaintiff, v. *Premier Election Solutions, et al*, Defendants; United States Eastern District of Missouri Eastern Division: Case No. 4:06CV00978 TCM, Sep. 9, 2008, 53 pages.
Premier Election Solutions, Inc.'s Supplemental Responses Avante's Interrogatories, *Avante International Technology Corporation*, Plaintiff, v. *Premier Election Solutions, et al*, Defendants; United States Eastern District of Missouri Eastern Division: Case No. 4:06CV00978 TCM, Sep. 11, 2008, 9 pages.
Supplemental Responses to Interrogatory Nos. 1, 2, 3, 4 and 20 from Plaintiff's Interrogatories to Defendant Election Systems and Software, *Avante International Technology Corporation*, Plaintiff, v. *Premier Election Solutions, et al*, Defendants; United States Eastern District of Missouri Eastern Division: Case No. 4:06CV00978 TCM, Sep. 17, 2008, 9 pages.
Plaintiff Election Systems & Software, Inc.'s Answers to Defendant's First Set of Interrogatories to Plaintiff, *Election Systems & Software, Inc.*, Plaintiff, v. *Avante International Technology Corporation*, Defendant; United States Eastern District of Missouri Eastern Division: Case No. 4:08-CV-695-TCM, Sep. 22, 2008, 46 pages.
Supplemental Report of Defendant's Expert Michael I. Shamos, Ph.D., J.D. Concerning Invalidity, *Avante International Technology Corporation*, Plaintiff, v. *Premier Election Solutions, et al*, Defendants; United States Eastern District of Missouri Eastern Division: Case No. 4:06CV00978 TCM, Nov. 6, 2008, 8 pages.
Exhibit 4 to Defendants' Expert Report on Invalidity, Invalidity Analysis of Chung at al. '944 and '313, *Avante International Technology Corporation*, Plaintiff, v. *Premier Election Solutions, et al*, Defendants; United States Eastern District of Missouri Eastern Division: Case No. 4:06CV00978 TCM, Nov. 6, 2008, 6 pages.

* cited by examiner

OPTICALLY READABLE MARKING SHEET AND READING APPARATUS AND METHOD THEREFOR

This application claims the benefit of U.S. Provisional Application Ser. No. 61/128,224 entitled "Counterfeit Ballot Detection and Integrated Ballot Marking Device and Machine Confirmation System for Voters"filed May 20, 2008, and of U.S. Provisional Application Ser. No. 61/130,664 entitled "Counterfeit Ballot Detection and Integrated Ballot Marking and Machine Confirmation System for Voters" filed Jun. 2, 2008, each of which is hereby incorporated herein by reference in its entirety. This application also claims the benefit of U.S. Provisional Application Ser. No. 61/125,947 entitled "Counterfeit Ballot Detection and Integrated Ballot Marking Device and Machine Confirmation System for Voters" filed Apr. 30, 2008.

The present invention relates to an optically readable marking sheet and, in particular, to a marking sheet having an anti-copy region and to an apparatus and method for reading such optically readable marking sheet. Such optically readable marking sheets are useful as ballots and with an apparatus and method for reading such optically readable ballots.

The prevention of fraud in voting is of the greatest importance because the integrity and validity of an election are fundamental to public support of the election process and its result. Various types and kinds of voting fraud are known, including duplicate or plural voting, false registrations, duplicate ballots, vote buying, and the like. All have particular characteristics and may be countered by various election technology and safeguards.

In certain settings, voting fraud by the substitution of fraudulent paper ballots for actual paper ballots is a real problem. In this type of fraud, copies are made of authentic paper ballots and are marked (voted) by the perpetrator(s) of the voting fraud, and are then placed into ballot boxes or other places in addition to and/or in place of actual voted ballots that have been removed therefrom. With conventional paper ballots, including conventional optically scanned ballots and other machine-readable ballots, such substitution is largely undetected and/or undetectable.

Accordingly, there is a need for a machine readable ballot that includes features facilitating the detection of the use of copied ballots, and for machine readers and methods for detecting those ballots that are copies of original and/or authentic ballots.

To this end, a machine readable ballot or sheet may comprise a ballot or sheet having an anti-copying feature provides for detecting from an image of the ballot or sheet whether the ballot or sheet is an original or is a copy. The anti-copying feature may lighten or darken, or both, when copied and may or may not be evident to the human eye. A reader comprising an imager and a processor is for reading the ballot or sheet and for determining whether the ballot or sheet is an original or is a copy, and for determining selections marked thereon. A method for reading the ballot or sheet is for determining from an image of the ballot or sheet whether the ballot or sheet is an original or is a copy, and for determining selections marked thereon.

BRIEF DESCRIPTION OF THE DRAWING

The detailed description of the preferred embodiment(s) will be more easily and better understood when read in conjunction with the FIGURES of the Drawing which include:

FIG. 1 is a schematic diagram illustrating an example ballot intended to be read by an optical reader, wherein

FIG. 2 including

Figure 1A:
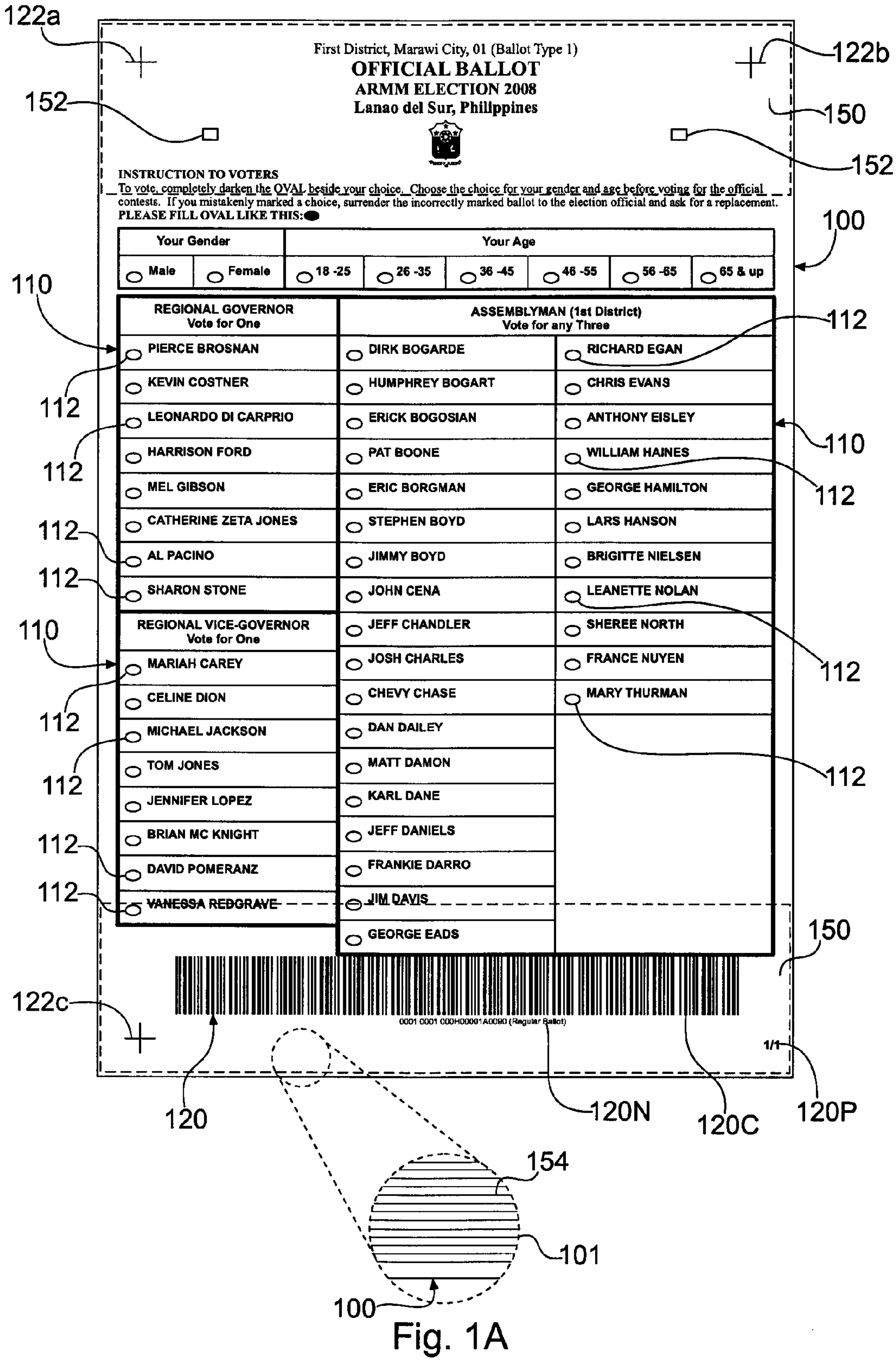
FIG. 1A illustrates an original ballot and FIG. 1B illustrates a copy of the original ballot.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

The marking sheet of the present arrangement employs at least one copy-evident region that appears substantially darker or substantially lighter in a copy of the original marking sheet, e.g., in a photocopy, than it appears in the original marking sheet. The apparatus and method of the present arrangement for reading such marking sheet operate to process an image of the marking sheet for determining whether the marking sheet imaged is an original marking sheet or is a copy thereof. Although the example of a marking sheet described is a ballot sheet as for an election, and the apparatus and method described process the ballots for determining an election outcome, that is one utilization of the present arrangement in which the marking sheet may be for any purpose and the method and apparatus may operate for any purpose.

Figure 1B:
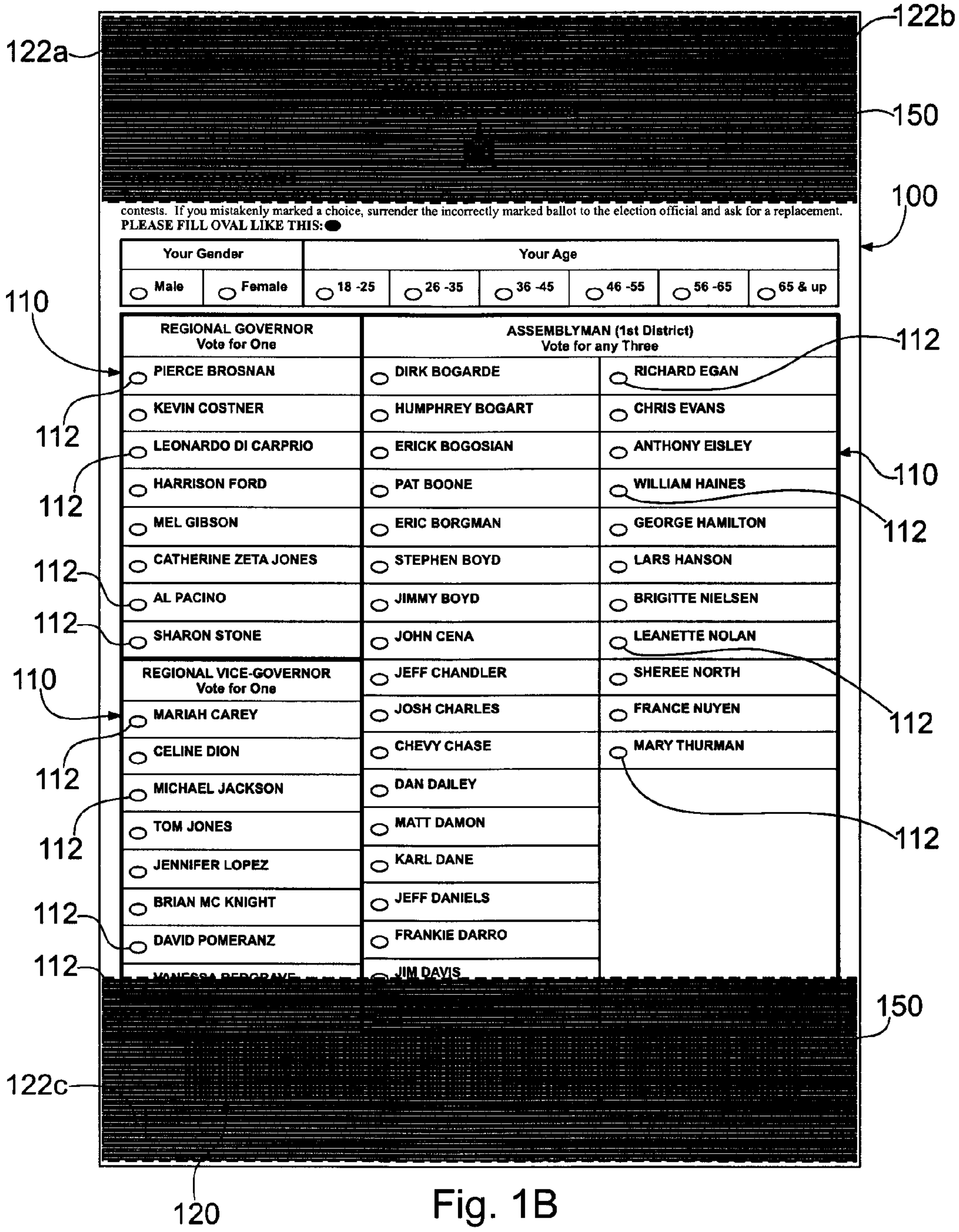

FIG. 1 is a diagram illustrating an example ballot 100 intended to be read by an optical reader, wherein FIG. 1A illustrates an original ballot 100 and FIG. 1B illustrates a copy 100' of the original ballot 100. Ballot 100 includes three regions 110 each containing information pertaining to a particular election contest or question and a number of marking regions or mark spaces 112 therein in which a voter makes a mark to select one or more voting selections for the particular election contest or question. Mark spaces 112 may be any convenient closed shape and provide a defined area in a defined location in which a voter marks his voting selections by darkening or otherwise marking therein. Mark spaces 112 are typically indicated by an outline in the shape of a circle, oval, rectangle, square or other desired closed shape. After the ballot 100 is marked by the voter, it is voted (e.g., deposited in a ballot box or otherwise submitted) and is read and tabulated, typically by a reading machine or reader that optically reads or senses the defined mark spaces to determine whether each mark space 112 is marked or unmarked, thereby indicating a voting selection. The reading machine is programmed to define a "template" corresponding to the locations on the ballot where each of the contests/questions 110 and the respective mark spaces 112 therefor are located.

In the example illustrated, a first region 110 designated "Regional Governor" contains the names and other information affiliations of candidates for the office "Regional Governor" and a mark space 112 for each candidate or set of candidates. A second region 110 designated "Regional Vice-Governor" contains the names and other information of candidates for "Regional Vice-Governor" and a mark space 112 for each candidate. A third region 110 designated "Assemblyman (1$^{st}$ District)" contains the names and other information of candidates for "Assemblyman (1$^{st}$ District") and a mark space 112 for each candidate. Any or all of voting regions 110 may include one or more optional mark spaces 112 for a "Skip Contest" or "No Vote" (abstain) selection and/or for a write-in candidate selection.

In addition, each ballot includes a ballot identifier 120, also known as a ballot identifier number or sheet identification number, abbreviated herein as "BID." Identifier or BID 120 is preferably located at a predefined location on ballot 100, e.g., near the bottom edge as illustrated. BID 120 may be provided in any convenient machine readable format, including but not limited to a bar code, two-dimensional bar code, a prescribed font, optical character recognition (OCR) characters, alphanumeric characters, non-alphanumeric characters, symbols, and the like. Typically, however, a human-readable number 120N and an equivalent machine-readable bar code 120C are employed, although either would be satisfactory.

Each sheet or ballot 100 also includes one or more regions 150 for assisting in distinguishing an original marking sheet (ballot) 100 from a copy thereof, e.g., a copy made on a photocopy machine or other document reproduction device. Example ballot 100 has two "anti-copy" regions 150, one in a band across the top of sheet 100 and a second in a band across the bottom of sheet 100. Preferably, one or more marks and/or mark spaces of sheet 100 that are necessary for the proper reading and processing of information marked on sheet 100 are located within region or regions 150. Anti-copy regions 150 may encompass part of ballot 100 as illustrated, or may encompass essentially all of ballot 100.

In the illustrated example, sheet or ballot 100 includes a sheet or ballot identifier 120 that is, e.g., located on sheet 100 within anti-copy region 150 along the bottom edge thereof. Because this identifier 120 is utilized in processing information determined from an image of sheet 100, it is necessary that identifier 120 be both machine readable and that sheet 100 be an original for a proper imaging and reading thereof to be obtained. Identifier 120 is typically utilized to identify a template defining the particular information that is to be marked on sheet 100 and the arrangement thereof on sheet 100, and may take the form shown and described herein in relation to FIG. 2.

In the illustrated example, sheet 100 includes a plurality of orientation indicia or fiducial marks 122, e.g., fiducial mark 122*a* near the upper left corner, fiducial mark 122*b* near the upper right corner, and fiducial mark 122*c* near the lower left corner. Although only one indicia or fiducial mark 122 is necessary to define ballot orientation, e.g., for reading from an image provided by an automatic ballot reader, plural (at least two or more) indicia or fiducial marks 122 are preferred so that the orientation of ballot 100 may be determined even when ballot 100 is not properly and precisely aligned. Optionally the scale of the ballot may also be determined from fiducial marks 122. Thus, fiducial marks 122 when read from an image of sheet 100 allow for the orientation and scale of sheet 100 to be determined, so that a proper reading of the information marked on sheet 100 may be determined from the image thereof.

In particular, orientation indicia or fiducial marks 122*a*, 122*b* and 122*c* define the orientation of ballot 100 and, because the predetermined positional locations of indicia or fiducial marks 122*a*, 122*b* and 122*c* are precisely known, i.e. they are spaced apart a predetermined distance, orientation indicia/fiducial marks 122 also define the scale and/or size of ballot 100. Further, each mark space 112 is in a predetermined position relative to indicia or fiducial marks 122, and so the relative locations of all mark spaces 112, as well as any other location on ballot 100, can be determined from fiducial marks 122, whether or not a mark space 112 has been marked. Where ballots 100 are imaged, the positions of each indicia/fiducial mark 122 and of each mark space 112 is defined in the same coordinate system as are the pixels of the ballot image, e.g., in X-Y coordinates, thereby to facilitate the "reading" of the ballot via its ballot image, e.g. to determine which mark spaces 112 are marked to indicate a voting selection.

Comparing the predetermined relative positions and/or spacings of indicia or fiducial marks 122 with the imaged positions thereof permits the scale/size of the ballot image and the position of each mark space 112 to be determined. This is helpful for normalizing the ballot image provided by the ballot reader as well as for locating the proper positions of ballot identifier 120 and of marking areas 112 as defined by the appropriate ballot template. Scaling and/or normalizing the size of the ballot image can be utilized to compensate for small changes in the size of ballots, e.g., due to stress, moisture content and the like, thereby to avoid any inaccuracy that might otherwise result therefrom.

Suitable indicia or fiducial marks include, for example, cross-hair lines, cross-hair lines in a circle, targets, bulls-eye shapes, bullets, "+" marks, "X" marks, boxes, any of the foregoing with one or more black, darkened or contrasting adjacent sections, and/or any combination thereof. Symmetrical indicia or fiducial marks that uniquely define their own center are preferred. Indicia or fiducial marks 122 and/or the pattern thereof may be standardized for all ballots and/or may be different for different ballots and defined by the ballot template therefor. Indicia or fiducial marks 122 may located be any location(s) suitable for defining the orientation, and preferably also defining the scale/size, of ballot 100. To this end, an odd-number of indicia or fiducial marks 122 disposed in an asymmetric pattern are preferred. Where a two-sided or plural sheet ballot is utilized, each sheet and/or side would typically include marking indicia or fiducial marks 122.

In addition, where a ballot is too long to be provided on one ballot sheet, plural sheets may be provided with a page number identifier 120P on each sheet that is read and utilized to select the proper ballot sheet template or to determine the portion of a selected ballot template applicable to each ballot sheet. Preferably, page number identifiers are human-readable and machine-readable, such as a numeral in a font easily read by a computer reader. Further, so-called "summary" ballots may be utilized wherein the candidates and questions are provided in a booklet, and each candidate and/or response is identified in the booklet by a number; in this case, the mark spaces 112 of the summary ballot are each associated with one of the numbers set forth in the booklet. In addition, a candidate name and/or response selection (e.g., a "yes" or "no") may be printed on the summary ballot with the number.

Also located on sheet 100 within anti-copy region 150 are optional mark spaces 152 in the anti-copy region 150 at the top of sheet 100 which can be a test mark space or any other feature the detection of which assists in determining whether the sheet 100 imaged is an original or is a copy. In addition, the page number 120P may be located within the anti-copy region 150 at the bottom of sheet 100 and may be styled in an "N/M" format for indicating a page number N of a document having M pages. The presence of one or more of such marks within anti-copy regions 150 may also assist in determining whether the sheet 100 presented for imaging is an original sheet 100 or is a copy thereof.

As can be seen by comparing the original sheet 100 as depicted in FIG. 1A with the copied sheet 100' as depicted in FIG. 1B, the darkening of the example anti-copy regions 150 clearly indicates that the sheet 100' of FIG. 1B is a copy. This is a direct result of the substantial darkening of the anti-copy regions 150 in the copy 100' as compared to the original sheet 100, which tends to make the ballot identifier 120, the fiducial marks 122 and the mark spaces 152 difficult to read in the copy 100'. Likewise, when the sheets 100 are imaged, the darkened anti-copy regions 150 in the copied sheet 100' substantially reduce the numbers of light pixels in the image of sheet 100 and tend to make the dark elements of identifier 120, of spaces 152 and the like less distinguished from the darker background of regions 150. This cooperates with the light and dark pixel counting method described below to allow a copy 100' of a sheet 100 having an anti-copy region 150 to be detected.

As used herein, an "anti-copy" region or feature refers an area or region in which are printed and/or other features that appear with a given intensity when viewed in an original sheet, but that appear with substantially lighter intensity, or with substantially darker intensity, or partially with substantially lighter intensity and partially with substantially darker intensity, in a copy of an original sheet or in an image of the copy of the original sheet or in both. Thus other information printed in the anti-copy region will be readily readable by a human and by a machine in the original sheet and the anti-copy region will appear substantially different, e.g., lighter or darker, to a human and to a machine in a copy of the original sheet, and may even be unreadable in the copy. For automated copy detection, the evidence of copying in the anti-copying region will be distinguishable by a machine, e.g., the imager and image processing, but need not be evident to the human eye. Similarly, in an image of the sheet made with an optical scanner intended to image such sheet, information printed and/or marked in the anti-copy region will be determinable from an image thereof, however, the fact that a copy of the original has been imaged will also be determinable by such scanner or imager or by processing the image therefrom, or both.

Suitable anti-copy features include any feature that appears substantially lighter, or substantially darker, or partially substantially lighter and partially substantially darker, or that is substantially distorted, in a copy of an original document relative to the original thereof. Examples of anti-copy features may include, e.g., holograms (e.g., as labels, tapes, foils, paper, and the like), micro-embossed holograms, photo-polymer holograms, holographic and other light diffractive regions, holograms with or without over printing, diffractive optical variable image devices (DOVID), diffractive materials, specialized light reflecting and/or absorbing inks, color-shifting inks, specialized light reflecting tints, infra-red inks, light intensity responsive variable inks and tints, embedded graphics and/or images and/or text, line-screen patterns having particular combinations of line frequencies and/or print densities, latent images and/or line-screen patterns on a tinted or other background, latent line-screen pattern images embedded in a different line-screen pattern, lines printed at one or more interference scanning frequencies, laser moiré interference patterns, micro perforations, hidden messages and/or images, as well as combinations of any one or more of the foregoing.

In the illustrated ballot 100, the anti-copy feature of region 150 comprises a pattern of light features, e.g., thin, light, generally parallel lines 154 as may be seen in the expanded view provided in bubble 101 at the bottom of FIG. 1A, which lines 154 are generally difficult to see in original ballot 100 but are substantially darker in a copy 100' of ballot 100 as illustrated in FIG. 1B. While generally parallel horizontal lines are illustrated therein, any suitable pattern, including but not limited to, lines (which may be straight or curved or solid or broken or any combination thereof, and which may be generally horizontal or vertical or anywhere in between or may be a combination thereof), or characters or symbols, or any other desired pattern(s), may be employed.

In a preferred embodiment, a combination of at least two different anti-copy features is employed, and preferably the two different anti-copy features respond differently to being copied and/or interact differently when imaged. For example, a combination of light horizontal and vertical lines that darken substantially in a photocopy may be employed, and may be positioned in the region 150 of barcode 120C so as to render the barcode unreadable in the copy. Alternatively, a combination of light lines that photocopy as dark lines and a pattern printed with an ink (e.g., an infrared ink or a color shifting ink) that does not photocopy, but that is detectable by a the imager to be utilized, may be employed, so that even if the copying process were manipulated to minimize the change in the light line anti-copy feature, the latter anti-copy feature would be missing entirely in a copy.

Figure 2A:
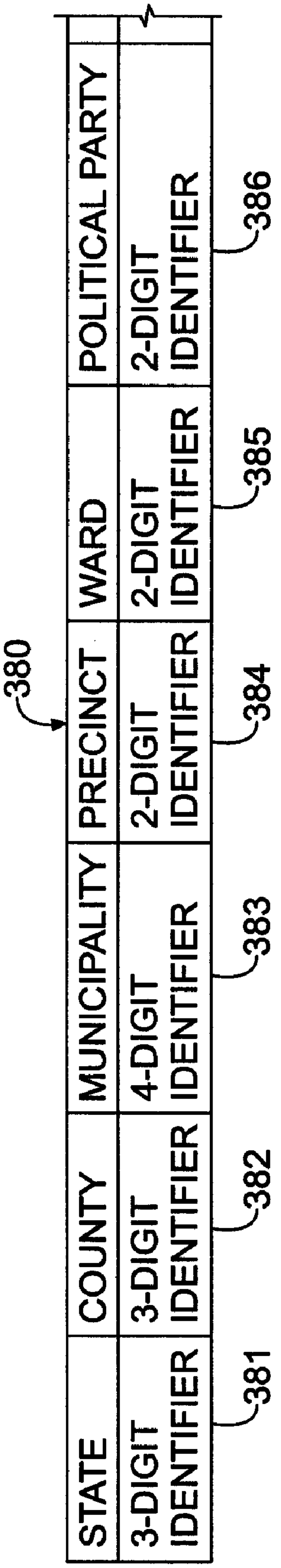
FIGS. 2A and 2B is a schematic diagram illustrating an example format for a ballot identifier (BID)
Figure 2B:
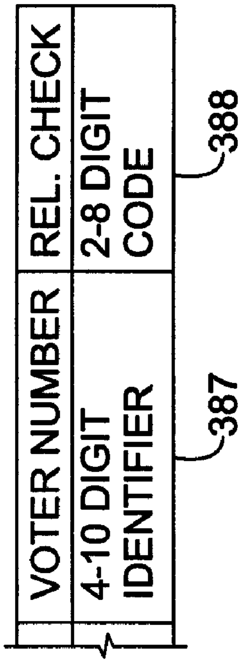

FIG. 2 is a schematic diagram illustrating an example format 380 for a ballot identifier (BID) 120. BID 120 is a sequence of numbers or other alphanumeric characters or symbols that uniquely identify a ballot and provide voting information relating to the ballot or a voter that may be utilized by a voting machine or by a ballot reading machine or by election officials. Example BID format 380 includes, for example, six different informational fields 381-386. Field 381 includes a number of characters, typically 3, that uniquely identify the state to which the ballot pertains and field 382 includes a number of characters, typically 3, that uniquely identify the county to which the ballot pertains. Fields 381-386 may be used for automatic reading and tabulation of different ballots without manual or other sorting prior to their being read and tabulated, as well as for absentee and provisional voting. While a three-digit numerical field is typical, providing up to 999 different entries, two-digit fields may be utilized where a lesser number (i.e. 99 or less) of possible entries are needed, as in the United States where there are only 50 states. Any field may be of greater or lesser number of characters as is convenient.

Field 383 includes a number of characters, typically 4, that uniquely identify the municipality to which the ballot pertains. Field 384 includes a number of characters, typically 2, that uniquely identify the voting precinct or district within the county or municipality to which the ballot pertains, and field 385 includes a number of characters, typically 2, that uniquely identify the voting ward, if any, within the voting precinct or district to which the ballot pertains. Field 386 includes a number of characters, typically 2, that uniquely identify the political party affiliation to which the ballot pertains if any has been declared and may be utilized for presenting the ballot of the declared political party for voting in a party primary election or for straight party voting, where permitted.

Field 387 includes a number of characters, typically 4-10, that uniquely identifies the particular ballot in the applicable county, voting precinct, district and/or ward, as the case may be. The random generated number, field 387, is a randomly-generated unique identifier that is printed on a ballot prior to the election, and may or may not be traceable to the identity of a particular voter or voting machine, as desired for security and privacy. The same unique identifiers as are printed on paper ballots, e.g., for absentee and/or provisional voting, may be stored in a voting machine or in a vote tabulating machine for verifying the authenticity and uniqueness of ballot when it is tabulated.

Ballot identifier 380 may also include an optional relational check number in field 388 that is a calculated or coded value representative of the entire BID, e.g., fields 381-387, or of particular fields thereof, and that relational check number may be verified by either recalculating or recoding it from the appropriate fields or by table look up. The relational check number may be included in a particular field, e.g., field 387, or may be in an additional designated field 388. The calculation or coding process for producing the relational check number can be closely held in confidence within an official election entity or organization and is not information that is available to the public, and so some degree of security is provided thereby. Relational check numbers are also described in the present inventor's U.S. Pat. No. 6,961,000 entitled "SMART TAG DATA ENCODING METHOD" which is hereby incorporated by reference herein in its entirety. It is noted that while the field data and the relational check number or code are referred to as "numbers," each may include numerical, alphabetic, alpha-numeric and other characters and symbols, conventional or arbitrary, as may be desired. The relational check number or code is representative of the information contained in the ballot identifier (or a part thereof) in accordance with a predetermined formula or algorithm or other scheme, either on a character by character basis or on the basis of one or more combinations of the characters or values stored in the memory. Suitable formula and algorithms include, for example, parity checks or other parity representations, sum checks, field relationship checks or any other predetermined relationship between the BID field data and the relational check number.

In the United States, voting is typically conducted on a state by state basis, and most states delegate to its counties the conduct of elections. In local voting, i.e. voting wherein a particular voting machine is dedicated for voting by voters of a particular county, municipality, precinct, district or ward, fields 382-385 may be utilized by the voting machine or vote tabulating machine to verify that the voter is using the proper ballot form before the voting session is initiated and/or before the voting selections marked on the ballot are tabulated, e.g., in provisional voting. Typically in local voting, the voting machine is situated in a location in a particular precinct, district or ward and voters from that particular voting precinct, district or ward come to that location to vote, and provisional and/or absentee voters may vote using such voting machines even though their voting selections are then reproduced on a printed ballot, e.g., as printed by a printer associated with the voting machine.

Data from fields 381-386 may be utilized to select the voting screens and/or voting contests to be presented on a voting machine and/or on one or more printed ballot sheets that together comprise a proper complete election ballot for that voter in a given election. Each voting machine may generate on a voter-by-voter basis a complete election ballot by selectively combining, for example, a "general ballot" including one or more voting contests 110 that are to be presented to all voters, a "residence-specific ballot" including one or more voting contests 110 to be presented to voters according to their residence, and/or a "party-specific ballot" including one or more voting contests 110 to be presented to voters in a party primary election according to their party affiliation. Thus, a voting machine and/or ballot printer is not constrained or limited to local voting, but may be utilized for county-wide or state-wide or nation-wide voting, for regional voting, and/or for remote voting.

Where voters are issued a chip card or smart card containing his voter identification number and an electronic voting machine is utilized for printing paper ballots, the voting machine may be responsive to voting jurisdiction information 381-386 read from each voter's chip card for providing a ballot to the voter. Such voting machine may retain the chip card for the writing of the voter's voting selections therein and then collect the chip card in a collection container or may allow an election official to have the chip card. Optionally, and often preferably, the voter identification number may follow the same or similar format to the format 380 of BID 120. Optionally, the voting machine and/or vote tabulating machine may reject the chip card and/or the paper ballot 100 if the voter registration information 381-386 and/or the unique identifier 387 read therefrom do not match corresponding information stored in the voting machine and/or vote tabulating machine, and may return or collect the chip card. In either case, the chip card once inserted into the voting machine may be retained in a way that the voter may not retrieve the chip card, e.g., for securing the card against use to vote more than once. For provisional voting, the chip card may be likewise retained until the voting selections of a provisional voter are stored therein, and then may be returned to the provisional voter and/or a voting official, e.g., with a proper authorization.

Unique identifiers 387 once used for an election may be "retired" and not used in one or more subsequent elections as a means to reduce the likelihood of fraud in a future election, e.g., either as a BID number 120 and/or by a counterfeit smart card or copied ballot. Thus, a unique identifier 387 may be unique to an election, or to a series of elections, or to a period of time, or as the voting officials and/or laws and regulations may otherwise require.

Figure 3A:
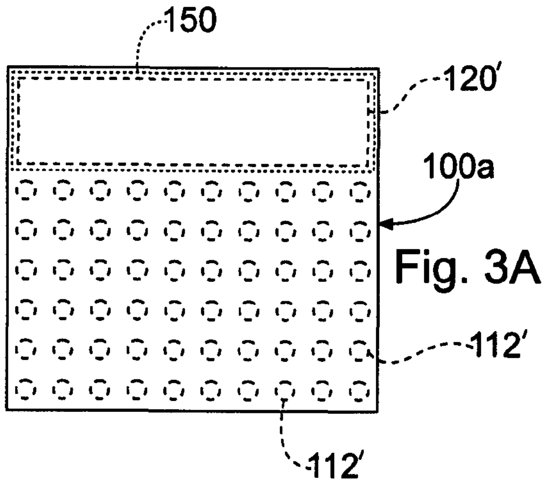
FIGS. 3A, 3B and 3C are schematic diagrams illustrating a generalized example anti-copy ballot intended to be read and/or imaged by an optical reader.
Figure 3B:
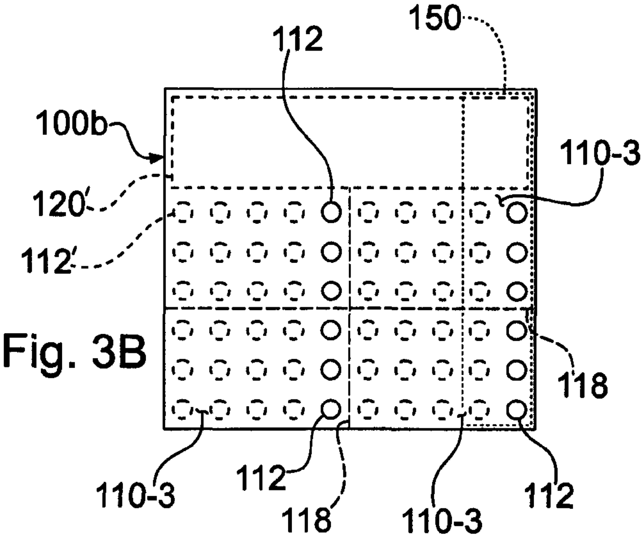
Figure 3C:
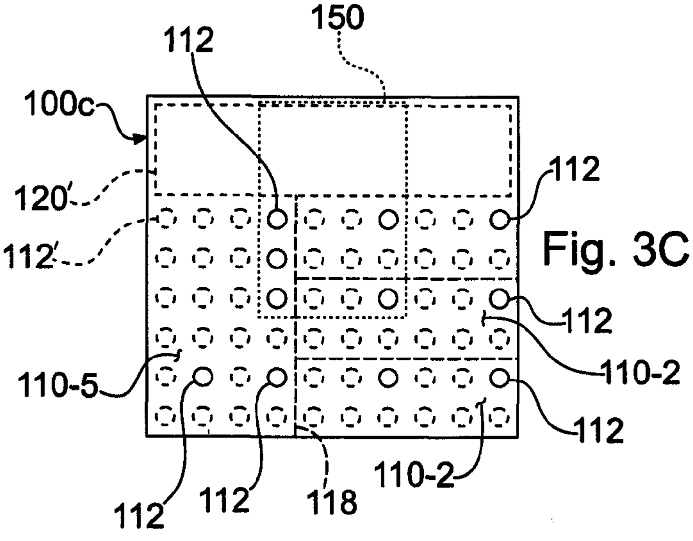

FIGS. 3A, 3B and 3C are schematic diagrams illustrating a generalized example anti-copy ballot 100 intended to be read by an optical reader. The locations of mark spaces, identifiers, fiducial marks and the like, and the locations, size and/or shape of the one or more anti-copy regions, do not need to be on a grid or in any predetermined locations, particularly where the ballot is to be imaged and the information thereon is to be determined from the image, although a certain degree of standardization may be advantageous relative to cost and convenience.

Generalized ballot format 100*a* of FIG. 3A has a plurality of locations 112' at which mark spaces 112 may be provided and has a region 120' in which a BID number 120 may be represented. Ballot format 100*a* is generalized in that it illustrates all possible mark space locations 112' and a relatively large region in which a BID number 120 representation may be provided. Anti-copy region 150 may be, e.g., located at any one or more regions of ballot format 100*a*, as may be convenient and/or desired, and illustrated in an example location as a band across the top of ballot 100*a*, e.g., similarly to one of regions 150 illustrated for example ballot 100 described above. An actual ballot format will typically be on a standardized paper, such as an 80-column machine readable card or an 8½×11 inch or an 11×17 inch or an A4 size paper, or may be on any other size of paper desired or required, whether of a standard size or a non-standard size, and have many more possible mark space locations 112'.

In any particular ballot 100, less than all of possible mark space locations 112' will be utilized as mark spaces 112 and less than the entire region 120' will typically be utilized for providing the BID number 120 representation. Generalized ballot format 100*a* represents a ballot pattern from which particular ballots 100 and areas for particular contests 110, each utilizing specific selected ones of mark space locations 112', according to a template, may be provided. In any particular ballot 100, one or more anti-copy regions 150 may be provided, and may be, e.g., substantially co-extensive with the region for BID number 120', or in a band or bands across the top and/or bottom of ballot 100 (e.g., as in FIG. 1), or in a band or bands along the left and/or right edges of ballot 100 (e.g., as in FIG. 3B), or in a region or regions generally central to ballot 100 (e.g., as in FIG. 3C), or in any one or more regions and/or with sizes and shapes as may be convenient and/or desired, although a certain degree of standardization may be advantageous.

FIG. 3B illustrates an example ballot 100*b* which is provided from a ballot format 100*a* on which contest regions 110 are defined by dashed lines 118 in the region having the possible mark spaces 112' and in which ones of possible mark spaces 112' to be utilized for marking voting selections are mark spaces 112 defined by solid line circles. Anti-copy region 150 is, e.g., located in a rectangular band along an edge of ballot 100, preferably including at least a portion of BID number 120 and at least one or more of mark spaces 112. The dashed lines 118 defining contest regions 110 and the mark spaces 112 that may be selected together define a template for ballot 100*b*, i.e. define the pattern by which voting selections will be marked for each of plural voting contests as well as the pattern by which voting selections will be read by a vote tabulating machine or reader for each of the voting contests in tabulating the vote. The template of ballot 100*b* defines four contest areas 110 of the same size, with each having three active mark spaces 112. Each three mark space contest 110-3 might be utilized, e.g., for a contest among three candidates, or for a contest among three candidates where mark spaces are provided for a "No Vote" selection and a write-in selection, or for a public question or other "Yes-No" response matter where a mark space is provided for a "No Vote" or "Abstain" selection.

FIG. 3C illustrates an example ballot 100A which is provided from a ballot format 100A on which contest regions 110 are defined by dashed lines 118 in the region having the possible mark spaces 112' and in which ones of possible mark spaces 112' to be utilized for marking voting selections are mark spaces 112 defined by solid line circles. Anti-copy region 150 is, e.g., located in a relatively central rectangular region relatively central to ballot 100, preferably including at least a portion of BID number 120 and at least one or more of mark spaces 112. The dashed lines 118 defining contest regions 110 and the mark spaces 112 that may be selected together define a template for ballot 100A, i.e. define the pattern by which voting selections will be marked and tabulated. The template of ballot 100A defines four contest areas 110 of two different sizes, one having five active mark spaces 112, and three having two mark spaces 112. The five mark space contest 110-5 might be utilized, e.g., for a contest among five candidates or for a contest among three candidates where mark spaces are provided for a "No Vote" or "Abstain" selection and for a write-in selection. Each two-mark space contest 110-2 may be utilized, e.g., for a public question or other "Yes-No" response matter.

An example ballot 100 may include contests with ranked and/or cumulative voting that are likewise readable by an optical reader. In ranked voting, the voter may rank the candidates in his order of preference by marking one or more mark spaces 112 in accordance with the voting instructions. Ranked voting may be utilized for conducting an "instant run-off" where no candidate or an insufficient number of candidates receives sufficient first-choice votes to be elected (e.g., fails to receive a majority of the votes cast) under the election rules in effect. In cumulative voting, the voter may distribute a given number of votes among the candidates in his order of preference, typically where more than one candidate is to be elected in a given contest. Cumulative voting allows the voter to distribute his vote among any one or more of the candidates rather than being limited to voting for or not voting for each candidate equally, as in straight voting. Any one or more contest areas 110 may be utilized for straight voting, for ranked voting and/or for cumulative voting, as may be the case for a particular election and/or contest. The voting apparatus, methods and ballots described herein permit an instant run-off election to be conducted automatically and electronically if no winner emerges from the initial voting.

Figure 4:
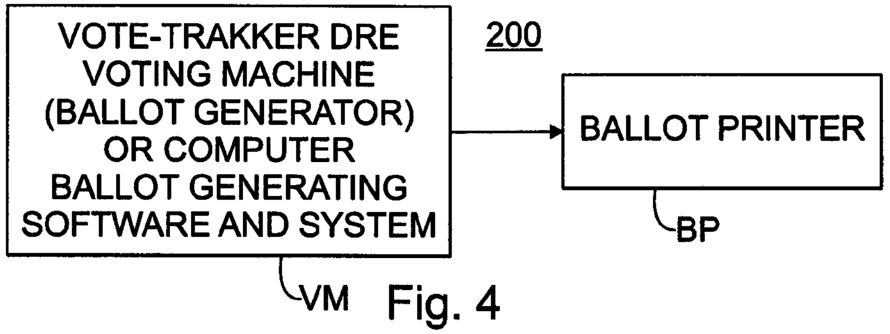
FIG. 4 is a schematic block diagram of an example ballot generating apparatus.

FIG. 4 is a schematic block diagram of an example ballot generating apparatus 200. Apparatus 200 includes a processor for generating ballots 100 from information provided thereto either by election officials entering contest information, candidate information and the like, i.e. for generating ballot form and/or formats for particular jurisdictions and/or sub-divisions thereof. The processor may be the processor included in an electronic voting machine that includes ballot generating capability, such as the VOTE-TRAKKER® direct recording electronic voting machine available from Avante International Technology, Inc. located in Princeton Junction, N.J., described in the US Patents and Patent Publications referred to below, or may be a computer running suitable ballot generating software.

Ballot printer BP may be a conventional ballot printer that prints ballots provided it is capable of printing the BID number 120 in machine- and/or human-readable form and of printing the unique random portion of the BID 120, or may be a printer associated with voting machine VM. Printer BP is capable of printing anti-copy feature(s) 150 and/or of printing on paper or other stock that has the anti-copy feature already thereon. The actual format of ballots 100 will be in conformance to the applicable federal, state, county, and/or local legal requirements for election ballots, as is the case for conventional optically-scanned ballots. Thus, standardized paper sizes, e.g., 8½×11 inches or 8½×14 inches or 11×17 inches or A4 metric paper, or non-standard paper sizes, may be utilized, and single-page ballot requirements, minimum font size standards, candidate ballot space standards, and the like, will be met, in a customized and/or conventional ballot format. For example, ballots 100 may be conventional ballots such as a Scantron ballot, which has an array of 48×80 elliptical mark spaces on fixed grid pattern on an 8½×11 inch paper, onto which is added BID number 120 in machine- and/or human-readable form and anti-copy feature 150 as described herein.

Figure 5:
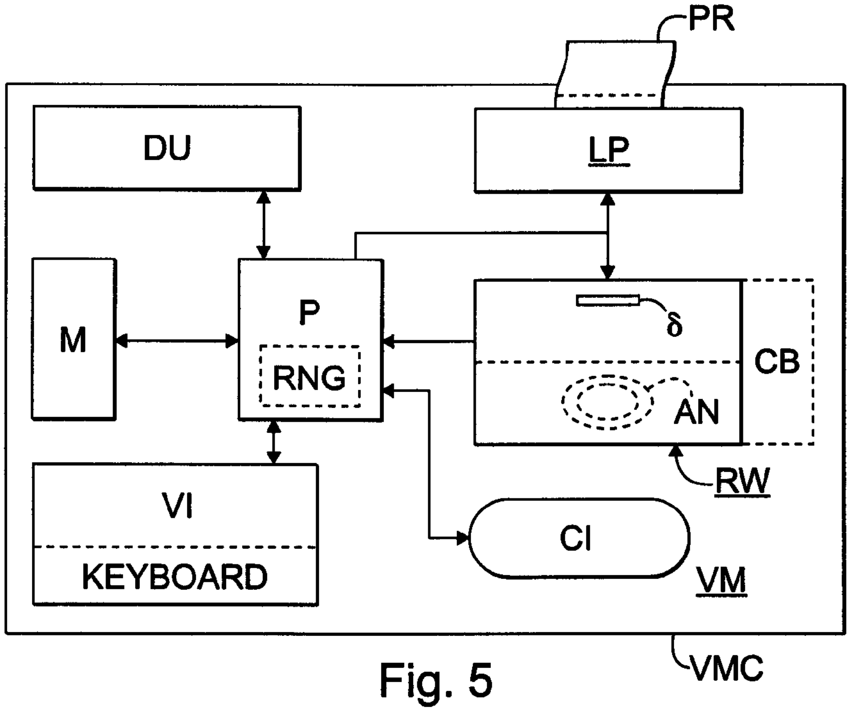
FIG. 5 is a schematic block diagram of an example voting apparatus.

FIG. 5 is a schematic block diagram of an example voting apparatus VM as shown and described in ones of the Patents and Patent Publications referred to herein below. Voting machine VM includes a processor P for processing information relative to a voter and/or voting and for providing a voting session identifier, a non-volatile memory M for storing and providing such information, a display unit DU for displaying information to the voter, and a voter interface VI whereby the voter can enter information into voting machine VM for processor P and/or memory M. In addition, processor P includes a function for providing unique voting session identifiers for each voting session, for example, a random-number or random-character generator RAG or a look-up table or other suitable generator. Voter interface VI may be a touch screen and so would provide, e.g., display DU and a keyboard. Voting machine VM may be an electronic voting machine such as the VOTE-TRAKKER® direct recording electronic voting machine available from Avante International Technology, Inc.

Memory M may also be of any suitable non-volatile memory type. Memory M or a separate memory contains the operating system, data base and application software that operates processor P as voting machine VM. Alternatively, various programming information, a voting session identifier generator or list, voting information, candidate and office information and the like may be provided in firmware, such as in an EPROM, which provides additional resistance to tampering and/or hacking attack. Preferably, memory M of voting machine VM includes two independent non-volatile memory devices so that voting record information and a voting session identifier are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI may be a standard or custom keyboard, as may facilitate write-in voting, or may be dedicated vote buttons or switches similar to conventional mechanical voting machines, for example, or may be a touch-screen interface associated with display unit DU, and is typically connected to processor P via cabling. Special keys can be provided for voting functions such as "Elect" or "Select" or "Vote," or for "Erase" or "Change," or for "Write-in." Voter interfaces VI may include voice recognition apparatus, Braille keyboards or pen systems with writing recognition interfaces, each preferably with confirmation of the data entered displayed on display unit DU or even aurally via headphones. If a "standard" computer keyboard is used, it is preferred that the "function keys," e.g., the F1-F12 keys, be disabled or rendered inoperative, either by software control or physical means.

In addition, a voter interface VI for allowing visually impaired voters to vote without assistance may employ a modified standard keyboard (of which only certain keys are responded to) in combination with an aural device. E.g., only the four keys (buttons) at the corners of a numeric keypad or the four areas (buttons) in the four corners of a touch screen may be enabled to indicate possible selections such as vote, skip, next, previous, and the like, with audible voice instructions and confirmation of buttons pressed provided via a headphone. Any or all of these functional keys may be enlarged or otherwise made easily distinguished by tactile feel. Software may provide such keyboard/button programming. Display unit DU may be of any suitable type, such as a conventional cathode ray tube or computer display, an LCD display, a touch-screen display or other suitable device, for displaying alphanumeric and/or graphical information, or a set of illuminated buttons, as desired, and is typically connected to processor P via cabling. Display unit DU may also include Braille devices, aural information via headphones, or other devices specially suited for people with handicaps.

Operatively associated with or coupled to processor P and memory M are a printer LP which may be for providing a tangible record of the voting session, e.g., a printed paper receipt and/or for printing a marked ballot. An optional smart card reader/writer RW may be provided for writing and/or reading information from/to a smart card. Preferably, local printer LP and optional reader/writer RW are built into the physical container VMC of voting machine VM along with processor P, memory or memories M, display DU and voter interface VI, and that physical container VMC is rugged and sealable for security and to prevent unauthorized access to the components therein, thereby being resistant to tampering. Other voting booth components, such as a privacy curtain, the opening and closing mechanism therefor, or a floor stand, need not be part of voting machine container VMC, but may be permanently or demountably attached thereto.

Optional smart card reader/writer RW may be operatively associated with or coupled to processor P and memory M for writing information including at least a unique voting session identifier and a voting record into the memory of a smart card SC and optionally for reading information, such as voter registration and/or identifying information, from a smart card. Each voting session identifier is a randomly-generated unique identifying or serial number or character sequence (e.g., a pseudo-random number) of at least eight characters or digits, and preferably of 12 or more characters or digits. Such voting session identifiers are generated for each voting session of each election, either centrally and then loaded into memories M of voting machines VM or by processor P as each voter participates in a voting session. It may be desirable for the voting session identifiers to include additional characters identifying voting district and/or the polling place and/or the voting machine VM on which the vote associated with the identifying number was cast, and/or the date and time of the voting session, but not the voter, so as to preserve voter anonymity while providing traceability of voting records. The voting session identifier could be used as the ballot identifier BID where voting machine VM prints a marked ballot. If any information particular to an individual voter is stored in the memory of smart card SC, such information should be written over or erased or otherwise rendered permanently unrecoverable either before or at the time that voting record and voting session identifier information is stored in the memory of smart card SC.

For optical ballot voting, voting machine VM may generate a ballot format 100 for a particular jurisdiction, for example, according to a pre-programmed ballot information and/or in response to the voting jurisdiction information corresponding to the ballot's BID number (fields 381-386) as pre-entered or as entered via voter interface VI and/or a smart card and reader RW, as the case may be. The ballot format generated by processor P may be as described with a format layout for contests 110 and anti-copy regions 150 consistent with local election requirements. Ballot 100 so generated is printed by printer LP and is provided to the voter, e.g., by hand for provisional voting and/or by mail for absentee voting. Voting selections may be printed on ballots 100 that are ballot forms printed in advance of an election and/or may be ballots including voting selections made during an election that are printed on a demand, i.e. as needed, basis.

Reader/writer RW may be a contact-type reader for use with contact-type smart cards, or may be a wireless or contact-less-type reader for use with wireless or contact-less-type smart cards, or may be of a type for use with both contact-type and wireless or contact-less-type smart cards (a so-called "combos-card"). Further, while optional smart card encoder RW need only be able to write information to a smart card, it may also read information stored in a smart card SC and provide same to processor P, and may also be a decoder to decode information read from a smart card SC in encrypted or encoded form, and/or may also be a coder that encrypts or encodes information being written to the smart card SC, e.g., using public key encryption or any other suitable encryption and/or coding arrangement. Optionally, and preferably, reader/writer RW may include a "take-in" or capture mechanism that grabs smart card SC when it is inserted into slot S and, after the voting record and voting session identifier information is stored in the memory of smart card SC, deposits smart card SC into a secure collection box CB located in voting machine cabinet VMC.

Local printer LP may provide a tangible independent record of each individual voter's voting selections associated with the voter's unique identifying number and/or may be utilized to print ballots 100. Printer LP should be of a type that retains no record of the data printed (e.g., is not a daisy wheel or other printer employing a ribbon or other sheet-type ink source from which information printed may be extracted or reconstructed) such as a thermal printer, an ink-jet printer, a bubble jet printer, a laser printer and the like, which are conventional. A specialty or security-type of anti-copy paper, or other medium making authentication of a printed receipt and/or a printed ballot 100 easier and counterfeiting of altering of same more difficult, can be utilized, thereby reducing the likelihood of counterfeiting or fraud. Desirably, printer LP also prints information identifying the election district, the date and time of voting and similar information that may help to authenticate printed receipt PR and/or optical ballot 100.

The preferred VOTE-TRAKKER® voting system and apparatus provides redundancy for voting record and voting session identifier and/or ballot identifier BID data in that each vote is recorded by at least one additional independent and verifiable means: to wit, by electronic recording in the memory of voting machine VM and in a printed record that is separate from the voting machine. This apparatus, and the method it performs, can provide 100% transparency of each and every vote and can maintain 100% privacy and confidentiality of each and every voter and vote, although other embodiments may or may not provide such features.

Figure 6:
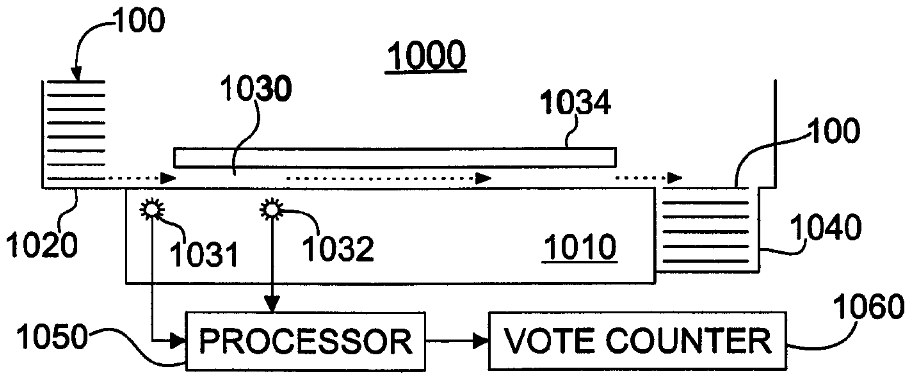
FIG. 6 is a schematic diagram illustrating an example ballot reader for reading optically read ballots of the sorts illustrated in FIGS. 1 and 3A-3C.

FIG. 6 is a schematic block diagram illustrating an example ballot reader apparatus 1000 for reading and/or imaging machine-readable ballots 100. Ballot reader apparatus 1000 includes reading device 1010 that has an input container 1020 into which ballots 100 to be read are placed for being transported along transport path 1030 to be deposited in an output container 1040 into which ballots 100 that have been read (imaged) as they passed through transport path 1030 are deposited, i.e. are collected. Preferably, ballots 100 are optically-read ballots 100 of the sorts illustrated in FIGS. 1 and 3A-3C and reader apparatus 1010 is an optical reader. Data read or imaged from ballot 100 is processed by processor 1050 to determine whether the ballot is an original ballot or is copy of a ballot. If the ballot is original, the voting selections marked on ballot 100 are determined with reference to a selected ballot template therefor and are accumulated and tabulated by vote counter 1060. Ballot copies are rejected and are not counted, and may be collected in a separate portion or section of output collection bin 1040. Member 1034 may be a guide for transport path 1030 that also provides a light shield for optical readers 1031, 1032.

It is understood that certain conventional optical readers must be preprogrammed with a template corresponding to the particular ballots to be passed therethrough and read, and so the ballots must be sorted by jurisdiction and the like so that only ballots of the same form, i.e. the form that corresponds to the preprogrammed template, are passed through to be read at any one time. Ballots of different format must be passed through such readers as separate batches after the corresponding template therefor has been programmed into the conventional optical reader. It is further understood that certain typical conventional ballot readers also require that the ballots be in the same orientation prior to being passed through the ballot reader. Both of these disadvantages are overcome by the described arrangement.

Two embodiments for a reader 1010 that does not require pre-sorting of ballots by jurisdiction and type and orientation are described. In a first, reader 1010 includes two optical devices 1031 and 1032 and a processor 1050 that cooperate for reading ballots 100 of different forms without the need to pre-sort the ballots into groups of like form. Specifically, optical device 1031 reads ballots 100 for reading the BID number 120 thereon, and optionally the fiducial marks 122 thereon, and communicates the BID number 120 and fiducial marks 122 to processor 1050. Reader 1031 need not read any other part of ballots 100. Processor 1050 is responsive to the BID number 120 and optional fiducial marks 122 read from each ballot 100 by optical reader device 1031 to identify and select the ballot template corresponding thereto, and to optionally determine the orientation thereof. Either reader 1031 or reader 1032, or both, may read the anti-copy regions 150 of ballot 100 for providing data from which processor 1050 can determine whether the ballot is an original ballot or is a copy thereof. If the ballot is determined to be original, optical reader device 1032 then reads ballots 100 for reading the mark spaces 112 thereon that have been marked for comparison in accordance with the ballot template selected by and the orientation determined by processor 1050.

In a second embodiment of a reader 1010, optical reader device 1031 produces an image of ballot sheet 100, e.g., in a pixel image format, and processor 1050 processes the ballot image data to extract the ballot identifier BID 120 therefrom for selecting the appropriate template for determining the voting selections that are marked on ballot 100, and processes the ballot image data to extract fiducial marks 122 therefrom for determining the orientation of the ballot image for bringing the ballot image and the selected template into a corresponding orientation. Processor 1050 also processes the ballot image data to determine from the anti-copy regions 150 thereof whether the ballot 100 imaged is an original ballot or is a copy thereof, as described herein. Where the ballot identifier BID 120 is in an anti-copy region 150 of a sort that renders BID 120 unreadable, the inability to extract BID 120 from the ballot image may be sufficient basis for rejecting the ballot as a copy, subject to appropriate confirmation. If the ballot imaged is proper, the ballot image data is then processed in accordance with the selected template and the proper orientation to determine the voting selections marked thereon. If optical reader 1010 were to have two optical readers in this embodiment, both optical readers thereof would image the ballots for error reduction, i.e. would be for making redundant images for verifying the correctness of either image, and the voting selections thereon, against the other.

The BID number 120 read or determined from each ballot 100 or allot image should preferably include at least jurisdictional information fields, e.g., fields 381-386, which can be utilized by processor 1050 to identify and select the appropriate ballot template. The unique random number field, e.g., field 387, preferably should also be read or determined so that the unique random number portion of BID 120 can be associated with the stored voting selection information and be available for later verification of the ballot and/or of the correct reading thereof, as well as for the voter tracking his vote, e.g., via an Internet or other posting, if provided as described herein. Where BID 120 is on ballot 100 in two different forms, e.g., in machine-readable form and in human-readable form, reader 1000 may have the ability to read both forms of BID 120, e.g., a bar-code reader and an OCR reader, usually included in processor 1050.

Reader 1032 in the first embodiment above need not, but may, read portions of ballot 100 other than those containing valid mark spaces 112 according to the selected template corresponding to that ballot. The unnecessary portions of ballot 100 not containing valid mark spaces 112 or other data that need be determined may either not be read or may be read and then discarded while retaining the readings of mark spaces 112. In certain jurisdictions and in certain conventional ballot readers, only "images" of the ballot form identity and mark space zones need be obtained and stored for tabulating and/or verifying voting, and such may merely be indications of time-coincidence between reference marks and voter marked marks indicating selections or may be indications that ones of mark spaces in predetermined grid positions have been marked. Standardized information, e.g., names of contests, names of candidates, and the like, are not read and/or are not stored, thereby reducing the amount of data that needed to be stored.

While a representation of the voting selections made and ballot form identity may sometimes be referred to in the industry as a "ballot image," the imaging of a ballot by the present arrangement provides a true image of an entire ballot sheet, typically in a pixel image format, from which the ballot identifier BID, mark spaces and voting selections made can be decoded or otherwise determined. Images of the BID and mark space zones may be stored in any suitable electronic format including but not limited to .BMP, TIFF, .PDF, .JPG or any other suitable format. Preferably, the image of the entire ballot sheet is stored as a record of the voting for each ballot sheet. Memory space may be conserved by using image file formats that efficiently and accurately compress the image data, e.g., such as a .JPG or .PDF or other suitable compression scheme, however, where applicable law and regulations permit, less than the entire ballot sheet image may be stored, as may be satisfactory where the original ballot sheet is preserved, either permanently or for a time sufficient for all verifications, challenges, certifications of results and/or appeals to be completed.

As a result, ballots 100 placed into input container 1020 do not have to be pre-sorted to be of the same format or orientation, but may be of different formats and orientation because reader 1010 in cooperation with processor 1050 determines the proper template and orientation to be utilized for reading each ballot 100 according to its format. Specifically, because the information in fields 381-386 of each BID number 120 printed on each ballot 100 define the particular voting jurisdiction (e.g., state, county, municipality, precinct, ward and/or political party), they also define the form of ballot 100 for such jurisdiction. From the BID number 120 and fiducial marks 122 read by optical reader 1031, processor 1050 determines the jurisdiction and the ballot form therefor and supplies the template and orientation therefor for use in conjunction with the pattern of mark spaces 112 marked on ballot 100 for determining the voting selections made thereon. It is noted that orientation may be corrected by re-orienting (rotating) the ballot image so that it is correctly oriented relative to the selected ballot template, or by re-orienting (rotating) the selected ballot template so that it is correctly oriented relative to the ballot image. Further, data relating to anti-copy regions 150 is utilized to detect copied ballots from original ballots so that copied ballots are not read and are not counted.

Simply put and by way of example, and only for ballots that are original and are not copies, because ballots that are copies are detected from anti-copy region 150 thereof and are not processed: Reader/imager 1010 reads/images the BID number 120 from a first ballot 100 of form A and signals same to processor 1050 which then provides the mark space template for ballots 100 of form A for reading/determining the marked voting selections from first ballot 100 read/imaged by optical reader 1010. The marked voting selections read/determined are then tabulated as votes by vote counter 1060. Next, reader/imager 1010 reads/images the BID number 120 from a second ballot 100 of form B and signals same to processor 1050 which then provides the mark space template for ballots 100 of form B for reading/determining the marked voting selections from second ballot 100 read/imaged by optical reader 1010, which read/determined marked voting selections are then tabulated as votes by vote counter 1060. Next, reader/imager 1010 reads/images the BID number 120 from a third ballot 100 of form C and signals same to processor 1050 which then provides the mark space template for ballots 100 of form C for reading/determining the marked voting selections from third ballot 100 read/imaged by optical reader 1010, which read/determined marked voting selections are then tabulated as votes by vote counter 1060. If the next ballot is of form B, for example, reader/imager 1010 reads/determines the BID number 120 from that ballot 100 of form B and signals same to processor 1050 which then provides the mark space template for ballots 100 of form B for reading/determining the marked voting selections from that ballot 100 read/imaged by optical reader 1010, which read/determined marked voting selections are then tabulated as votes by vote counter 1060, and so forth. The process repeats for each ballot read/imaged by reader 1000 wherein the template for each ballot is selected by processor 1050 responsive to the BID number 120 read/determined from that ballot, e.g., specifically responsive to the jurisdictional information defined in fields 121-127 of BID number 120.

In addition and optionally, processor 1050 may include optical character recognition (OCR) software to provide alphanumeric outputs of the information in the BID field read/imaged by reader 1010 and/or of write-in information in the write-in portions of the voting fields read/imaged according to the template selected by processor 1050. It is preferred that reader 1000 move ballots through transport path 1030 at the rate of at least about 10-12 inches per second (about 25-30 cm/sec.) so that ballots on either 8½×11 inch paper and/or on A4 paper may be read at a rate of at least about one ballot per second. It is also preferred that reader/imager 1010 have a resolution of at least about 100 dpi or greater, and it is desirable in some cases that reader 1000 provide dual-side document scanning. While 100 DPI is adequate for use with anti-copy features, a resolution of at least 200 DPI is typically employed.

In addition, a "trial" ballot reader may provided at each polling place so that a voter has the opportunity to have his voted ballot scanned privately and to have the voting selections read therefrom be displayed to him privately so that the correctness thereof may be confirmed before the ballot is cast. Preferably, the trial ballot scanner should employ the same reading apparatus and method as the ballot scanners that will read the ballot in counting and tabulating the vote. In any event, the trail ballot reader should preferably be "read only" and have no memory or ability to store or transmit the voting selections from any ballot, whether by template and/or image, thereby to assure privacy. I.e. it is for vote checking only.

When a reader 1000 is utilized at a polling place or other voting location for "checking" ballots marked by voters prior to their being voted, i.e. officially deposited into a collection container, vote counter 1060 may be disabled or eliminated and no record of the actual voting selections need be retained. Processor 1050 need process only the BID number 120 and the mark space 112 regions to select the corresponding ballot template and to verify that the proper number of mark spaces have been marked for each contest and/or question. The anti-copy detection function may be disabled, not provided, or allowed to operate, as may be desired.

Reader 1000 in checking a ballot preferably signals or otherwise provides a notice or indication if a ballot is under voted (i.e. less than the required number of spaces have been marked for each contest/question) or is over voted (i.e. more than the required number of spaces have been marked for each contest/question, which may invalidate a vote in a contest/question or may invalidate an entire ballot) or is otherwise incorrectly marked. Ballot checking may be utilized with straight voting, ranked voting, and/or cumulative voting similarly, e.g., indicating if improper ranking has been marked and/or if the wrong number of cumulative votes have been marked. While such checking function advances the goal that ballots reflect voter intent, it can reduce but not eliminate under voting and over voting; however, it will at least give the voter an opportunity to correct such condition or to at least indicate an intentional "no vote" by marking a "No Vote" or "Abstain" mark space 112 if such mark space is provided.

Ballot checking reduces and/or eliminates under and over voting and so may avoid or at least mitigate situations where the intent of the voter cannot be determined. However, where applicable law allows, under and over voting in cumulative voting contests may be adjusted and/or rectified when the ballot is counted by applying proportioning and/or normalizing rules to the votes actually cast, e.g., by adding or subtracting a proportionate weighted vote. Ballot checking may be preformed by a reader 1000 or by an other ballot reader such as a ballot imager based on commercial office imaging equipment.

Reader 1000 utilized for ballot checking may also have a printer associated therewith for providing a tangible voting record, e.g., a printed receipt, for each voting session whether the receipt is collected or is available to the voter, as described in the Patents and Patent Publications referred to herein. Desirably, such printed receipt includes the complete BID 120 including the unique random portion 381 so that the vote may be tracked and verified either by election officials or where the voting results are available via an Internet and/or other posting including the BID. Preferably, the BID from the ballot read/imaged is printed on the receipt. If the receipt includes a record of the voter's voting selections, the receipt also provides an immediate confirmation that the ballot can be read and of the voting selections marked, whereby the voter may seek correction of any error and/or omission prior to voting (casting) his ballot.

Figure 7:
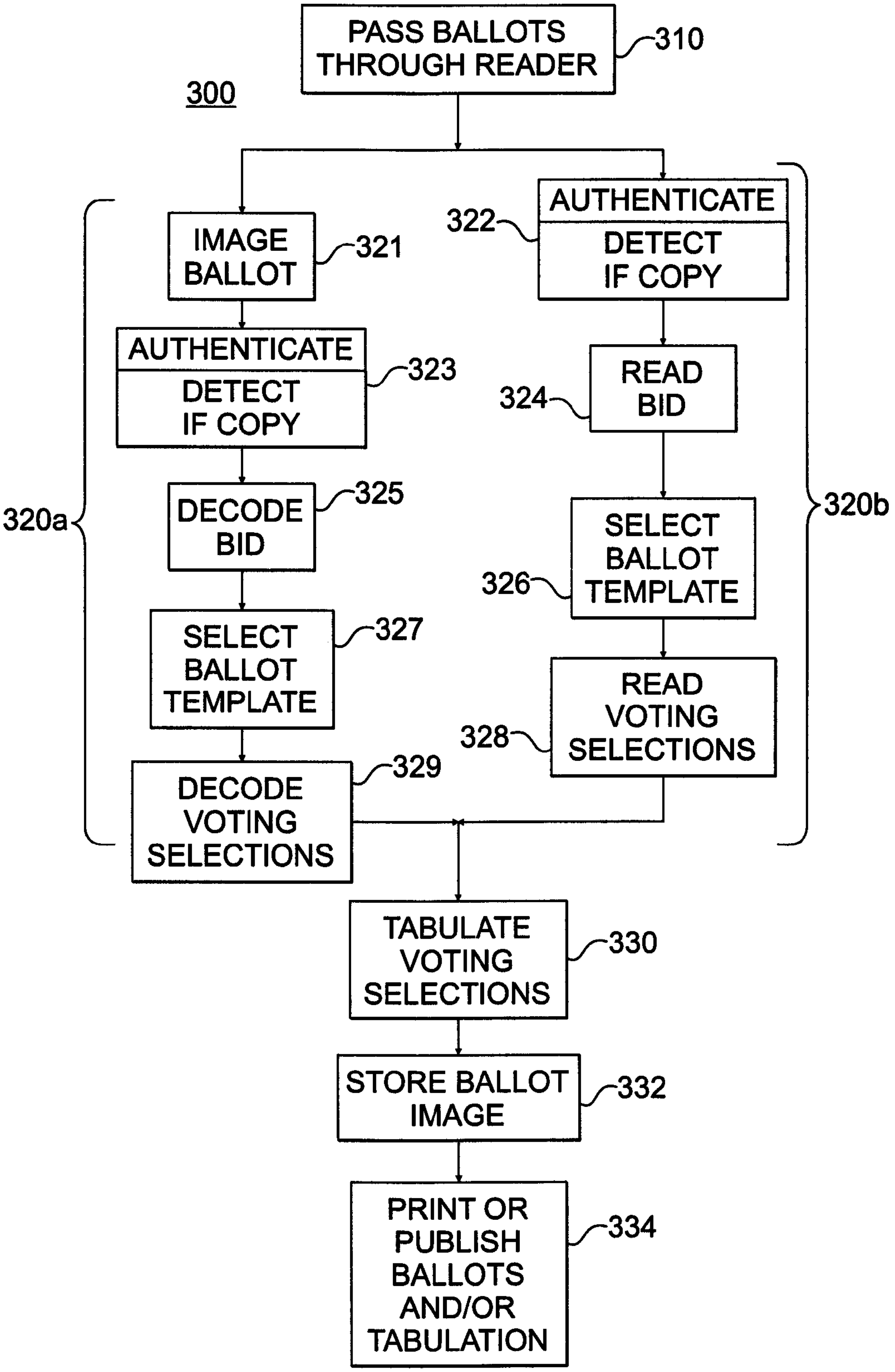
FIG. 7 is a schematic flow diagram of an example ballot reading process compatible with the example apparatus of FIG. 6 and other apparatus.

FIG. 7 is a schematic flow diagram of an example ballot reading process 300 compatible with the example apparatus of FIG. 6 and other apparatus. Process 300 commences with passing 310 the voted ballots through a ballot reader, e.g., along a transport path of an optical scan reader, wherein the ballots do not need to be sorted according to jurisdictions and/or ballot formats, or arranged in any particular orientation, or reviewed to eliminate copied ballots (although such sorting and/or arranging would not affect the processing 300 if it were to be done). The ballots are individually and serially read/imaged and the voting information thereon is read/decoded via either of alternative processes **320*a* or 320*b*. Path 320*a* comprises imaging 321 each ballot, authenticating 323 each ballot, and then decoding the voting selection information thereon in two decoding steps 325, 329. Path 320*b* comprises authenticating 322 the ballots and reading the ballots in two steps 324, 328, wherein the voting selection information is read and/or processed in second reading step 328. In either path, the ballot template (e.g., a set of computer instructions and/or statements and/or data defining a pattern of ballot mark spaces for a ballot) for reading/decoding the voting information is selected responsive to the ballot identifier BID read/decoded in the first reading/decoding step 324, 325**.

As a general matter, it is preferable that ballot authentication 322, 323 be performed early in process 300 for several independent reasons. First, with certain anti-copy region features, the darkening of anti-copy regions 150 in copies of the ballots makes it very difficult, if not impossible, to decode any information that is within anti-copy regions 150, such as ballot identifier BID 120 and fiducial marks 122 without which the ballot can not be reliably and accurately decoded, as well as test spaces 152 and/or any mark spaces 112 or page numbers 120P within anti-copy regions 150. Secondly, it would be wasteful of ballot processing resources to delay detecting copied or incomplete ballots until after the ballots are partially processed, whether or not accurately. Accordingly, authentication 322, 323 may optionally include checking the ballot image for ballot completeness, e.g., as to the presence of the ballot identifier, fiducial marks, all mark spaces, all pages and page numbers, and the like, rather than checking later in process 300. If the ballot is determined to be a copy or otherwise not original or not authentic or not complete, the ballot is rejected, e.g., is physically separated from the other ballots for manual verification and processing.

Figure 9:
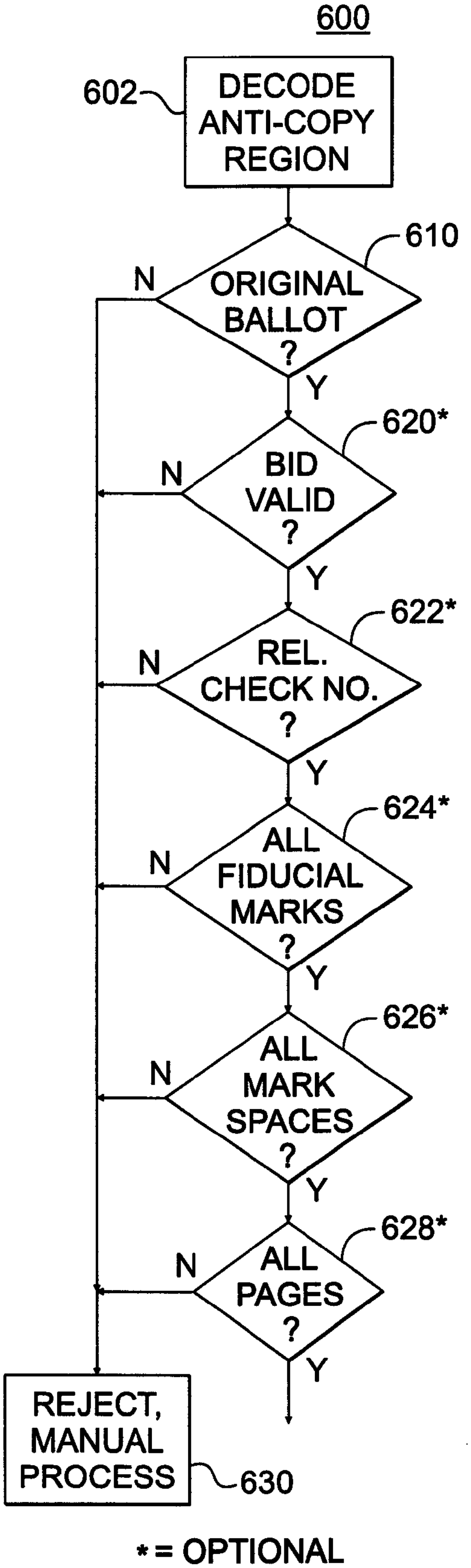
FIG. 9 is a schematic flow diagram of an example authentication process suitable for use with the ballot reading processes of FIGS. 7 and 8.

Ballot imaging process **320*a* comprises imaging 321 the ballot to acquire an image of the ballot including the voting information thereon, authenticating 323 the ballot, and then decoding 325 a ballot identifier (e.g., BID) from the ballot image. Imaging 321 typically includes a pixel-based image that can be processed digitally, e.g., by a microprocessor or other computer processor. Authenticating 323 the ballot may involve several steps as illustrated in FIG. 9. Detecting a copied ballot from an original ballot is based upon differentiating the different pixel characteristics between the anti-copy regions 150 thereof, as described herein, because the features contained in the anti-copy regions 150 of a ballot 100** appear substantially differently in the original and in a copy, e.g., photocopy, thereof.

Decoding the ballot identifier includes processing the pixels in the region of the ballot image where the BID is expected to be found to derive the information stored therein, e.g., in a bar code (either a one- or two-dimensional bar code), and/or human-readable characters. While the entire ballot identifier (e.g., BID) may be decoded, only that portion thereof that contains jurisdiction information (e.g., ones of fields 381-386) need be decoded; decoding the unique random identifier portion (e.g., field 387) is optional. The decoded identifier correlates to a particular ballot format represented by a ballot template, and the ballot template corresponding to the decoded identifier is selected 327 from a database or other collection and/or set of ballot templates for decoding 329 the voting selection information from the ballot image previously imaged 321. Thus, each ballot of a mixed set of ballots is read (decoded) according to a template corresponding to the particular ballot format to obtain the voting selection information thereon.

Ballot imaging process 320*b* comprises authenticating 322 the ballot, and reading 324 the ballot to read a ballot identifier (e.g., BID) thereon, typically in a predefined location, area or region of the ballot. As above, authenticating 323 the ballot may involve several steps as illustrated in FIG. 9. While the entire ballot identifier (e.g., BID) may be read 324, only that portion thereof that contains jurisdiction information (e.g., ones of fields 381-386) need be read; reading the unique random identifier portion (e.g., field 387) is optional). The read identifier correlates to a particular ballot format represented by a ballot template, and the ballot template corresponding to the read identifier is selected 326 from a database or other collection and/or set of ballot templates for reading 328 the voting selection information from the ballot. While the entire ballot may be read 328, only that portion containing voting selection information according to the selected template 326 need be read. Thus, each ballot of a mixed set of ballots is read according to a template corresponding to the particular ballot format to obtain the voting selection information thereon.

It is noted that the foregoing reading/imaging 321, 324, 325, 328, 329 of the BID and voting selections, the authenticating 322, 323 of the ballot, and the template selecting 326, 327, and/or the tabulating 330 and storing 332, may be performed in "real-time" as each ballot is read, i.e., the voting selections are read/decoded, stored 332 and tabulated 330 substantially contemporaneously with the ballot passing through reader 1010 and being authenticated 322, 323. Alternatively, the BID and voting selections read/imaged 321, 324, 328 may be stored as each ballot passes through reader 1010, and the authenticating 322, 323, template selecting 326, 327, the decoding/reading 324, 325, 328,329 of the stored BID and voting selections, and/or the tabulating 330 and storing 332 thereof may be performed after some or all of the ballots have passed through reader 1010, i.e. may be delayed in time.

It is further noted that in reading ballot 100, it is preferred that the ballot image be read/decoded 328, 329 to determine whether or not all of the mark spaces 112 as defined 326, 327 by the appropriate ballot template, and the indicia 122, if any, are present in the ballot image, thereby to enable detection of an anomalous and/or erroneous ballot 100, and/or to detect that a ballot 100 is, e.g., folded, torn, altered or otherwise incomplete or incorrect. Where an indicia 122 is employed to define the orientation of each ballot and a BID is employed to define the ballot form, the ballots may be in any order and orientation, the ballots need not be sorted by jurisdiction and/or voting district or the like and need not be placed in a given orientation prior to being authenticated 322, 323, and read/imaged and/or decoded 321, 324, 325, 328, 329.

The voting selection information read/decoded 328, 329 is tabulated 330 for counting the vote and determining an election outcome/result. The image of each ballot read 320*a*, 320*b* is preferably stored 332, e.g., for later verification, auditing, confirmation and/or comparison with the paper ballots and the like, and may be printed and/or otherwise published 334, in whole or in part, in connection therewith. Alternatively, only the read/decoded 328,329 voting selection information need be stored 332 if that is sufficient to satisfy legal and operational requirements. The steps of tabulating 330, storing 332 and/or printing/publishing 334 may be either with or without the ballot identifier (e.g., BID) and/or other ballot identifier.

In addition, it is sometimes, if not usually, preferred that the printing and/or publishing 334 of voting results be positively blocked prior to a predetermined time, e.g., prior to the end of the time for voting. This, for example, allows absentee and provisional ballots received prior to and/or during the election to be authenticated, read and/or tabulated prior to the end of the election period while the results thereof are not available until after the time for voting is completed. Advantageously, this may allow election personnel to more efficiently process absentee and provisional ballots as well as the regular voted ballots.

An advantage may obtain, however, where the tabulated 330 and/or stored 332 voter selection information is associated with the ballot identifier and the ballot identifier is not related and/or relatable to the identity of a particular voter, i.e. the voter remains anonymous. In such case, particular ballots, e.g., paper ballot sheets, can be inspected against the electronic records without compromising voter anonymity and privacy, including publishing voting results on a ballot-by ballot basis, e.g., via the Internet, as described in the Patent Publications and Patents incorporated herein. Such ability to verify that a ballot has been received and has been counted could be desirable for absentee and/or provisional voters, as well as for general voting.

Figure 8:
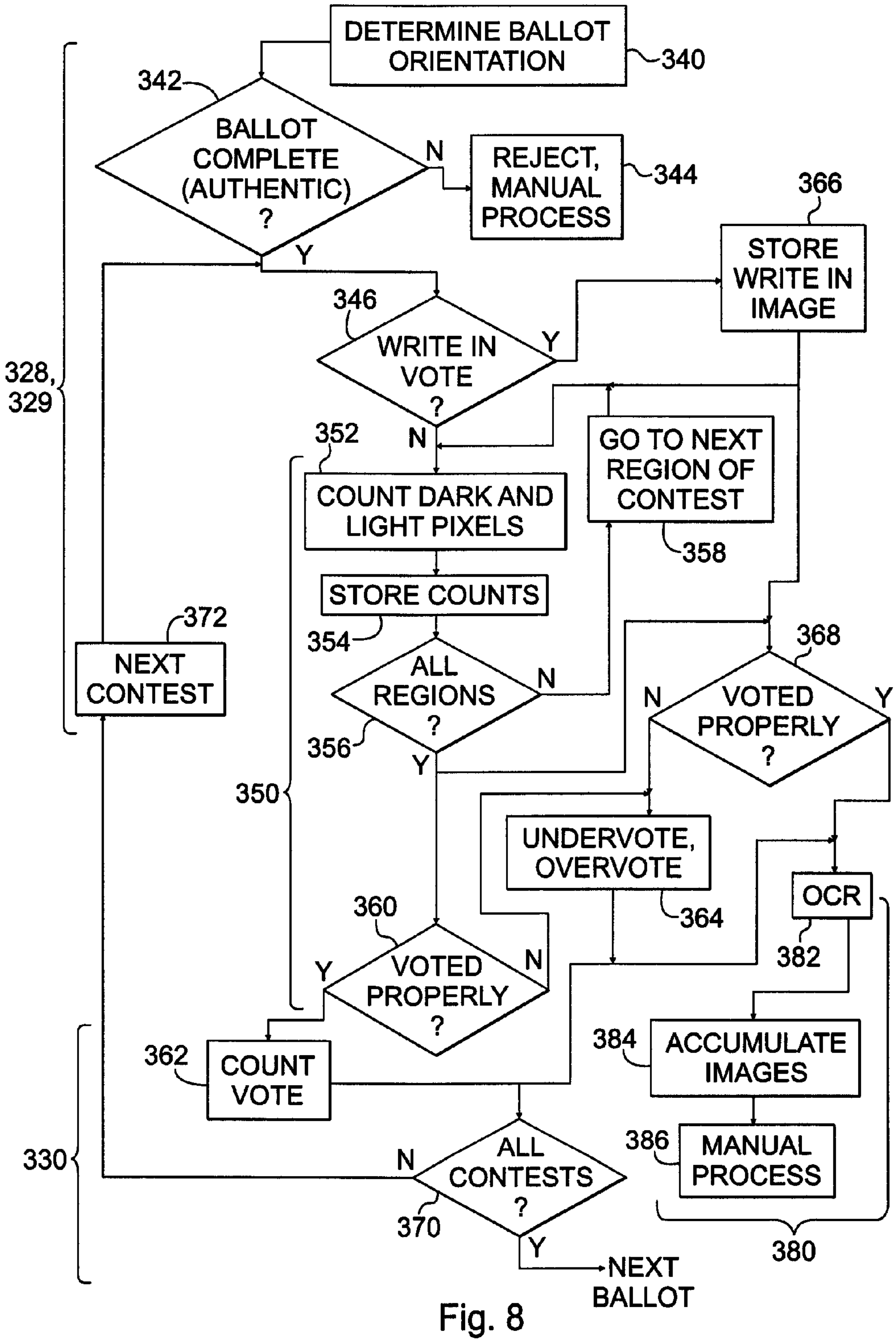
FIG. 8 is a schematic flow diagram illustrating details of a portion of the ballot reading process of FIG. 7.

FIG. 8 is a schematic flow diagram illustrating details of a portion of the ballot reading process 300 of FIG. 7. In particular, an example of details relating to the steps of decoding 329 voting selections, reading 328 voting selections and/or tabulating 330 voting selections using the selected 326, 327 ballot template are illustrated. In a preferred embodiment, ballots are imaged, read and/or decoded 320*a*, 320*b* irrespective of the orientation of each ballot as it is passed through the ballot reader and/or irrespective of the jurisdiction, voting district, precinct and the like to which it pertains.

First, the orientation of each ballot is determined 340 from the location(s) of one or more indicia (e.g., fiducial marks 122) disposed in an asymmetrical pattern on the ballot, and then the ballot image and/or the selected 326, 327 template therefor is electronically oriented so that both are in the same orientation. Before, after, and/or contemporaneously therewith, the ballot is tested or checked 342 to verify that it is a complete ballot, i.e. that it includes all of the indicia 122 and marking space 112 outlines that the ballot should include as defined by the selected 326, 327 template, and so is not torn, folded, altered and the like. Completeness checking 342 may also include checking that all pages of the ballot are present, which is particularly important for a plural page ballot. If the ballot is not complete 342, path "N" is taken and the ballot is rejected, e.g., is physically separated from the other ballots for manual verification and processing. Completeness checking 342 may also be checking that the ballot is authentic, e.g., that it is not a copy or counterfeit, which would include testing of anti-copy regions 150 for detecting copied ballots (where the characteristics of anti-copy regions 150 allow for testing at this point in process 300) and/or the verifying ballot identifier 220.

Optionally, and sometimes preferably, completeness checking 342 may be performed earlier in process 300, e.g., as part of a ballot authentication process which includes processing image data from the anti-copy regions 150 for detecting 322, 323 copied ballots. An example of a completeness checking process is included in FIG. 9. Alternatively, where the anti-copy region 150 feature employed does not render any ballot or voting information within anti-copy region 150 difficult to be read reliably from a copy of the ballot, detection of a copied ballot may optionally be included in step 342.

If the ballot is complete 342, the path "Y" is taken and the ballot is tested 346 to determine whether there is any optional write-in voting selection thereon. If testing 346 finds any one or more write-in voting selections, the path "Y" is taken and, preferably, the portion(s) of the ballot image containing a write-in voting selection(s) are stored 366, preferably along with the ballot BID for later verification, if necessary or desired. Typically, write-in voting selections are processed separately from voting selections from among the nominated candidates or other regular voting selections. Ballot processing then proceeds to the detail steps of decoding 350 the regular voting selections, i.e. those made by marking ones of mark space(s) 112. A ballot may or may not include a space or spaces for making an optional write-in selection or selections, e.g., because write-in voting may not be permitted or the contest does not admit to a write-in selection as in a Yes/No contest, and, even where such space or spaces are provided for receiving an optional write-in selection, a voter may or may not choose to use the write-in option.

If testing 346 finds no write-in voting selection is present, then path "N" is taken directly to the detail decoding 350 of regular voting selections. Decoding 350 includes a number of steps that determine whether each mark space 112 has been marked to indicate that a voting selection has been made or has not been so marked. For example, the pixels of the ballot image, e.g., in a TIFF or BMP or other bitmapped or pixelated format, for each mark space 112 are tested to determine whether it is a "light" (e.g., not marked) pixel or a "dark" (e.g., marked) pixel. The number of "light" and "dark" pixels for each mark space 112 are counted 352 and the counts of "light" and "dark" pixel are stored 354. Preferably, the ballot BID is associated with the stored counts of "light" and "dark" pixels thereof, e.g., for auditing and/or recount. If a sufficient portion of the tested pixels in a given mark space are "dark" pixels, then that mark space 112 is considered to be marked, e.g., as described below.

Testing 356 determines whether all of the mark spaces 112 of a contest have been counted 352 and the counts thereof stored 354. If not, path "N" is taken to go to 358 the next region of the contest repeat the pixel counting 352 and storing 354 until all of mark spaces 112 have been processed. When all mark spaces 112 of a contest have been processed, the path "Y" is taken from testing 356 to determine 360 whether the contest has been voted properly, i.e. whether the proper number of mark spaces have been marked. If the proper number of mark spaces 112 have been marked, the path "Y" is taken and the voting selection for that contest is counted 362. If either too many (over vote) or too few (under vote) mark spaces 112 have been marked, the path "N" is taken and the under vote or over vote is stored for later processing. If an under vote, the voting selections made can be counted 362, if the applicable law allows.

In addition, if there is a write-in voting selection, the fact thereof is tested 368 with the affirmative result of the all regions counted test 356 at path "Y" to determine 368 whether the contest is voted properly considering the presence of a write-in voting selection. If not, then path "N" is taken and an over vote or under vote is recorded 364. If the voting selection is determined 368 to be proper, then path "Y" is taken and the write-in voting selection is processed 380.

Following the counting of a voting selection 362, an under vote or over vote 364 or a "Y" determination 368, testing 370 determines whether all contests for that ballot have been counted and processed. If not, path "N" is taken to the next contest 372 which is then processed 350 and so forth as described. If yes, path "Y" is taken and the next ballot is then processed in like manner to that just described until all of the ballots have been processed and the voting selections thereon have been counted and tabulated 330.

Separate processing 380 of write-in voting selections may proceed as follows, typically after all the regular voting selections have been tabulated. Optionally, the write-in voting selections may be converted to alphanumeric characters by optical character recognition (OCR) 382. The stored 366 images of the write-in voting selections are accumulated 384, with their corresponding OCR result, if any, and are displayed for manual processing 386, including validation, by election officials. The display may be on a computer display or the like or may be a printed form, as may be desired and/or required by applicable law.

Preferably, write-in voting selection images are "clipped" from the ballot images and have the ballot BID associated therewith, and plural clipped images are displayed on one screen or printed on one page. Manually processed 386 valid write-in voting selections are counted and tabulated 330 with the total vote. In processing write-in voting selections, either the clipped image is displayed, or if the ballot BID is associated therewith, the entire ballot image may be displayed or the original ballot may be retrieved for use in manual processing 386. Where the ballots are read, not imaged, based upon comparison to a ballot template, only the result of reading the ballot is stored, and so the original ballot is preferably separated and kept for manual processing 386 of write-in voting selections.

A typical ballot image in a pixel or bitmap format may have a file size in the range of 3-500 kilobytes, depending upon the format and the degree of file compression utilized, but could be as large as 1-10 megabytes without file compression. A computer hard drive of the sort typically found in a current commercially available personal computer, e.g., of 100-200 gigabytes capacity, can easily store full-ballot images (of nominal or average 500 kilobyte size) for a population of 200,000-400,000 voters. One or more additional hard drives or one or more servers may be utilized for storing ballot images for larger populations, e.g., of a million or more voters. With the continuously increasing capacity or computer hard drives and the decreasing cost per unit storage capacity, personal computers provide a viable election ballot processing and storage capability for most jurisdictions.

Typically, full ballot images are stored initially on the hard drive of a computer and are later transferred to permanent storage media, e.g., a "write-once, read-many" (WORM) medium such as a CR-R disk, for long-term storage. Reduced images, whether by compression and/or by "clipping" the portions of the ballot image that include mark spaces, write-in voting spaces, identifiers and the like, and other information pertinent to voting selection other than the standard information and candidates names printed on the ballot, may be utilized to reduce the quantity of information that needs be processed on counting and tabulating the vote and/or that needs to be stored. Such techniques can be utilized reduce the size of each ballot image file to as low as 10 kilobytes or less.

FIG. 9 is a schematic flow diagram of an example authentication process 600 suitable for use with the ballot reading processes 300 of FIGS. 7 and 8. Authentication process 600 operates for detecting 610-620 copies of ballots by distinguishing the different characteristics of anti-copy regions 150 of original ballots 100 from the characteristics of such regions 150 in copies thereof. Optionally, authentication process 600 may include optional steps 620-628 for verifying the validity of the ballot identifier BID 120 decoded from the ballot and for determining whether the ballot imaged is complete. An "*" indicates optional steps of process 600 and one or more of those steps may be the steps included in checking for ballot completeness 342 and/or, with steps 610-620 including checking for ballot authenticity 342. Failure (N) of any test 610-628 results in the ballot being rejected 630 and subject to manual processing and/or investigation. Steps of process 600 may be performed in any suitable order and/or in parallel. It is noted that while some of these steps 620-628 may be intended for verifying ballot completeness, at least certain of those steps 620-628 may also contribute to detecting a copied ballot, e.g. steps 620, 622, 624 and/or 626 could be failed (N) because the ballot is a copy and the ability to read the BID, the relational check number, a fiducial mark and/or a mark space could be the result of the anti-copy feature interfering with the ability to decode information from the ballot image.

Distinguishing 610-620 an original ballot 100 from a copy thereof is based upon decoding 602 the anti-copy region or regions 150, or a predetermined portion thereof, from the portion of the ballot image corresponding to anti-copy regions 150 of ballot 100, and processing 610 the pixels from the decoded portion of the ballot image for comparing with a predetermined characteristic of such regions for a known original ballot. If the ballot is determined 610 to be original (Y), then it may continue being processed, however, if it is determined 610 to be a copy (N), then it is rejected and is subject to manual processing and/or investigation 630. Even if a ballot is determined 610 to be a copy (N), the image thereof may optionally be stored, as is preferred, e.g., for later inspection, examination, investigation, and/or verification.

As described above, anti-copy regions 150 appear substantially different, e.g., lighter or darker, in a copy than in an original ballot. For example, where anti-copy region 150 is relatively light in original ballot 100 and relatively dark in a copy thereof, determining whether a ballot is an original or a copy may include counting light pixels and dark pixels over all or a portion of one or more anti-copy regions 150, and then comparing that light/dark pixel count to the known count of light and dark pixels for an original ballot, so that any markings in an anti-copy region 150, such as a ballot identifier 120 or test space 152, may be taken into account. The same method is satisfactory where a dark anti-copy region appears substantially lighter in a copy thereof, except that the light and dark pixel counts will be quite different.

Similarly, where anti-copy region 150 introduces words, symbols or other patterns in a copied ballot, the pixel characteristics of those features may be compared to a known original ballot for determining whether the ballot is an original or a copy. Pixel characteristics considered may include a simple light/dark distinction, or may involve the relative intensity or lightness and/or darkness of particular pixels or groups of pixels. Where anti-copy regions 150 introduce distortions into the copy, then the locations of pixels or groups of pixels representing particular features of ballot 100 may be compared for distinguishing an original ballot from a copy. Where ballots are read rather than imaged, then light and dark characteristics of the anti-copy regions 150 read, or the portion thereof read, may be processed, e.g., compared, in similar manner to that described herein in relation to an imaged ballot. The same principles apply where anti-copy regions 150 are covert, e.g., not visible to the naked eye, and where the scanning apparatus employs special lighting to render the anti-copy features visible in the ballot image.

Optional verification 620 of ballot identifier BID 120 may include one or more of the following. Where the election jurisdiction maintains and provides a listing of all validly issued ballot BIDs, the ballot identifier read/decoded from ballot 100 may be compared 620 against such valid BID list and if a match is found (Y), the BID is valid and the ballot may be processed further. If the read/decoded BID is not on the list of valid BIDs, then that ballot is suspect and can or should be removed (N) for manual processing and/or investigation. Optionally, and additionally, the fact that a ballot having a given BID has been processed may be communicated to the election jurisdiction for indicating on the valid ballot BID list that such ballot has been presented (cast), whereby any subsequent ballot having the same ballot BID is immediately suspect as a duplicate or other invalid ballot, and is removed (N) for manual processing and/or investigation.

Alternatively, or additionally, where the BID is to include an optional relational check number that is calculated based upon the entire BID or upon particular fields thereof, that relational check number may be verified 622 by either recalculating it from the information decoded as the BID and comparing 622 the calculated relational check number to the relational check number included in the read/decoded BID, or by comparing 622 the relational check number from the listing of valid ballots against the relational check number decoded from the ballot image, or both.

Optional checking for completeness of ballot 100 may include verifying that the ballot image (whether read or imaged) includes 620 the BID, includes 624 all of the fiducial marks 122, includes 626 all of the mark spaces, includes 626 all of any special spaces or marks 152, includes 628 all of the pages and page numbers, and the like, or any combination thereof, in accordance with a standardized ballot specification, e.g., template, applicable to all ballots and/or in accordance with the ballot template for that ballot and ballot identifier.

The present arrangement also provides an indication of copying even when a ballot is copied in such a way as to attempt to minimize the differences between an original ballot 100 and a copy 100' thereof, e.g., as in setting the copy light/dark control of the copy machine to light so that the anti-copy region is not substantially darker in the copy 100' relative to original ballot 100. This "light" copying also tends to lighten the other features of the ballot 100 in the copies, such as the mark spaces 112 thereof. Mark spaces 112 are printed on original ballot 100 with a particular line width and gray-scale intensity so as to produce a certain pixel count when an image thereof is obtained, e.g., via a ballot scanner, and processed. When ballot 100 is copied "on the lighter side" using a copying machine, e.g., in an attempt to avoid the increased dark pixel count that would occur with normal a copy darkness setting or an automatic setting, the line width and gray scale of mark spaces 112 will be dramatically reduced in the copied ballot 100' relative to original ballot 100, and so when that copy 100' is read by the optical scanner the present arrangement will detect one or more of mark spaces 112 as missing and will thus reject the copied ballot 100', e.g., as being incomplete.

Figure 10A:
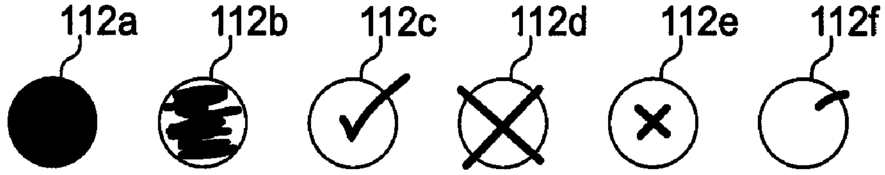
FIGS. 10A, 10B, and 10C are schematic diagrams of mark spaces of a ballot marked in a variety of ways and of details thereof.
Figure 10B:
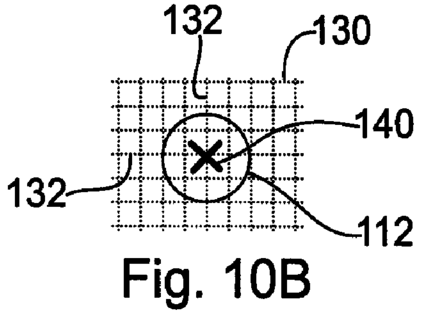
Figure 10C:
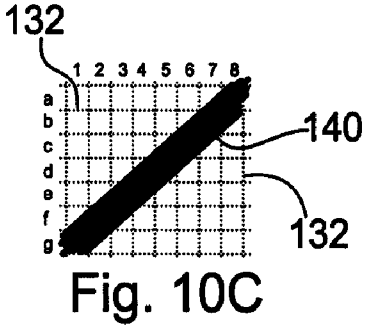

FIGS. 10A, 10B, and 10C are schematic diagrams of mark spaces 112 of a ballot 100 marked in a variety of ways and of enlarged diagrams illustrating details thereof, and are helpful to understanding a preferred aspect for counting voting selections.

FIG. 10A illustrates some of the various ways that a voter may mark a mark space 112 in making a voting selection. For example, mark space **112*a* has been fully marked by the voter so that it is essentially 100% filled in and there is no question that the voter intended to mark that region 112*a* and it should be counted as a vote. Mark space 112*b* is partially marked and may be about 50% filled in, and it is likely the voter intended to mark that region 112*b*** and it should be counted as a vote.

Similarly, mark spaces 112*c*, 112*d* and 112*e* are marked with a check, a large X and a small x, respectively, and it is likely that the mark was intended and should be counted as a vote. However, mark space 112*f* contains a small mark that may be an intended or unintended mark therein, and so may or may not be counted as a vote. Each ballot image captured by ballot reader in reading ballots 100 must be read to determine which ones of mark spaces 112 thereon have been marked sufficiently to count as being marked to indicate a voting selection and which ones have not. Details of a preferred counting arrangement are provided in the Patents and Patent Publications that are incorporated herein.

FIG. 10B illustrates a reading region 130 of a ballot which contains a marked mark space 112, e.g., one of many based on the applicable ballot template, e.g., the template selected 326, 327 from among the possible ballot templates using the BID number read/decoded 324, 325 from the ballot, a number of reading regions 130 each including one mark space 112 are selected from the ballot image. Each reading region 130 is preferably slightly larger than and includes one mark space 112 and includes a large number of pixels 132 as illustrated by the dotted grid lines, e.g., representing an over scan of mark space 112 which includes mark 140. A predetermined threshold of dark markable pixels (e.g., the "voted threshold") is established for determining that a mark space 112 has been marked (voted), e.g., between about 20% and about 50% of the maximum number of markable pixels 132 appears satisfactory, and is preferred.

FIG. 10C illustrates an enlarged view of a portion of reading region 130 which contains a portion of a mark 140 in mark space 112 (or of an outline of a mark space 112), and dashed lines indicate rows a, b, c, . . . and columns 1, 2, 3, . . . of pixels 132 on which a portion of a mark 140 (or a mark space 112 outline) is superimposed. While a mark 140 completely fills some pixels 132, it does not either completely fill or completely not fill all pixels 132, and so a criteria is needed to determine whether any given pixel is "dark" or is "light," i.e. not dark. A convenient criteria is that the pixel is considered "light" if the intensity (brightness) of a pixel is greater than 50% of full brightness and is considered "dark" if its intensity (brightness) is less than 50% of full brightness, although any other suitable level could be utilized. Pixel intensity (brightness) is tested for each pixel and each pixel is determined to be either "light" or "dark" and the total numbers of "light" and "dark" pixels, respectively, are counted for each reading region 130.

Figure 11A:
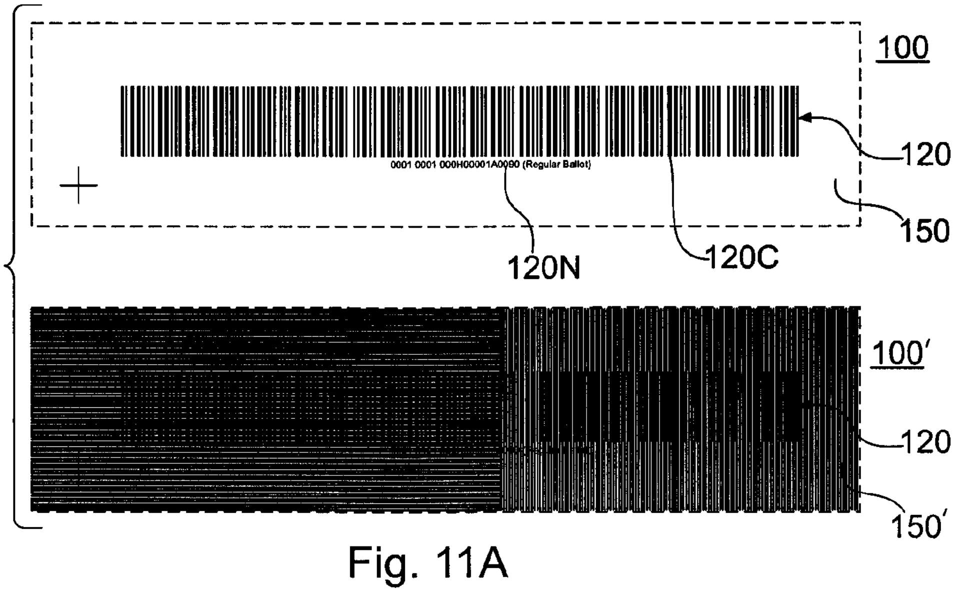
FIGS. 11A, 11B, 11C and 11D are schematic diagrams of example portions of an anti-copy region illustrating example differences between an original ballot and a copy thereof.
Figure 11B:
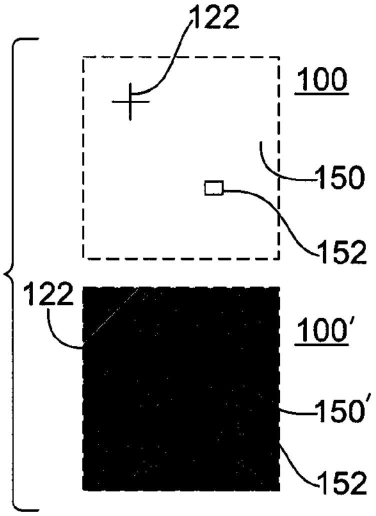
Figure 11C:
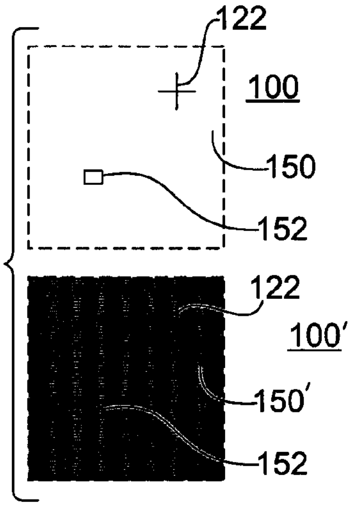
Figure 11D:
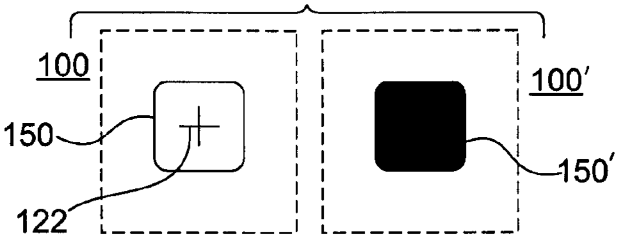

FIGS. 11A, 11B, 11C and 11D are schematic diagrams of example portions of an anti-copy region 150 of a ballot 100 illustrating examples of substantial differences between an original ballot 100 (top portion of each of FIGS. 11A-11C, left portion of FIG. 11D) and a copy thereof 100' (bottom portion of each of FIGS. 11A-11C, right portion of FIG. 11D). In this example, anti-copy region 150 has a large number of thin lines, or thin light symbols, that are in a color and/or intensity that tends to blend into the background when viewed with the naked eye. When copied, e.g., photocopied, however, these lines appear very dark in the copy, e.g., as if they were black as are the BID, mark spaces and other information printed on ballot 100. These thin light lines may be all in the same direction, e.g., all horizontal or all vertical, or in different directions, e.g., some horizontal and some vertical, and may be straight or not straight lines, e.g., curved or wavy, or may not be lines, but may be one or more characters and/or symbols. Further, the anti-copying features may be located in defined regions of the ballot 100, or may be over the entire ballot sheet 100.

In FIG. 11A, which might correspond to the lower band anti-copy region 150 in ballot 100 of FIG. 1, the ballot identifier 120 including a bar code BID 120C and a human readable BID 120N are clearly substantially darker in original ballot 100 than is the background of anti-copy region 150 which is relatively light. Anti-copy region 150 of this example includes, generally parallel horizontal lines in one portion thereof and generally parallel vertical lines in another portion thereof, and the vertical lines make reading bar code 120C extremely difficult, if not impossible. Thus, BID 120 is easily distinguishable and decodable in an image of original ballot 100 in which the count of light pixels will be relatively high (e.g., greater than about 50% of all pixels) and the count of dark pixels will essentially be those in the bars of bar code 120C and the characters of BID 120N, e.g., probably about 25-40% of all pixels. However, in an image of the copied ballot 100', the background of anti-copy region 150' is relatively dark and so the count of light pixels will be very low and the count of dark pixels will be extremely high, e.g., probably greater than 80%, and possibly approaching 100%, of all pixels. Thus, if a predetermined detection threshold between those levels were utilized, e.g., a threshold between about 20% and 40% light pixels were to be utilized, original 100 would be identifiable because its light pixel count is above the predetermined threshold and copy 100' would be identifiable because its light pixel count is below the predetermined threshold. Alternatively, a threshold for dark pixel counts of between about 40% and 80% of pixels being dark pixels would similarly allow identification of copy 100'.

In FIGS. 11B and 11C, which might correspond to the left and right end portions of the upper band anti-copy region 150 in ballot 100 of FIG. 1, fiducial marks 122 and test space 152 are clearly substantially darker in original ballot 100 than is the background of anti-copy region 150 which is relatively light. Anti-copy region 150 of this example includes generally parallel diagonal lines in FIG. 11B and generally wavy horizontal lines in FIG. 11C. Thus, fiducial marks 122 and test spaces 152 are easily distinguishable and decodable in an image of original ballot 100 in which the count of light pixels will be relatively high (e.g., greater than about 80% of all pixels) and the count of dark pixels will essentially be those in the fiducial marks 122 and the test space 152 outline, e.g., probably about 10-20% of all pixels. However, in an image of copied ballot 100', the background of anti-copy region 150' is relatively dark and so the count of light pixels will be very low and the count of dark pixels will be extremely high, e.g., probably greater than 80%, and possibly approaching 100%, of all pixels. Thus, if a predetermined detection threshold between those levels were utilized, e.g., a threshold between about 40% and 60% light pixels were to be utilized, original 100 would be identifiable because its light pixel count is above the predetermined threshold and copy 100' would be identifiable because its light pixel count is below the predetermined threshold. Alternatively, a threshold for dark pixel counts of between about 60% and 80% of pixels being dark pixels would similarly allow identification of copy 100'.

In FIG. 11D, anti-copy region 150 of example ballot 100 is a hologram or other diffractive material on which is printed fiducial mark 122 or through which fiducial mark 122 may be observed. In copied ballot 100', anti-copy hologram or other diffractive material 150' is completely dark and so fiducial mark 122 is not discernable in the copied ballot or in the image thereof. In this example, the pixel counting process above will properly distinguish an image of an original ballot 100 from an image of a copy 100' thereof, since essentially 100% of the pixels of diffractive material 150' will be dark pixels. Alternatively, in this example, whether or not fiducial mark 122 can be identified in an image of the ballot is sufficient to distinguish an image of an original ballot 100 from an image of a copy 100' thereof.

A convenient criteria is that the pixel is considered "light" if the intensity (brightness) of a pixel is greater than 50% of full brightness and is considered "dark" if its intensity (brightness) is less than 50% of full brightness, although any other suitable level could be utilized. Pixel intensity (brightness) can be tested for each pixel and each pixel is determined to be either "light" or "dark" and the total numbers of "light" and "dark" pixels, respectively, are counted for each anti-copy region 150 or for a predetermined portion or portions thereof. It is noted that only a portion or a few portions of anti-copy region 150 need be examined for identifying whether a ballot 100 is an original or a copy with an acceptable accuracy, and it may be preferred at least in certain cases that only portions or region 150 be examined, e.g., where plural different anti-copy features are provided and only some are considered, or where a more limited examination results in faster processing with a less complex and/or less expensive reader.

Further, and/or alternatively, the intensity of each pixel or group of pixels may be determined and compared against a predetermined pixel intensity for all or part of anti-copy region 150, which can be advantageous where the anti-copy feature of region 150 has a particular intensity in an image of an original ballot 100. Where, e.g., the anti-copy feature is a pattern of very thin lines of tint or color complementary to the background, the intensity thereof on an image of an original ballot may be relatively light, e.g., in a range of about 15-20%, whether or not the anti-copy pattern is visible to the naked eye. Thus, a pixel intensity in that region in a range of about 10-25% would indicate that the ballot imaged is an original ballot, whereas a different pixel intensity, either substantially lighter or darker, would indicate that the ballot imaged is a copy.

Thus, an original ballot 100 and a copied ballot 100' can be distinguished in respective images thereof obtained from a known ballot scanner by differing counts of light and dark pixels and/or by differing pixel intensities, relating to an anti-copy region 150, or to other features of a ballot that may be in an anti-copy region 150. It is noted that combinations of different anti-copy features may be employed on a single ballot, e.g., combinations of light horizontal lines and light vertical lines (particularly where the bar code 120C is printed), and it is preferred that the different features respond differently when copied, e.g., wherein one anti-copy feature darkens substantially and another anti-copy feature lightens or does not reproduce.

Figure 12:
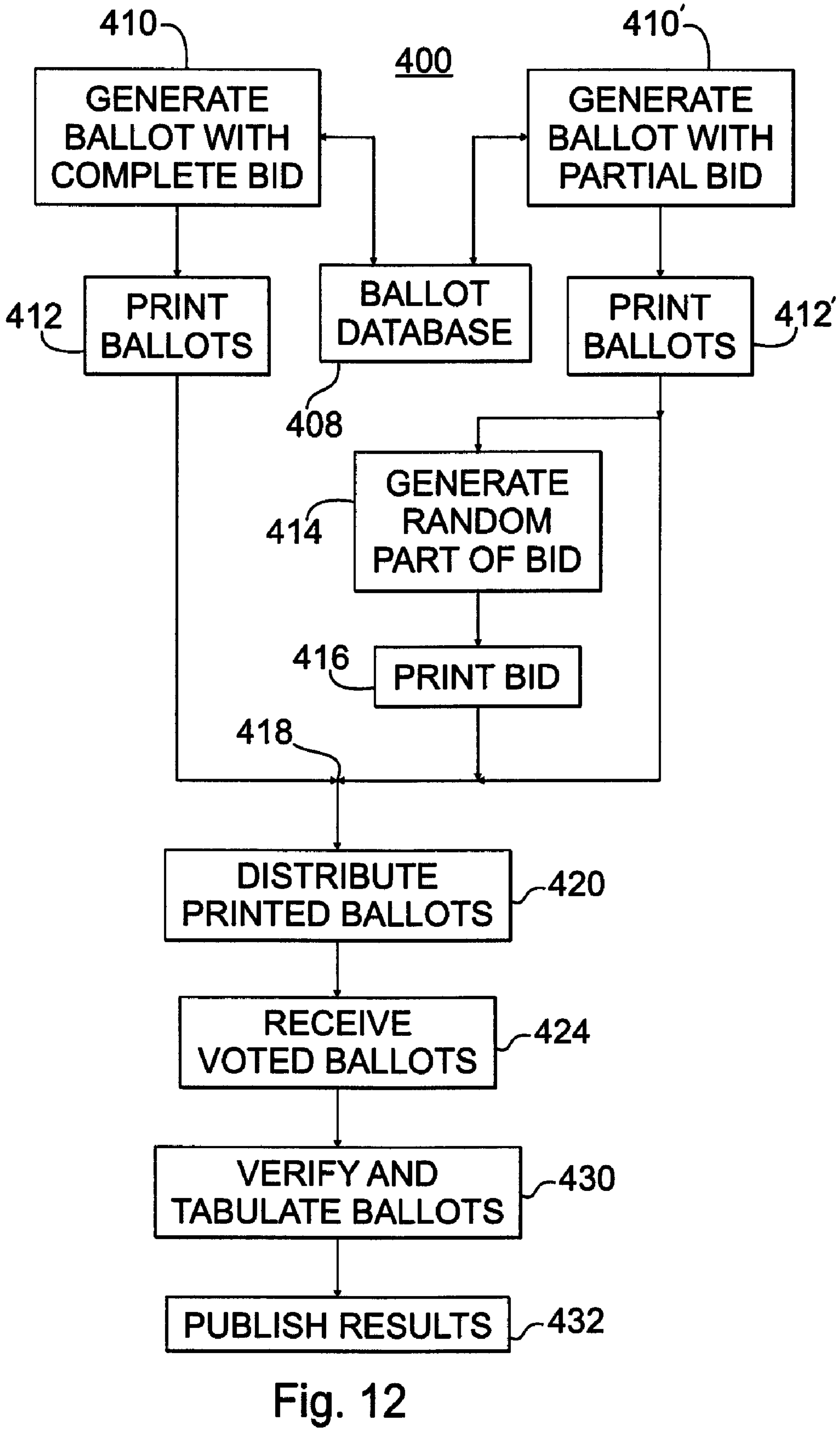
FIG. 12 is a schematic flow diagram of an example voting process utilizing the ballot of FIGS. 1 and 3A-3C.

FIG. 12 is a schematic flow diagram of an example process 400 for generating the ballots of FIGS. 1 and 3A-3C. In process 400, a ballot is generated 410, 410' including the contests and/or questions to be presented to the voters generated from information entered by election officials prior to an election. Typically, election officials generate a database 408 of ballot forms (styles) for the various jurisdictions, districts, polling locations and the like, and in the case of a primary, for each political party, each being associated with a particular jurisdictional portion of the ballot identifier (BID). In printing ballots, the appropriate form/style is selected from the database 408 thereof in accordance with the jurisdictional portion of a particular BID, e.g., ballot generation as described herein and/or in the Patents and Patent Publications incorporated herein.

Ballots may be generated 410 with a complete ballot identifier (BID), i.e. an identifier including the jurisdictional information (e.g., fields 381-386) and a unique random identifier (e.g., field 387), and printed 412 as a set of unique ballots, either in advance of an election and/or "on-demand" in an election. Ballots may be generated 410' with a partial ballot identifier (BID), i.e. an identifier including the jurisdictional information (e.g., fields 381-386), and printed 412' as a set of identical ballots either in advance of an election (e.g., conventional printing) and/or "on-demand" in an election. Such ballots may be utilized directly, i.e. without the unique identifier portion of the BID, or a unique random identifier (e.g., field 387) portion of a ballot identifier may be generated 414 and may be printed 416 on the ballots to provide a set of unique ballots and/or may be printed on labels to be affixed to the printed ballots at a later time. A list of the ballot identifiers utilized on ballots may be retained, e.g., in a database on a computer, for later use in verifying and/or authenticating voted ballots received 424, and may be without compromising voter anonymity and privacy where no record is kept that could relate a particular ballot to a particular voter. Further, printed ballots including the BID may be placed into envelopes, e.g., absentee ballots placed into mailing envelopes, by automated equipment to reduce the possibility of human action that may compromise privacy and/or anonymity.

In either case, ballots 100 may be printed on sheets having anti-copy regions 150 thereon or the anti-copy features may be printable by the ballot printers. Printed ballots with a complete or a partial jurisdictional BID are distributed 420 for being utilized by voters in voting in an election in accordance with the applicable election procedure, e.g., by marking their voting selections in the mark spaces provided. Ballots may be distributed 420 in advance of an election, e.g., as absentee ballots or as ballots for early voting, may be distributed 420 during an election as the usual ballot for all voters, e.g., at polling locations on an election day or days, and/or may be distributed 420 to particular voters, e.g., to voters voting provisionally. Voting and ballot processing may be as described in the Patents and Patent Publications incorporated herein.

Marked (voted) ballots are received 424, e.g., by election officials, the ballots having been submitted by mail, in-person or other delivery method, by deposit in ballot containers or delivery to an election official at a polling location or other designated location. Each ballot may be verified 430, including being verified as an original ballot and not a copy, and optionally for whether the ballot is a valid ballot for the particular election (possibly including whether the ballot is a duplicate of another ballot).

Upon return 424 of an absentee or provisional ballot and before opening it to obtain the ballot therein for counting, the outer envelope is read for authenticating/verifying 430 the absentee or provisional ballot and for indicating that the voter to whom is was provided has voted and/or for disqualifying the ballot if the voter has otherwise voted during the election. Once the absentee ballot is determined 430 to be a valid absentee ballot, the envelope is opened and the ballot therein is counted and tabulated 430 as described.

The verified (qualified) received ballots are then read as described herein (e.g., see FIGS. 7, 8 and 9) and tabulated 430, without the need for being sorted by election and/or ballot style and/or jurisdiction before reading and tabulating 430, to determine the result or outcome of the voting. The result/outcome of the election is certified and/or published 432 as required by the applicable election laws. Preferably, the tabulating 430 of voted ballots preserves the specific voting selections read from each ballot and the associated BID (e.g., voting record) of that ballot, as well as tallying the vote totals for determining the election outcome, and a listing of the voting selections and BID (voting record) from all ballots are published where the public can access same, e.g., on a bulletin board, in a printed publication and/or on an Internet web site. Thus, knowing the BID enables access to the listing and finding the vote recorded from a ballot by its BID, and can confirm that a particular vote has been counted and has been counted correctly and accurately, e.g., for election or other auditing officials, and optionally for voters. Thus, an incorrectly recorded vote may be corrected.

Figure 13:
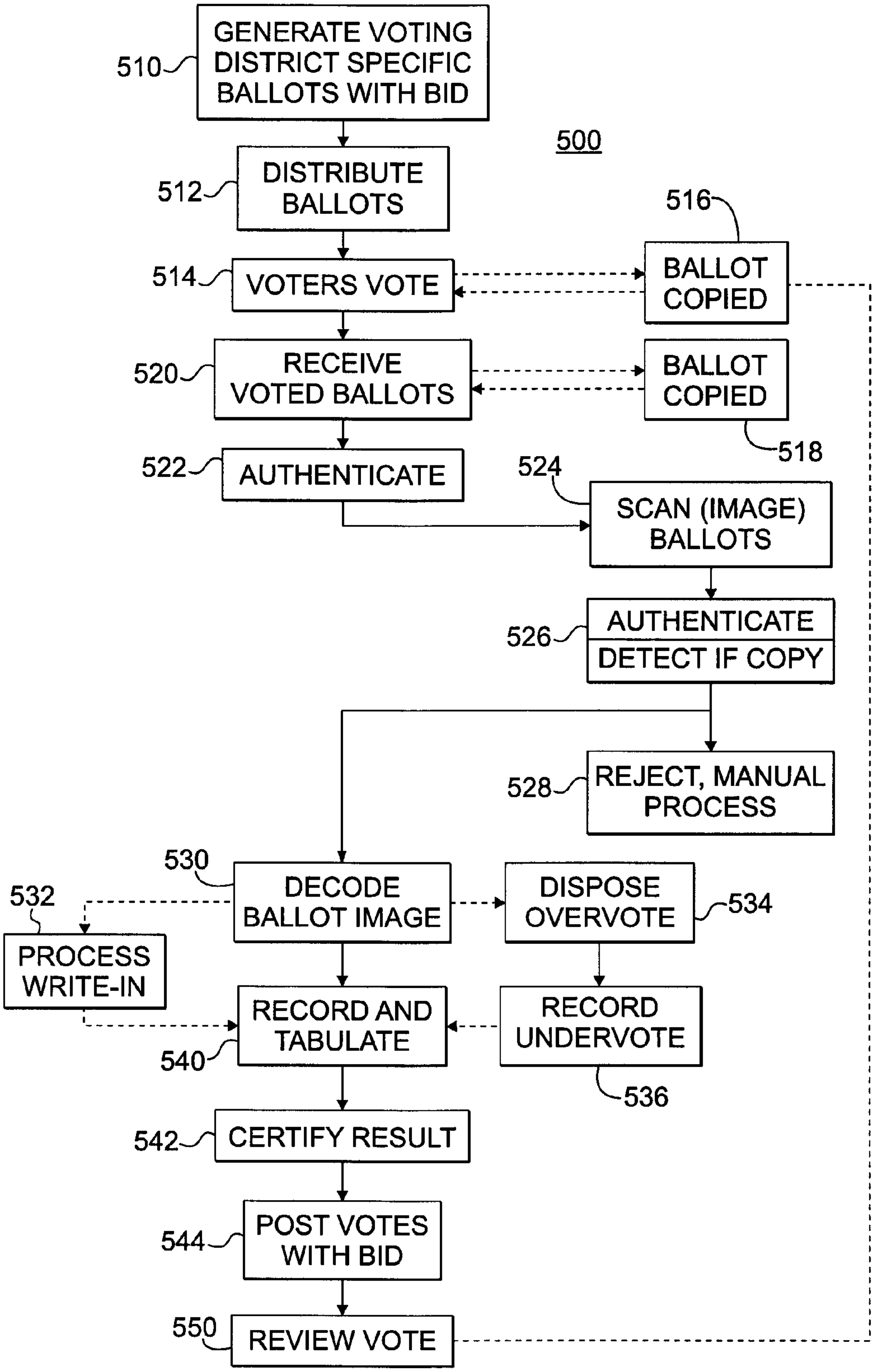
FIG. 13 is a schematic flow diagram of an example voting process utilizing the ballot of FIGS. 1 and 3A-3C.

FIG. 13 is a schematic flow diagram of an example voting process 500 utilizing the ballot of FIGS. 1 and 3A-3C. Voting district specific ballots are generated 510 and distributed 512 for being voted. Voters vote 514 by marking the mark spaces on the ballot corresponding to their desired voting selections (votes) and submit their ballots in accordance with applicable election procedure. A voter or other person may copy 516 the ballot, either before the ballot is marked or thereafter; copying before marking may be for unauthorized purposes such as obtaining extra ballots to vote, e.g., fraudulently, or may be for a legitimate purpose, e.g., for the voter later checking that his vote was counted and was counted properly, where such capability is permitted and enabled. Voted ballots are received 520 and the received voted ballots may optionally be authenticated 522 before being read (imaged) and counted. Optional authentication may be deemed not necessary under certain controlled circumstances, e.g., where the ballot is issued to the voter and the voter then marks and casts the ballot into a secure container all within an access controlled area. All the foregoing may be as described in relation to FIG. 12.

In addition, a ballot may be copied 518 after the ballot has been marked and received 520, however, such copying is probably for unauthorized purposes such as voting extra ballots, e.g., fraudulently, although there may be a possibility of a legitimate purpose, e.g., if election officials were to be permitted to make copies of ballots for later checking that the vote was counted and was counted properly. Received 520 voted ballots may optionally be authenticated 522 before being processed, e.g., manually or automatically verified as being authentic and/or valid for a given election, in addition to or as part of the authentication and copy detection 526 process described herein. In any event, the authentication and copy detection features of the system and method described herein will detect that a copied ballot is being processed and will provide suitable notification or indication thereof.

Ballots, whether or not having been optionally authenticated 522 as valid ballots, are then scanned (imaged) 524 and authenticated 526 to determine at least that the ballot is an original ballot 100 and is not a copy 100' thereof, e.g., as described herein. If the ballot is a copy, it is rejected 528 and optionally manually processed and/or investigated. If the ballot is determined to be authentic, e.g., not a copy, then the ballot image is decoded 530 for determining, e.g., the BID number printed thereon and the voting selections marked thereon, i.e. the voting selections marked on each ballot are read according to a ballot template selected because it corresponds to the jurisdictional portion of the BID decoded 530 from each ballot. Optional write-in votes, if any, are preferably read and processed 532 by optical character recognition (OCR) software from the decoded ballot image for computer tabulation 540, and/or ballots having write-in votes may be separated for manual processing (e.g. manual deciphering and posting) 532 and/or inspection and/or verification. As described, ballots are decoded 530 according to ballot templates selected based upon the decoded 530 BID and so do not need to be sorted by jurisdiction and/or style and/or orientation prior to reading 522-540.

Ballots over-voted (i.e. wherein more mark spaces than are permitted to be marked have been marked) may be disposed 534 by being separated or ejected for manual inspection and/or invalidation, and/or the valid portions of the voting selections may be recorded and tabulated 540, depending on the treatment of over-voted ballots under applicable law. Some jurisdictions invalidate only the voting selections made in over-voted contests and other jurisdictions invalidate an entire ballot that contain any over-vote. Ballots under-voted (i.e. wherein fewer mark spaces than are permitted to be marked have been marked) may be recorded separately 536 and/or the under-vote may be recorded separately 526 (e.g., for review and/or for statistical purposes), and the voting selections thereon are recorded and tabulated 540, and/or under-voted ballots may be separated for manual inspection, depending on the treatment of under-voted ballots under applicable law. Further, the read and/or imaged information for each under- and/or over-voted ballot may be printed out for review by election officials.

The voting selections from decoded 530 ballots is recorded 540 including the BID number from each ballot, i.e. the voting selections and BID of each ballot are recorded and stored 540 as an individual voting record, and the voting selections therefrom are also tabulated 540 to determine the result of voting. Preferably, the information read from each ballot, e.g., voting record of voting selections and BID, are stored in plural separate and independent memory devices, e.g., hard drives, flash memories, optical CD-ROM and the like, as described in the Patents and Patent Publications incorporated herein, for preservation with the original paper ballots where required in accordance with applicable procedures.

When the voting results tabulations are properly verified, the result is certified 542 as official. Thereafter, the certified results may be posted/published 544, e.g., on an Internet web site, including both the tabulated 540 result and/or the voting records including the BID 120 of each individual ballot 100, thereby enabling any one knowing a BID, e.g., from a ballot copy and/or a printed voting receipt, to review 550 the voting record corresponding to that BID to ascertain whether it was counted and, if counted, whether it was correctly counted. The posted/published 544 voting records can include not only those voting records for ballots that were authenticated 526 and thus counted 530, 540, but may also include the voting records for ballots that were disqualified, e.g., because they were determined to be copied, or otherwise not counted and/or not completely counted and/or the fact that the ballot of that BID was disqualified or was not counted and/or not completely counted.

In connection with the steps of decoding 530, recording and tabulating 540 and/or the processing of write-in, under and over-votes 532, 534, 536, for example, election officials may be provided with administrative and management tools, such as user rights and levels of access, passwords and the like, the keeping of logs of events and/or actions performed, functions to export (e.g., by electronic file transfer and/or via floppy disks, CD-ROMs and other tangible media) all or part of the files of vote tabulations, voting records, vote statistics and the like, and/or for the printing of various reports and/or forms, such as vote tallies, voting reports, vote certification forms and the like.

While the BID 120 information and other voting information may be provided to the voter on a paper ballot and/or on a paper or other identification card or receipt, or may be entered by an election official at the election office and/or polling place for printing on a ballot, BID 120 information may also be coded into the memory of a smart card and the voting machine may include a smart card reader for reading the coded smart card as described in the Patents and Patent Publications referred to herein.

The arrangement of the present application may be operated in conjunction with various sheet reader/imager apparatus and methods, and marking sheets and/or ballots, suitable ones of which are available from Avante International Technology, 70 Washington Road, Princeton, N.J. Suitable examples with which the present arrangement may be employed are described, for example, in U.S. Pat. No. 6,892,944 entitled "Electronic Voting Apparatus and Method for Optically Scanned Ballot" issued May 17, 2005, U.S. Pat. No. 7,077,313 entitled "Electronic Voting Method for Optically Scanned Ballot" issued Jul. 18, 2006, in US Patent Publication No. 2006/0255145 entitled "Method for Reading An Optically Readable Sheet" published Nov. 16, 2006, in U.S. patent application Ser. No. 11/068,034 entitled "Method for Processing A Machine Readable Ballot and Ballot Therefor" filed Feb. 28, 2005, in US Patent Publication No. 2007/0170253 entitled "Electronic Voting Method and System Employing a Printed Machine Readable Ballot" published Jul. 26, 2007, and in US Patent Publication No. 2006/0202031 entitled "Reader for an Optically Readable Ballot" published Sep. 14, 2006, each of which is hereby incorporated herein by reference in its entirety.

The arrangement of the present application may be operated in conjunction with various electronic voting machines, also referred to as electronic voting apparatus and/or as a direct recording electronic (DRE) voting apparatus. Examples of suitable voting apparatus, and features and methods employed therewith, are available from Avante International Technology, 70 Washington Road, Princeton, N.J. Suitable examples with which the present arrangement may be employed are described in U.S. Pat. No. 7,036,730 entitled "Electronic Voting Apparatus, System and Method" issued May 2, 2006, in U.S. Patent Publication No. 2004-0046021 entitled "Electronic Voting Apparatus, System and Method" dated Mar. 11, 2004, in U.S. Patent Publication No. 2003-0034393 entitled "Electronic Voting Apparatus, System and Method" dated Feb. 20, 2003, in U.S. Patent Publication No. 2006-0169778 entitled "Electronic Voting Apparatus, System and Method" dated Aug. 3, 2006, and in International PCT Patent Publication WO 2002/070998 entitled "Electronic Voting Apparatus, System and Method" published Sep. 12, 2002, each of which is hereby incorporated herein by reference in its entirety.

An optically readable markable ballot sheet 100 may have an anti-copy feature 150 for indicating that the ballot sheet 100 is an original or is a copy 100' and 100 may be for being read by a machine capable of distinguishing the anti-copy feature 150. Optically readable markable ballot sheet 100 may comprise a markable ballot sheet having a ballot identifier region 120 thereon including a unique ballot sheet identifier 120C, 120N, wherein the unique ballot sheet identifier 120C, 120N is machine readable, the markable ballot sheet 100 having fiducial marks 122 thereon indicating the orientation of ballot sheet 100, wherein the fiducial marks 122 are machine readable, the markable ballot sheet 100 also having one or more marking regions 110 thereon, each marking region 110 having two or more mark spaces 112 therein for making voting selections; and wherein the mark spaces 112 are machine readable, the markable ballot sheet 100 further having a copy revealing region 150 having an anti-copy feature 150 therein, the anti-copy feature 150 including a pattern of indicia that have a predetermined characteristic and that reproduce in a copy 100' of the markable ballot sheet 100 as having a substantially different characteristic, and wherein the unique ballot sheet identifier 120C, 120N or one or more of the fiducial marks 122 or one or more mark spaces 112 or a combination thereof are in whole or in part within the copy revealing region 150 of the markable ballot sheet 100, whereby the anti-copy feature 150, or the unique ballot sheet identifier 120C, 120N, or the one or more of the fiducial marks 122, or the one or more mark spaces 112, or a combination thereof, within the copy revealing region 150 are more evident or are less evident in a copy 100' of the markable ballot sheet 100 than in the original markable ballot sheet 100. The anti-copy feature 150 may be evident to the human eye in an original markable ballot sheet 100, or may be evident to the human eye in a copy 100' of an original markable ballot sheet 100, or may be evident to the human eye in an original markable ballot sheet 100 and in a copy 100' of the original markable ballot sheet 100. The anti-copy feature 150 may include a hologram, a micro-embossed hologram, a photopolymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of said markable sheet, or a combination of any or all of the foregoing. The unique ballot sheet identifier 120C, 120N may include a bar code, a two-dimensional bar code, a prescribed font, optical character recognition (OCR) characters, alphanumeric characters, non-alphanumeric characters, symbols, or a combination thereof; or may identify a template corresponding to the two or more mark spaces 112 for making voting selections in each of the plurality of contest regions; or may not be related to the identity of any individual voter; or may be represented by characters 120N that are machine readable and are human readable; or may be a combination of any or all of the foregoing. The mark spaces 112 for making voting selections may include mark spaces 112 for one or more of a "no vote," an "abstain," a "skip contest," and/or a write in selection; or a plurality of mark spaces 112 may be provided for each voting selection of at least one contest, wherein the plurality of mark spaces 112 are for one or more of cumulative voting, ranked voting, and/or instant run-off voting; or both.

An optically readable markable sheet 100 may have an anti-copy feature 150 for indicating that the sheet is an original or is a copy 100' and may be for being read by a machine capable of distinguishing the anti-copy feature 150. Optically readable markable sheet 100 may comprise: a markable sheet 100 having an identifier region 120 thereon including a unique sheet identifier 120C, 120N, wherein the unique sheet identifier 120C, 120N is machine readable, the markable sheet 100 having fiducial marks 122 thereon indicating the orientation of the sheet, wherein the fiducial marks 122 are machine readable, the markable sheet 100 also having one or more marking regions 110 thereon, each marking region 110 having two or more mark spaces 112 therein for making selections; and wherein the mark spaces 112 are machine readable, the markable sheet 100 further having a copy revealing region 150 having an anti-copy feature 150 therein, the anti-copy feature 150 including a pattern of indicia that have a predetermined characteristic and that reproduce in a copy 100' as having a substantially different characteristic, and wherein the unique sheet identifier 120C, 120N or one or more of the fiducial marks 122 or one or more mark spaces 112 or a combination thereof are in whole or in part within the copy revealing region 150, whereby the unique sheet identifier 120C, 120N or the one or more of the fiducial marks 122 or the one or more mark spaces 112, or a combination thereof, within the copy revealing region 150 are more evident or are less evident in a copy 100' of the markable sheet 100 than in the original markable sheet 100. The anti-copy feature 150 may be evident to the human eye in an original markable sheet 100, or may be evident to the human eye in a copy 100' of an original markable sheet 100, or may be evident to the human eye in an original markable sheet 100 and in a copy 100' of the original markable sheet 100. The anti-copy feature 150 may include a hologram, a micro-embossed hologram, a photopolymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the markable sheet, or a combination of any or all of the foregoing.

An optical reader 1000 for reading an optically readable markable ballot sheet 100 having a ballot sheet identifier 120C, 120N and an anti-copy feature 150 thereon, wherein the optical reader may comprise: an imager 1031, 1032, or both, for imaging the ballot sheet 100 wherein the image includes the ballot sheet identifier 120C, 120N, the anti-copy feature 150 and voting selections marked in mark spaces 112 on the ballot sheet 100; a processor 1050 for determining from the anti-copy feature 150 in the image of the ballot sheet 100 whether the ballot sheet 100 is an original ballot sheet 100, and, if the ballot sheet 100 is an original ballot sheet 100: the processor 1050 for decoding from the image of the ballot sheet 100 the ballot sheet identifier 120C, 120N for selecting a template defining locations of mark spaces 112, and the processor 1050 for decoding from the image of the ballot sheet 100 the mark spaces 112 in accordance with the selected template for recording the voting selections marked on the ballot sheet 100, whereby the voting selections marked on an original ballot sheet 100 are decoded and recorded in accordance with a template corresponding to the ballot sheet identifier 120C, 120N. The processor 1050 may determine whether the ballot sheet 100 is an original ballot sheet 100 from an anti-copy feature 150 having a pattern of indicia that have a predetermined characteristic and that reproduce in a copy of the ballot sheet as having a substantially different characteristic. The anti-copy feature 150 of the ballot sheet 100 may include a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing. The optically readable markable ballot sheet 100 may have a fiducial mark 122 thereon, and the processor 1050 may decode from the image of the ballot sheet 100 the fiducial mark 122 for determining the orientation of the ballot sheet 100 and for aligning the selected template and the image of the ballot sheet 100. Processor 1050 may compare the mark spaces 112 decoded from the image of the ballot sheet 100 and the mark spaces 112 defined by the selected template for determining the completeness of the ballot sheet 100. Processor 1050 may determine whether the ballot sheet 100 is an original ballot sheet 100 may include: the processor 1050 counting from the image of the ballot sheet 100 the number of light pixels or the number of dark pixels or the numbers of light and dark pixels for the anti-copy feature 150; and the processor 1050 comparing the number of light pixels or the number of dark pixels or the numbers of light and dark pixels for the anti-copy feature 150 with a predetermined pixel count for the anti-copy feature 150 for the determining whether the ballot sheet 100 is an original ballot sheet 100. Processor 1050 may decode from the image of the ballot sheet 100 the mark spaces 112 in accordance with the selected template for recording the voting selections marked on the ballot sheet 100 and may comprise: the processor 1050 counting the number of light pixels and dark pixels for each mark space 112; the processor 1050 determining from the counts of light and dark pixels for each mark space 112 whether the mark space 112 therein is an unmarked outline or is marked as a voting selection; and the processor 1050 recording each determined marked voting selection.

A method 300, 500, 600 for reading an optically readable markable ballot sheet 100 having a ballot sheet identifier 120C, 120N and an anti-copy feature 150 thereon, may comprise: imaging 321, 324, 524 the ballot sheet 100 including imaging 321,324, 524 the ballot sheet identifier 120C, 120N, the anti-copy feature 150 and voting selections marked in mark spaces 112 on the ballot sheet 100; determining 325-327, 530, 600 from the anti-copy feature 150 in the image of the ballot sheet 100 whether the ballot sheet 100 is an original ballot sheet 100, and, if the ballot sheet 100 is an original ballot sheet 100: decoding 324, 325, 530 from the image of the ballot sheet 100 the ballot sheet identifier 120C, 120N for selecting 326, 327 a template defining locations of mark spaces 112; and decoding 328, 329, 530 from the image of the ballot sheet 100 the mark spaces 112 in accordance with the selected template for recording the voting selections marked on the ballot sheet 100, whereby the voting selections marked on an original ballot sheet 100 are decoded 324, 325, 530 and recorded 330, 332, 540 in accordance with a template corresponding to the ballot sheet identifier 120C, 120N. Determining 325-327, 530, 600 whether the ballot sheet 100 is an original ballot sheet 100 may include determining 600 from an anti-copy feature 150 having a pattern of indicia that have a predetermined characteristic and that reproduce in a copy 100' of the ballot sheet 100 as having a substantially different characteristic. The anti-copy feature 150 of the ballot sheet

100 may include a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing. The optically readable markable ballot sheet 100 may have a fiducial mark 122 thereon, and the method 300, 500 may include decoding 328, 329, 530 from the image of the ballot sheet 100 the fiducial mark 122 for determining the orientation of the ballot sheet 100 and for aligning the selected template and the image of the ballot sheet 100. The method 300, 500, 600 may further comprise comparing 350, 626 the mark spaces 112 decoded from the image of the ballot sheet 100 and the mark spaces 112 defined by the selected template for determining 600 the completeness of the ballot sheet 100. Determining 322, 323, 526 whether the ballot sheet 100 is an original ballot sheet 100 may include: counting 350 from the image of the ballot sheet 100 the number of light pixels or the number of dark pixels or the numbers of light and dark pixels for the anti-copy feature 150; and comparing 350 the number of light pixels or the number of dark pixels or the numbers of light and dark pixels for the anti-copy feature 150 with a predetermined pixel count for the anti-copy feature 150 for the determining whether the ballot sheet 100 is an original ballot sheet 100. Decoding 328, 329, 530 from the image of the ballot sheet 100 the mark spaces 112 in accordance with the selected template for recording 330, 540 the voting selections marked on the ballot sheet 100 may comprise: counting 350 the number of light pixels and dark pixels for each mark space 112; determining 328, 329, 530 from the counts of light and dark pixels for each mark space 112 whether the mark space 112 therein is an unmarked outline or is marked as a voting selection; and recording 330, 332, 540 each determined marked voting selection.

A method 300, 500, 600 for reading an optically readable ballot sheet 100 having a copying revealing region 150 thereon including an anti-copy feature 150 that has a predetermined intensity when viewed under a first lighting condition and that has a lighter or darker intensity when viewed under a second artificial lighting condition, the ballot sheet 100 further having plural marking features 112, 120, 122, 152 thereon at least some of which are within the copy revealing region 150 and some of which are not within the copy revealing region 150, may comprise: imaging 321, 324, 524 the ballot sheet 100 under the second artificial lighting condition, the image including the copying revealing region 150 having the anti-copy feature 150 and the plural marking features 112, 120, 122, 152; determining 322, 323, 526, 600 from the image of the ballot sheet 100 the intensity of at least a part of the anti-copy feature 150; decoding 325, 326, 328, 329, 530, 602 from the image of the ballot sheet 100 at least one of the marking features 120, 122, 152 that are within the copy revealing region 150; comparing the intensity of the at least part of the anti-copy feature 150 or the intensity of the at least one marking features 120, 122, 152 or both with a predetermined anti-copy feature 150 intensity for determining whether the ballot sheet 100 is an original ballot sheet 100, and, if the ballot sheet 100 is an original ballot sheet 100: decoding 324, 325,530, 602 from the image of the ballot sheet 100 a ballot sheet identifier 120C, 120N for selecting 326, 327 a template defining locations of mark spaces 112; and decoding 328, 329, 530 the mark spaces 112 from the image of the ballot sheet 100 in accordance with the selected template for recording 330, 332, 540 the voting selections marked on the ballot sheet 100, whereby the voting selections marked on an original ballot sheet 100 are decoded and recorded in accordance with a template corresponding to the ballot sheet identifier 120C, 120N. The predetermined anti-copy feature 150 intensity may include a first predetermined intensity relating to the at least part of the anti-copy feature 150 and a second predetermined feature intensity relating to the at least one of the marking features 120C, 120N. 25. The determining 322, 323, 526, 600 from the image of the ballot sheet 100 the intensity of at least a part of the anti-copy feature 150 may include determining 322, 323, 526, 600 from an anti-copy feature 150 having a pattern of indicia that have a predetermined characteristic and that reproduce in a copy 100' of the ballot sheet 100 as having a substantially different characteristic. The anti-copy feature 150 of the ballot sheet 100 may include a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing. Optically readable markable ballot sheet 100 may have a fiducial mark 122 thereon that may be decoded 324, 325, 328, 329, 530, 600 from the image of the ballot sheet 100 for determining 340 the orientation of the ballot sheet 100 and for aligning the selected template and the image of the ballot sheet 100. Mark spaces 112 decoded 324, 325,530, 602 from the image of the ballot sheet 100 and mark spaces 112 defined by the selected template may be compared for determining 624 the completeness of the ballot sheet 100.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. Embodiments of different sizes, shapes and dimensions may employ the described arrangements.

It is noted that while the relational check number is/are referred to as "numbers," each may include numerical, alphabetic, alpha-numeric and other characters and symbols, conventional or arbitrary, as may be desired. Information is typically represented and/or stored in accordance with a predetermined formula or algorithm or other scheme, either on a character by character basis or on the basis of one or more combinations of the characters or values, for example, binary, binary coded decimal, hexadecimal, or any other digital coding representation thereof. A parity or check number or code is likewise representative of the information represented or stored in accordance with a predetermined formula or algorithm or other scheme, either on a character by character basis or on the basis of one or more combinations of the characters or values stored in the memory. Suitable formula and algorithms therefor include, e.g., binary, binary coded decimal, other digital coding representations thereof, parity checks or other parity representations, sum checks, field relationship checks or any other predetermined relationship between the data or information and the parity or check number or code.

The present arrangement can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disk (CD)-ROMs (whether or not writeable), DVD digital disks, RAM and ROM memories, computer hard drives and back-up drives, external hard drives, "thumb" drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, a punched card reader, a magnetic tape reader, a magnetic card reader, an optical scanner, as well as machines for reading the storage media mentioned above.

While the present invention has been described in terms of the foregoing example embodiments, variations within the scope and spirit of the present invention as defined by the claims following will be apparent to those skilled in the art. For example, while the identifier (e.g., BID number) of a sheet must be machine readable for automatic tabulation of votes, the machine-readable BID may be the same as the desirable human-readable BID, i.e. alphanumeric characters readable by people as well as machines (e.g., readers having OCR) may be utilized.

Moreover, any arrangement described in relation to a particular form of voting (e.g., absentee or provisional voting) may be utilized in relation to any other form of voting (e.g., regular or early voting) as well.

Further, the ballot or sheet identifier (BID) may include any one or more of the fields described and/or additional or different fields, as may be appropriate and/or desirable. Each identifier (BID) includes one or more fields containing a representation of jurisdictional information and/or a ballot form, and may include one or more fields containing a unique random portion, and optionally a relational check portion. Herein, an identifier may be or be referred to as a ballot identifier and/or a voting session identifier, e.g., where the ballot is generated with an identifier in a voting session of an election, i.e. in recording a voter's vote or is generated apart from a voting session and any voter, and/or may be referred to as a voter identifier in relation to a particular voter (even if random and anonymous).

While ballots are generally referred to herein as "paper" ballots, it is understood that while present day sheet ballots are typically of paper or of a somewhat heavier stock, paper ballot as used herein is intended to include paper, heavy paper, card stock, cardboard, plastic, punch card and other forms of ballots on a sheet of material. While sheet ballots are most commonly read by optical scanning when the ballot passes a light source and the marked or unmarked state of the mark regions is sensed or imaged by an associated light detector, marking may be detected by other means such as a mechanical and/or electrical sensing and detecting.

Where ballots are separately processed, such processing may be automated or manual, or may be a combination thereof. Separate processing may be utilized where ballots include a write-in vote, an overvote, an undervote, where a ballot appears to be missing voting mark spaces, ballot identifier and/or fiducial marks, and/or wherein such features have not been properly read and/or imaged, and/or if a ballot is deemed a copy or otherwise not authentic.

In any of the arrangements described herein, a printer may be associated with a ballot reader, e.g., such as reader 1000 described in relation to FIG. 6, for providing a voting receipt and/or confirmation that a ballot has been properly read. Such receipt may be a simple confirmation of a readable ballot, a listing of voting selections and/or may include a printout of a full ballot image, or anything in between. It may be desirable for the printed version of the voter's full ballot to be submitted as the official vote after the voter has opportunity to verify its accuracy and completeness. Such printed ballot version would have fully blackened mark spaces 112 for each voting selection made thereby to further reduce the already extremely low rate of questionable vote counting error typically obtained with the described arrangements.

The marking sheets, apparatus and method hereof may be utilized in fields and applications in addition to elections and voting, e.g., in the grading/marking of examinations and tests such as school and university tests, professional tests, in racing and wagering, in surveys and data collection, and the like, wherein, e.g., the voter is a test taker and an answer sheet replaces the ballot in the tallying and tabulating of surveys and questionnaires (replacing the ballots), in the reading and tabulation of gaming sheets (replacing the ballots) such as for races and lotteries, in the taking of surveys and/or in the gathering of information, and the like.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. An optical reader for reading an optically readable markable ballot sheet having a ballot sheet identifier and an anti-copy feature thereon, the optical reader comprising:

an imager for imaging the ballot sheet wherein the image includes the ballot sheet identifier, the anti-copy feature and voting selections marked in mark spaces on the ballot sheet;

a processor for determining from the anti-copy feature in the image of the ballot sheet whether the ballot sheet is an original ballot sheet, and, if the ballot sheet is an original ballot sheet:

the processor for decoding from the image of the ballot sheet the ballot sheet identifier for selecting a template defining locations of mark spaces, and the processor for decoding from the image of the ballot sheet the mark spaces in accordance with the selected template for recording the voting selections marked on the ballot sheet, whereby the voting selections marked on an original ballot sheet are decoded and recorded in accordance with the template corresponding to the ballot sheet identifier.

2. The optical reader of claim 1 wherein said processor determines whether the ballot sheet is an original ballot sheet from an anti-copy feature having a pattern of indicia that have a predetermined characteristic and that reproduce in a copy of the ballot sheet as having a substantially different characteristic.

3. The optical reader of claim 2 wherein the anti-copy feature of the ballot sheet includes a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing.

4. The optical reader of claim 1 wherein the optically readable markable ballot sheet has a fiducial mark thereon, the processor for decoding from the image of the ballot sheet the fiducial mark for determining the orientation of the ballot sheet and for aligning the selected template and the image of the ballot sheet.

5. The optical reader of claim 1 wherein the processor compares the mark spaces decoded from the image of the ballot sheet and the mark spaces defined by the selected template for determining the completeness of the ballot sheet.

6. The optical reader of claim 1 wherein said processor for determining whether the ballot sheet is an original ballot sheet includes:

the processor counting from the image of the ballot sheet the number of light pixels or the number of dark pixels or the numbers of light and dark pixels for the anti-copy feature; and the processor comparing the number of light pixels or the number of dark pixels or the numbers of light and dark pixels for the anti-copy feature with a predetermined pixel count for the anti-copy feature for said determining whether the ballot sheet is an original ballot sheet.

7. The optical reader of claim 1 wherein the processor for decoding from the image of the ballot sheet the mark spaces in accordance with the selected template for recording the voting selections marked on the ballot sheet comprises:

the processor counting the number of light pixels and dark pixels for each mark space;

the processor determining from the counts of light and dark pixels for each mark space whether the mark space therein is an unmarked outline or is marked as a voting selection; and the processor recording each determined marked voting selection.

8. A method for reading an optically readable markable ballot sheet having a ballot sheet identifier and an anti-copy feature thereon, the method comprising:

imaging the ballot sheet including imaging the ballot sheet identifier, the anti-copy feature and voting selections marked in mark spaces on the ballot sheet;

determining from the anti-copy feature in the image of the ballot sheet whether the ballot sheet is an original ballot sheet, and, if the ballot sheet is an original ballot sheet:

decoding from the image of the ballot sheet the ballot sheet identifier for selecting a template defining locations of mark spaces; and decoding from the image of the ballot sheet the mark spaces in accordance with the selected template for recording the voting selections marked on the ballot sheet, whereby the voting selections marked on an original ballot sheet are decoded and recorded in accordance with the template corresponding to the ballot sheet identifier.

9. The method of claim 8 wherein said determining whether the ballot sheet is an original ballot sheet includes determining from an anti-copy feature having a pattern of indicia that have a predetermined characteristic and that reproduce in a copy of the ballot sheet as having a substantially different characteristic.

10. The method of claim 9 wherein the anti-copy feature of the ballot sheet includes a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing.

11. The method of claim 8 wherein the optically readable markable ballot sheet has a fiducial mark thereon, the method including decoding from the image of the ballot sheet the fiducial mark for determining the orientation of the ballot sheet and for aligning the selected template and the image of the ballot sheet.

12. The method of claim 8 further comprising comparing the mark spaces decoded from the image of the ballot sheet and the mark spaces defined by the selected template for determining the completeness of the ballot sheet.

13. The method of claim 8 wherein said determining whether the ballot sheet is an original ballot sheet includes:

counting from the image of the ballot sheet the number of light pixels or the number of dark pixels or the numbers of light and dark pixels for the anti-copy feature; and comparing the number of light pixels or the number of dark pixels or the numbers of light and dark pixels for the anti-copy feature with a predetermined pixel count for the anti-copy feature for said determining whether the ballot sheet is an original ballot sheet.

14. The method of claim 8 wherein said decoding from the image of the ballot sheet the mark spaces in accordance with the selected template for recording the voting selections marked on the ballot sheet comprises:

counting the number of light pixels and dark pixels for each mark space;

determining from the counts of light and dark pixels for each mark space whether the mark space therein is an unmarked outline or is marked as a voting selection; and recording each determined marked voting selection.

15. A method for reading an optically readable ballot sheet having a copying revealing region thereon including an anti-copy feature that has a predetermined intensity when viewed under a first lighting condition and that has a lighter or darker intensity when viewed under a second artificial lighting condition, the ballot sheet further having plural marking features thereon at least some of which are within the copy revealing region and some of which are not within the copy revealing region, said method comprising:

imaging the ballot sheet under the second artificial lighting condition, the image including the copying revealing region having the anti-copy feature and the plural marking features;

determining from the image of the ballot sheet the intensity of at least a part of the anti-copy feature;

decoding from the image of the ballot sheet at least one of the marking features that are within the copy revealing region;

comparing the intensity of the at least part of the anti-copy feature or the intensity of the at least one marking features or both with a predetermined anti-copy feature intensity for determining whether the ballot sheet is an original ballot sheet, and, if the ballot sheet is an original ballot sheet:

decoding from the image of the ballot sheet a ballot sheet identifier for selecting a template defining locations of mark spaces; and decoding the mark spaces from the image of the ballot sheet in accordance with the selected template for recording the voting selections marked on the ballot sheet, whereby the voting selections marked on an original ballot sheet are decoded and recorded in accordance with the template corresponding to the ballot sheet identifier.

16. The method of claim 15 wherein the predetermined anti-copy feature intensity includes a first predetermined intensity relating to the at least part of the anti-copy feature and a second predetermined feature intensity relating to the at least one of the marking features.

17. The method of claim 15 wherein said determining from the image of the ballot sheet the intensity of at least a part of the anti-copy feature includes determining from an anti-copy feature having a pattern of indicia that have a predetermined characteristic and that reproduce in a copy of the ballot sheet as having a substantially different characteristic.

18. The method of claim 15 wherein the anti-copy feature of the ballot sheet includes a hologram, a micro-embossed hologram, a photo-polymer hologram, a holographic diffractive region, a light diffractive region, a hologram with or without over printing, a diffractive optical variable image device (DOVID), a diffractive material, a light reflecting ink, a light absorbing ink, a color-shifting ink, a light reflecting tint, a light intensity responsive variable ink, a light intensity responsive variable tint, an embedded graphic, an embedded image, an embedded text, a line-screen pattern having a particular combination of line frequencies and/or print densities, a latent image, a line-screen pattern on a tinted or other background, a latent line-screen pattern image embedded in a different line-screen pattern, lines printed at one or more interference scanning frequencies, a laser moiré interference pattern, micro perforations, a hidden message, a hidden image, a number of generally parallel lines, a number of generally parallel lines of tint similar to that of the ballot sheet, or a combination of any or all of the foregoing.

19. The method of claim 15 wherein the optically readable markable ballot sheet has a fiducial mark thereon, the method including decoding from the image of the ballot sheet the fiducial mark for determining the orientation of the ballot sheet and for aligning the selected template and the image of the ballot sheet.

20. The method of claim 15 further comprising comparing the mark spaces decoded from the image of the ballot sheet and mark spaces defined by the selected template for determining the completeness of the ballot sheet.

21. The method of claim 15 wherein said determining whether the ballot sheet is an original ballot sheet includes:

counting from the image of the ballot sheet the number of light pixels or the number of dark pixels or the numbers of light and dark pixels for the anti-copy feature; and comparing the number of light pixels or the number of dark pixels or the numbers of light and dark pixels for the anti-copy feature with a predetermined pixel count for the anti-copy feature for said determining whether the ballot sheet is an original ballot sheet.

22. The method of claim 15 wherein said decoding from the image of the ballot sheet the mark spaces in accordance with the selected template for recording the voting selections marked on the ballot sheet comprises:

counting the number of light pixels and dark pixels for each mark space;

determining from the counts of light and dark pixels for each mark space whether the mark space therein is an unmarked outline or is marked as a voting selection; and recording each determined marked voting selection.

* * * * *